United States Patent
Balasubramanian et al.

(10) Patent No.: US 12,289,612 B2
(45) Date of Patent: Apr. 29, 2025

(54) COOPERATIVE FULL-DUPLEX TECHNIQUES FOR SIDELINK COMMUNICATIONS

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 17/381,525

(22) Filed: Jul. 21, 2021

(65) Prior Publication Data

US 2022/0030441 A1 Jan. 27, 2022

Related U.S. Application Data

(60) Provisional application No. 63/054,929, filed on Jul. 22, 2020.

(51) Int. Cl.
*H04W 16/28* (2009.01)
*H04B 17/336* (2015.01)
(Continued)

(52) U.S. Cl.
CPC .......... *H04W 16/28* (2013.01); *H04B 17/336* (2015.01); *H04L 5/14* (2013.01); *H04W 24/10* (2013.01); *H04W 92/18* (2013.01)

(58) Field of Classification Search
None
See application file for complete search history.

(56) References Cited

U.S. PATENT DOCUMENTS

| | | |
|---|---|---|
| 10,264,600 B2 | 4/2019 | Huang et al. |
| 10,333,574 B2 | 6/2019 | Baghel et al. |
| (Continued) | | |

FOREIGN PATENT DOCUMENTS

| | | |
|---|---|---|
| CN | 106792885 B | 11/2019 |
| EP | 3836660 A1 | 6/2021 |
| (Continued) | | |

OTHER PUBLICATIONS

International Search Report and Written Opinion—PCT/US2021/042749—ISA/EPO—Dec. 9, 2021 (206336WO).

(Continued)

*Primary Examiner* — Scott M Sciacca
(74) *Attorney, Agent, or Firm* — Holland & Hart/QUALCOMM Incorporated

(57) ABSTRACT

Methods, systems, and devices for wireless communications are described that provide for cooperative full-duplex techniques for sidelink communications. A first device that supports full-duplex communications may transmit a first message to a second device while concurrently receiving a second message from a third device. The first device may determine a set of parameters that indicate a presence of one or more objects that cause interference at the first device based on communicating with the second and third devices. The set of parameters may include location information, directional beam information, main beam information, and null interference beam information, or velocity information, or any combination thereof. The first device may broadcast an indication of the set of parameters to other devices. In some examples, a device that receives the set of parameters may determine communications parameters for communication with other devices that accounts for the indicated objects.

55 Claims, 27 Drawing Sheets

(51) Int. Cl.
*H04L 5/14* (2006.01)
*H04W 24/10* (2009.01)
*H04W 92/18* (2009.01)

(56) References Cited

U.S. PATENT DOCUMENTS

| | | |
|---|---|---|
| 10,342,038 B2 | 7/2019 | Sun et al. |
| 11,432,117 B2 | 8/2022 | Wang et al. |
| 2018/0279096 A1 | 9/2018 | Wu et al. |
| 2018/0302197 A1 | 10/2018 | He et al. |
| 2019/0387377 A1 | 12/2019 | Zhang et al. |
| 2020/0067662 A1 | 2/2020 | Gao |
| 2020/0163103 A1 | 5/2020 | Kuang et al. |
| 2020/0236656 A1* | 7/2020 | Cao .................. H04W 76/27 |
| 2020/0322024 A1 | 10/2020 | Cheng et al. |
| 2020/0396718 A1 | 12/2020 | Luo et al. |
| 2021/0006318 A1 | 1/2021 | Kim et al. |
| 2021/0306992 A1 | 9/2021 | Uziel et al. |
| 2022/0030612 A1 | 1/2022 | Balasubramanian et al. |
| 2022/0140964 A1 | 5/2022 | Chen et al. |
| 2022/0167313 A1 | 5/2022 | Zhou et al. |
| 2022/0190984 A1 | 6/2022 | Lee et al. |
| 2022/0201731 A1 | 6/2022 | Lee et al. |
| 2022/0217697 A1 | 7/2022 | Lee et al. |
| 2022/0256518 A1 | 8/2022 | Hou et al. |
| 2022/0346079 A1 | 10/2022 | Yoshioka et al. |
| 2022/0369291 A1 | 11/2022 | Shibaike et al. |
| 2022/0386319 A1* | 12/2022 | Ying .................. H04B 7/0695 |
| 2023/0107971 A1 | 4/2023 | Kim et al. |
| 2023/0126503 A1* | 4/2023 | Okvist .................. H04B 7/0404 |
| | | 375/267 |
| 2023/0131353 A1 | 4/2023 | Miao et al. |
| 2023/0131882 A1 | 4/2023 | Lin |
| 2023/0184883 A1 | 6/2023 | Li et al. |
| 2023/0209552 A1 | 6/2023 | Balasubramanian et al. |
| 2023/0251370 A1* | 8/2023 | Kalantari .................. G01S 7/023 |
| | | 342/42 |
| 2023/0354311 A1 | 11/2023 | Xue et al. |

FOREIGN PATENT DOCUMENTS

| | | |
|---|---|---|
| WO | WO-2020011336 A1 | 1/2020 |
| WO | WO-2020033719 A1 | 2/2020 |

OTHER PUBLICATIONS

Medina D., et al., "Interference-Aware Dynamic Resource Allocation for D2D Proximity Services with Beamforming Support", 2015 IEEE Global Communications Conference (GLOBECOM), IEEE, Dec. 6, 2015 (Dec. 6, 2015), 7 pages, XP032872116, DOI: 10.1109/GLOCOM.2014.7416946 [retrieved on Feb. 23, 2016] p. 1-p. 5, figures 2. 4. 5, 7.

Wang L., et al., "Exploiting Full Duplex for Device-to-Device Communications in Heterogeneous Networks," IEEE Communications Magazine, IEEE Service Center, Piscataway, US. vol. 53, No. 5, May 1, 2015 (May 1, 2015), pp. 146-152, XP011581009, ISSN: 0163-6804, DOI: 10.1109/MCOM.2015.7105653 [retrieved on May 11, 2015] p. 146-p. 150, figures 2-5.

* cited by examiner

COOPERATIVE FULL-DUPLEX TECHNIQUES FOR SIDELINK COMMUNICATIONS

CROSS REFERENCE

The present application for patent claims the benefit of U.S. Provisional Patent Application No. 63/054,929 by Balasubramanian et al., entitled "COOPERATIVE FULL-DUPLEX TECHNIQUES FOR SIDELINK COMMUNICATIONS," filed Jul. 22, 2020, assigned to the assignee hereof, and expressly incorporated by reference in its entirety herein.

INTRODUCTION

The following relates to wireless communications, and more specifically to managing full-duplex communications.

Wireless communications systems are widely deployed to provide various types of communication content such as voice, video, packet data, messaging, broadcast, and so on. These systems may be have the capability of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cooperative full-duplex techniques for sidelink communications.

A method for wireless communication at a first device that supports full-duplex communications in a wireless network is described. The method may include transmitting a first message over a first sidelink communication link to a second device, the first message transmitted using a first directional beam. The method may also include receiving, while concurrently transmitting, a second message over a second sidelink communication link from a third device, the second message received using a second directional beam different from the first directional beam. The method may further include broadcasting a third message including an indication of a set of parameters indicating that an interference level at the first device satisfies a threshold, the set of parameters based on receiving the second message while concurrently transmitting the first message.

An apparatus for wireless communication at a first device that supports full-duplex communications in a wireless network is described. The apparatus may include a processor, and memory coupled to the processor. The processor and memory may be configured to transmit a first message over a first sidelink communication link to a second device, the first message transmitted using a first directional beam. The processor and memory may be further configured to receive, while concurrently transmitting, a second message over a second sidelink communication link from a third device, the second message received using a second directional beam different from the first directional beam. The processor and memory may also be configured to broadcast a third message including an indication of a set of parameters indicating that an interference level at the first device satisfies a threshold, the set of parameters based on receiving the second message while concurrently transmitting the first message.

Another apparatus for wireless communication at a first device that supports full-duplex communications in a wireless network is described. The apparatus may include means for transmitting a first message over a first sidelink communication link to a second device, the first message transmitted using a first directional beam, and means for receiving, while concurrently transmitting, a second message over a second sidelink communication link from a third device, the second message received using a second directional beam different from the first directional beam. The apparatus may further include means for broadcasting a third message including an indication of a set of parameters indicating that an interference level at the first device satisfies a threshold, the set of parameters based on receiving the second message while concurrently transmitting the first message.

A non-transitory computer-readable medium storing code for wireless communication at a first device that supports full-duplex communications in a wireless network is described. The code may include instructions executable by a processor to transmit a first message over a first sidelink communication link to a second device, the first message transmitted using a first directional beam, and receive, while concurrently transmitting, a second message over a second sidelink communication link from a third device, the second message received using a second directional beam different from the first directional beam. The code may further include instructions executable by a processor to broadcast a third message including an indication of a set of parameters indicating that an interference level at the first device satisfies a threshold, the set of parameters based on receiving the second message while concurrently transmitting the first message.

In some examples of the method, apparatuses, and non-transitory computer-readable medium described herein, the set of parameters include location information, or directional beam information, or antenna array information, or velocity information, or any combination thereof.

In some examples of the method, apparatuses, and non-transitory computer-readable medium described herein, the set of parameters indicate a presence or an absence of one or more objects that cause the interference level at the first device.

Some examples of the method, apparatuses, and non-transitory computer-readable medium described herein may further include operations, features, means, or instructions for determining location information based on a first location of the first device, a second location of the second device, and a third location of the third device, the first location, the second location, and the third location being different locations, where the third message includes an indication of the first location, or the second location, or the third location, or any combination thereof.

Some examples of the method, apparatuses, and non-transitory computer-readable medium described herein may further include operations, features, means, or instructions for determining directional beam information based on the first directional beam and the second directional beam, the directional beam information including a first beam index corresponding to a first direction of the first directional beam, or a second beam index corresponding to a second direction of the second directional beam, or both, where the third message includes an indication of the first beam index, or the second beam index, or both.

Some examples of the method, apparatuses, and non-transitory computer-readable medium described herein may further include operations, features, means, or instructions for determining antenna array information based on a transmit antenna array of the first device for transmitting the first message and a receive antenna array of the first device for receiving the second message, the antenna array information including first direction information for a main transmit beam of the transmit antenna array, second direction information for one or more null interference beams at the transmit antenna array, third direction information for a main receive beam at the receive antenna array, and fourth direction information for one or more null interference beams at the receive antenna array, where the third message includes an indication of the first direction information, or the second direction information, or the third direction information, or the fourth direction information, or any combination thereof.

In some examples of the method, apparatuses, and non-transitory computer-readable medium described herein, the first direction information and the second direction information each include an index of a codebook for transmitting the first message, the third direction information and the fourth direction information each including an index of a codebook for receiving the second message.

Some examples of the method, apparatuses, and non-transitory computer-readable medium described herein may further include operations, features, means, or instructions for determining velocity information based on a speed of the first device or a direction of the first device, or both, the third message including an indication of the speed of the first device or the direction of the first device, or both.

Some examples of the method, apparatuses, and non-transitory computer-readable medium described herein may further include operations, features, means, or instructions for determining a speed of the second device or a direction of the second device, or both, based on a message from the second device, or a first measurement performed by the first device, or both. Some examples of the method, apparatuses, and non-transitory computer-readable medium described herein may further include operations, features, means, or instructions for determining a speed of the third device or a direction of the third device, or both, based on a message from the third device or a second measurement performed by the first device, or both, the third message including an indication of the speed of the second device, or the direction of the second device, or the speed of the third device, or the direction of the third device, or any combination thereof.

Some examples of the method, apparatuses, and non-transitory computer-readable medium described herein may further include operations, features, means, or instructions for determining a configuration for broadcasting the third message including the indication of the set of parameters, the configuration including a periodicity for broadcasting the fourth message or a dynamic instruction to broadcast the third message, or both, where the third message may be broadcast in accordance with the periodicity or the dynamic instruction, or both.

Some examples of the method, apparatuses, and non-transitory computer-readable medium described herein may further include operations, features, means, or instructions for determining, from the configuration, a probability value associated with broadcasting the set of parameters, where broadcasting the third message may be based on the probability value.

Some examples of the method, apparatuses, and non-transitory computer-readable medium described herein may further include operations, features, means, or instructions for receiving, from a fourth device, a fifth message including a communications parameter that indicates a presence or absence of one or more objects that cause interference at a location of the first device. Some examples of the method, apparatuses, and non-transitory computer-readable medium described herein may further include operations, features, means, or instructions for determining one or more beam directions for communicating with a fifth device over a third sidelink communication link based on the communications parameter.

Some examples of the method, apparatuses, and non-transitory computer-readable medium described herein may further include operations, features, means, or instructions for transmitting, to the fourth device, a configuration for broadcasting, or unicasting, or groupcasting, or any combination thereof, the communications parameter, the configuration indicating a periodicity for broadcasting the communications parameter, or one or more event triggers for broadcasting the communications parameter, or a dynamic request for the communications parameter, or any combination thereof, where receiving the fifth message may be based on the configuration.

In some examples of the method, apparatuses, and non-transitory computer-readable medium described herein, the communications parameter includes an indication of one or more transmit directions or one or more receive directions, or both, that may be based on the one or more objects that cause interference at the location.

A method for wireless communication at a receiving device is described. The method may include receiving, from a first device in a wireless network, a first message including a first set of parameters indicating that an interference level at a first location of the first device satisfies a threshold. The method may further include receiving, from a second device in the wireless network, a second message including a second set of parameters indicating that an interference level at a second location of the second device that is different from the first location satisfies a threshold, and transmitting a third message including an indication of a communications parameter based on the first location and the second location, the communications parameter indicating at least one or more beam directions for communicating at a third location, where the third location is different from the second location and the first location.

An apparatus for wireless communication at a receiving device is described. The apparatus may include a processor, and memory coupled to the processor. The processor and memory may be configured to receive, from a first device in a wireless network, a first message including a first set of parameters indicating that an interference level at a first location of the first device satisfies a threshold. The processor and memory may be further configured to receive, from a second device in the wireless network, a second message including a second set of parameters indicating that an interference level at a second location of the second device that is different from the first location satisfies a threshold, and transmit a third message including an indication of a communications parameter based on the first location and the second location, the communications parameter indicating at least one or more beam directions for communicating at a third location, where the third location is different from the second location and the first location.

Another apparatus for wireless communication at a receiving device is described. The apparatus may include means for receiving, from a first device in a wireless network, a first message including a first set of parameters indicating that an interference level at a first location of the first device satisfies a threshold, and means for receiving, from a second device in the wireless network, a second message including a second set of parameters indicating that an interference level at a second location of the second device that is different from the first location satisfies a threshold. The apparatus may further include means for transmitting a third message including an indication of a communications parameter based on the first location and the second location, the communications parameter indicating at least one or more beam directions for communicating at a third location, where the third location is different from the second location and the first location.

A non-transitory computer-readable medium storing code for wireless communication at a receiving device is described. The code may include instructions executable by a processor to receive, from a first device in a wireless network, a first message including a first set of parameters indicating that an interference level at a first location of the first device satisfies a threshold, and receive, from a second device in the wireless network, a second message including a second set of parameters indicating that an interference level at a second location of the second device that is different from the first location satisfies a threshold. The code may further include instructions executable by the processor to transmit a third message including an indication of a communications parameter based on the first location and the second location, the communications parameter indicating at least one or more beam directions for communicating at a third location, where the third location is different from the second location and the first location.

In some examples of the method, apparatuses, and non-transitory computer-readable medium described herein, the first set of parameters indicate a presence or absence of one or more objects that cause the interference level at the first location of the first device and the second set of parameters indicate a presence or absence of one or more objects that cause the interference level at the second location of the second device, and the first set of parameters and the second set of parameters each include location information, or directional beam information, or antenna array information, or velocity information, or any combination thereof.

In some examples of the method, apparatuses, and non-transitory computer-readable medium described herein, the at least one or more beam directions for communicating at the third location may be based on the presence or absence of the one or more objects at the first location and the second location.

In some examples of the method, apparatuses, and non-transitory computer-readable medium described herein, the location information of the first message includes an indication of the first location of the first device and a location of one or more other devices communicating with the first device, the first location and the location of the one or more other devices each including global positioning system coordinates, or an absolute location, or a zone identifier, or any combination thereof, and the communications parameter may be based on the first location and the location of the one or more other devices.

In some examples of the method, apparatuses, and non-transitory computer-readable medium described herein, the directional beam information of the first message includes a first beam index corresponding to a first direction of a first directional beam of the first device, or a second beam index corresponding to a second direction of a second directional beam of the first device, or both, and the communications parameter may be based on the first beam index, or the second beam index, or both.

In some examples of the method, apparatuses, and non-transitory computer-readable medium described herein, the antenna array information of the first message includes first direction information for a main transmit beam of a transmit antenna array at the first device, second direction information for one or more null interference beams at the transmit antenna array, third direction information for a main receive beam at a receive antenna array at the first device, and fourth direction information for one or more null interference beams at the receive antenna array, the first direction information and the second direction information each including an index of a codebook for transmitting messages, the third direction information and the fourth direction information each including an index of a codebook for receiving messages, and the communications parameter may be based on the first direction information, or the second direction information, or the third direction information, or any combination thereof.

Some examples of the method, apparatuses, and non-transitory computer-readable medium described herein may further include operations, features, means, or instructions for determining a third set of parameters for the third location, the third set of parameters including beam directions for communicating at the third location based on a first estimate of one or more objects at the third location. Some examples of the method, apparatuses, and non-transitory computer-readable medium described herein may further include operations, features, means, or instructions for determining a fourth set of parameters for a fourth location, the fourth set of parameters including beam directions for communicating at the fourth location based on a second estimate of one or more objects at the fourth location, where the third message includes the third set of parameters, or the fourth set of parameters, or both.

Some examples of the method, apparatuses, and non-transitory computer-readable medium described herein may further include operations, features, means, or instructions for receiving, from the first device, a configuration for transmitting the communications parameter, the configuration indicating a periodicity for transmitting the communications parameter, or one or more event triggers for transmitting the communications parameter, or a dynamic request for the communications parameter, or any combination thereof. Some examples of the method, apparatuses, and non-transitory computer-readable medium described herein may further include operations, features, means, or instructions for transmitting, to the first device, a fourth message including the communications parameter based on the configuration.

A method for wireless communication at a first device that supports full-duplex communications in a wireless network is described. The method may include receiving, from a second device, a first message including a first set of parameters indicating that an interference level at a first location of the second device satisfies a threshold, and receiving, from a third device, a second message including a second set of parameters indicating that an interference level at a second location of the third device that is different from the first location satisfies a threshold. The method may further include communicating with a fourth device over a sidelink communication link using a communications parameter that is based on the first set of parameters and the second set of parameters.

An apparatus for wireless communication at a first device that supports full-duplex communications in a wireless network is described. The apparatus may include a processor, and memory coupled to the processor. The processor and memory may be configured to receive, from a second device, a first message including a first set of parameters indicating that an interference level at a first location of the second device satisfies a threshold, and receive, from a third device, a second message including a second set of parameters indicating that an interference level at a second location of the third device that is different from the first location satisfies a threshold. The processor and memory may be further configured to communicate with a fourth device over a sidelink communication link using a communications parameter that is based on the first set of parameters and the second set of parameters.

Another apparatus for wireless communication at a first device that supports full-duplex communications in a wireless network is described. The apparatus may include means for receiving, from a second device, a first message including a first set of parameters indicating that an interference level at a first location of the second device satisfies a threshold. The apparatus may further include means for receiving, from a third device, a second message including a second set of parameters indicating that an interference level at a second location of the third device that is different from the first location satisfies a threshold, and means for communicating with a fourth device over a sidelink communication link using a communications parameter that is based on the first set of parameters and the second set of parameters.

A non-transitory computer-readable medium storing code for wireless communication at a first device that supports full-duplex communications in a wireless network is described. The code may include instructions executable by a processor to receive, from a second device, a first message including a first set of parameters indicating that an interference level at a first location of the second device satisfies a threshold. The code may further include instructions executable by the processor to receive, from a third device, a second message including a second set of parameters indicating that an interference level at a second location of the third device that is different from the first location satisfies a threshold, and communicate with a fourth device over a sidelink communication link using a communications parameter that is based on the first set of parameters and the second set of parameters.

In some examples of the method, apparatuses, and non-transitory computer-readable medium described herein, the first set of parameters indicate a presence or absence of one or more objects that cause the interference level at the first location of the second device and the second set of parameters indicate a presence or absence of one or more objects that cause the interference level at the second location of the third device, and the first set of parameters and the second set of parameters each include location information, or directional beam information, or antenna array information, or velocity information, or any combination thereof.

Some examples of the method, apparatuses, and non-transitory computer-readable medium described herein may further include operations, features, means, or instructions for determining a third location of the first device for communicating with the fourth device, the third location being different from the first location and the second location. Some examples of the method, apparatuses, and non-transitory computer-readable medium described herein may further include operations, features, means, or instructions for determining the communications parameter based on a proximity of the third location to the first location, or a proximity of the third location to the second location, or both.

Some examples of the method, apparatuses, and non-transitory computer-readable medium described herein may further include operations, features, means, or instructions for determining one or more beam directions for communicating with at least the fourth device based on the first set of parameters and the second set of parameters, where the fourth device may be located at a fourth location different from the first location, the second location, and the third location.

A method for wireless communication at a first device that supports full-duplex communications in a wireless network is described. The method may include receiving, from a second device, a message including a communications parameter indicating that an interference level at a first location of the first device satisfies a threshold. The method may further include communicating with a third device over a sidelink communication link using a directional beam in accordance with one or more beam directions, the one or more beam directions are based on the communications parameter and a second location of the third device.

An apparatus for wireless communication at a first device that supports full-duplex communications in a wireless network is described. The apparatus may include a processor, and memory coupled to the processor. The processor and memory may be configured to receive, from a second device, a message including a communications parameter indicating that an interference level at a first location of the first device satisfies a threshold. The processor and memory may be configured to communicate with a third device over a sidelink communication link using a directional beam in accordance with one or more beam directions, the one or more beam directions are based on the communications parameter and a second location of the third device.

Another apparatus for wireless communication at a first device that supports full-duplex communications in a wireless network is described. The apparatus may include means for receiving, from a second device, a message including a communications parameter indicating that an interference level at a first location of the first device satisfies a threshold. The apparatus may further include means for communicating with a third device over a sidelink communication link using a directional beam in accordance with one or more beam directions, the one or more beam directions are based on the communications parameter and a second location of the third device.

A non-transitory computer-readable medium storing code for wireless communication at a first device that supports full-duplex communications in a wireless network is described. The code may include instructions executable by a processor to receive, from a second device, a message including a communications parameter indicating that an interference level at a first location of the first device satisfies a threshold. The code may further include instructions executable by a processor to communicate with a third device over a sidelink communication link using a directional beam in accordance with one or more beam directions, the one or more beam directions are based on the communications parameter and a second location of the third device.

Some examples of the method, apparatuses, and non-transitory computer-readable medium described herein may further include operations, features, means, or instructions for determining, from the communications parameter, a transmit direction for a first directional beam, or a receive direction for a second directional beam, or both, for a device communicating at the first location of the first device, where the one or more beam directions may be based on the transmit direction, or the receive direction, or both.

In some examples of the method, apparatuses, and non-transitory computer-readable medium described herein, the first location of the first device includes a first sublocation from a set of two or more sublocations, and the second location of the second device includes a second sublocation from the set of two or more sublocations, the communications parameter being associated with the first sublocation.

Some examples of the method, apparatuses, and non-transitory computer-readable medium described herein may further include operations, features, means, or instructions for transmitting, to the second device, a configuration for broadcasting, or unicasting, or groupcasting, or any combination thereof, the communications parameter, the configuration indicating a periodicity for transmitting the communications parameter, or one or more event triggers for transmitting the communications parameter, or a dynamic request for the communications parameter, or any combination thereof, where receiving the message may be based on the configuration.

A method of wireless communication is described. The method may include transmitting, by a first device that supports full-duplex communications in a wireless network, a first message over a first sidelink communication link to a second device. In some examples, the first message may be transmitted using a first directional beam. The method may include, receiving, while concurrently transmitting, a second message over a second sidelink communication link from a third device. In some examples, the second message received using a second directional beam different from the first directional beam. The method may also include determining, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. In some examples, the method includes broadcasting a fourth message including an indication of the set of parameters.

An apparatus for wireless communication is described. The apparatus may include a processor and memory coupled to the processor. In some examples, the processor and memory may be configured to transmit (e.g., by a first device that supports full-duplex communications in a wireless network) a first message over a first sidelink communication link to a second device. In some examples, the first message may be transmitted using a first directional beam. In some examples, the processor and memory may be configured to receive, while concurrently transmitting, a second message over a second sidelink communication link from a third device, where the second message may be received using a second directional beam different from the first directional beam. In some examples, the processor and memory may be configured to determine, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. In some examples, the processor and memory may be configured to broadcast a fourth message including an indication of the set of parameters.

Another apparatus for wireless communication is described. The apparatus may include means for transmitting (e.g., by a first device that supports full-duplex communications in a wireless network) a first message over a first sidelink communication link to a second device. In some aspects, the first message may be transmitted using a first directional beam. The apparatus may further include means for receiving, while concurrently transmitting, a second message over a second sidelink communication link from a third device. In such cases, the second message received using a second directional beam different from the first directional beam. The apparatus may include means for determining, based on concurrently transmitting the first message and receiving the second message, a set of parameters that indicate a presence or absence of one or more objects that cause interference at the first device. In some examples, the set of parameters may include location information, or directional beam information, or antenna array information, or velocity information, or any combination thereof. In some examples, the apparatus may include mans for broadcasting a fourth message including an indication of the set of parameters.

A non-transitory computer-readable medium storing code for wireless communication is described. The code may include instructions executable by a processor to transmit (e.g., by a first device that supports full-duplex communications in a wireless network) a first message over a first sidelink communication link to a second device, the first message transmitted using a first directional beam. In some examples, the instructions may be executable to receive, while concurrently transmitting, a second message over a second sidelink communication link from a third device, the second message received using a second directional beam different from the first directional beam. In some examples, the instructions may be executable to determine, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. In some examples, the instructions may be executable to broadcast a fourth message including an indication of the set of parameters.

In some examples of the method, apparatuses, and non-transitory computer-readable medium described herein, determining the set of parameters may include operations, features, means, or instructions for determining the location information based on a first location of the first device, a second location of the second device, and a third location of the third device, the first location, the second location, and the third location being different locations. In some examples, the fourth message may include an indication of the first location, or the second location, or the third location, or any combination thereof.

In some examples of the method, apparatuses, and non-transitory computer-readable medium described herein, the location information includes global positioning system (GPS) coordinates, or an absolute location, or a zone identifier (ID), or any combination thereof, for each of the first location, the second location, and the third location.

In some examples of the method, apparatuses, and non-transitory computer-readable medium described herein, determining the set of parameters may include operations, features, means, or instructions for determining the directional beam information based on the first directional beam and the second directional beam, the directional beam information including a first beam index corresponding to a first direction of the first directional beam, or a second beam index corresponding to a second direction of the second directional beam, or any combination thereof. In some cases, the fourth message may include an indication of the first beam index, or the second beam index, or any combination thereof.

In some examples of the method, apparatuses, and non-transitory computer-readable medium described herein, determining the set of parameters may include operations, features, means, or instructions for determining the antenna array information based on a transmit antenna array of the first device for transmitting the first message and a receive antenna array of the first device for receiving the second message. In some examples, the antenna array information may include first direction information for a main transmit beam of the transmit antenna array, second direction information for one or more nulls at the transmit antenna array, third direction information for a main receive beam at the receive antenna array, and fourth direction information for one or more nulls at the receive antenna array. In some examples, the fourth message includes an indication of the first direction information, or the second direction information, or the third direction information, or the fourth direction information, or any combination thereof.

In some examples of the method, apparatuses, and non-transitory computer-readable medium described herein, the first direction information and the second direction information each include an index of a codebook for transmitting the first message, the third direction information and the fourth direction information each including an index of a codebook for receiving the second message.

In some examples of the method, apparatuses, and non-transitory computer-readable medium described herein, determining the set of parameters may include operations, features, means, or instructions for determining the velocity information based on a speed of the first device or a direction of the first device, or any combination thereof. In some examples, the fourth message may include an indication of the speed of the first device or the direction of the first device, or any combination thereof.

In some examples of the method, apparatuses, and non-transitory computer-readable medium described herein, determining the velocity information may include operations, features, means, or instructions for determining a speed of the second device or a direction of the second device, or any combination thereof, based on a message from the second device, or a first measurement performed by the first device, or any combination thereof. Some examples of the method, apparatuses, and non-transitory computer-readable medium described herein may further include operations, features, means, or instructions for determining a speed of a third device or a direction of the third device, or any combination thereof, based on a message from the third device or a second measurement performed by the first device, or any combination thereof. In some examples, the fourth message may include an indication of the speed of the second device, or the direction of the second device, or the speed of the third device, or the direction of the third device, or any combination thereof.

Some examples of the method, apparatuses, and non-transitory computer-readable medium described herein may further include operations, features, means, or instructions for determining a configuration for broadcasting the fourth message including the indication of the set of parameters, the configuration including a periodicity for broadcasting the fourth message or a dynamic instruction to broadcast the fourth message, or any combination thereof. In some examples, the fourth message may be broadcast in accordance with the periodicity or the dynamic instruction, or any combination thereof.

Some examples of the method, apparatuses, and non-transitory computer-readable medium described herein may further include operations, features, means, or instructions for determining, from the configuration, a probability value associated with broadcasting the set of parameters, where broadcasting the fourth message may be based on the probability value.

In some examples of the method, apparatuses, and non-transitory computer-readable medium described herein, the periodicity for broadcasting the fourth message may be based on a capability of the first device or a speed of the first device, or any combination thereof.

Some examples of the method, apparatuses, and non-transitory computer-readable medium described herein may further include operations, features, means, or instructions for receiving an indication of the configuration from a road side unit (RSU), or a base station, or any combination thereof.

Some examples of the method, apparatuses, and non-transitory computer-readable medium described herein may further include operations, features, means, or instructions for receiving, from a road side unit, a fifth message including a communications parameter that indicates a presence or absence of one or more additional objects that cause interference at a location of the first device, and determining one or more beam directions for communicating with a fourth device over a third sidelink communication link based on the communications parameter.

Some examples of the method, apparatuses, and non-transitory computer-readable medium described herein may further include operations, features, means, or instructions for transmitting, to the road side unit, a configuration for broadcasting, or unicasting, or groupcasting, or any combination thereof, the communications parameter. In some examples, the configuration may indicate a periodicity for broadcasting the communications parameter, one or more event triggers for broadcasting the communications parameter, a dynamic request for the communications parameter, or any combination thereof, where receiving the fifth message may be based on the configuration.

In some examples of the method, apparatuses, and non-transitory computer-readable medium described herein, the communications parameter includes an indication of one or more transmit directions or one or more receive directions, or any combination thereof, that may be based on the one or more objects that cause interference at the location.

In some examples of the method, apparatuses, and non-transitory computer-readable medium described herein, the one or more objects that cause interference at the first device include objects that reflect signaling of the first device back to the first device based on the first device concurrently transmitting and receiving.

A method of wireless communication is described. The method may include receiving, (e.g., at an RSU) from a first device in a wireless network, a first message including a first set of parameters that indicate a presence or absence of one or more objects that cause interference at a first location of the first device. In some examples, the method may include receiving, from a second device in the wireless network, a second message including a second set of parameters that indicate a presence or absence of one or more objects that cause interference at second location of the second device that is different from the first location. In some examples, the first set of parameters and the second set of parameters may each include location information, or directional beam information, or antenna array information, or velocity information, or any combination thereof. The method may further include determining a communications parameter based on the first set of parameters and the second set of parameters and transmitting a third message including an indication of the communications parameter to at least the first device, or the second device, or any combination thereof. In some aspects, the communications parameter may indicate at least one or more beam directions for communicating at a location based on the presence or the absence of the one or more objects at the first location and the second location.

An apparatus for wireless communication is described. The apparatus may include a processor and memory coupled to the processor. The processor and memory may be configured to receive, (e.g., at an RSU) from a first device in a wireless network, a first message including a first set of parameters that indicate a presence or absence of one or more objects that cause interference at a first location of the first device. The processor and memory may be configured to receive, from a second device in the wireless network, a second message including a second set of parameters that indicate a presence or absence of one or more objects that cause interference at second location of the second device that is different from the first location. In some examples, the first set of parameters and the second set of parameters may each include location information, or directional beam information, or antenna array information, or velocity information, or any combination thereof. In some examples, the processor and memory may be configured to determine a communications parameter based on the first set of parameters and the second set of parameters, where the communications parameter may indicate at least one or more beam directions for communicating at a location based on the presence or the absence of the one or more objects at the first location and the second location. The processor and memory may be configured to transmit a third message including an indication of the communications parameter to at least the first device, or the second device, or any combination thereof.

Another apparatus for wireless communication is described. The apparatus may include means for receiving, (e.g., at an RSU) from a first device in a wireless network, a first message including a first set of parameters that indicate a presence or absence of one or more objects that cause interference at a first location of the first device. The apparatus may include means for receiving, from a second device in the wireless network, a second message including a second set of parameters that indicate a presence or absence of one or more objects that cause interference at second location of the second device that is different from the first location. In some cases, the first set of parameters and the second set of parameters may each include location information, or directional beam information, or antenna array information, or velocity information, or any combination thereof. The apparatus may include means for determining a communications parameter based on the first set of parameters and the second set of parameters, the communications parameter indicating at least one or more beam directions for communicating at a location based on the presence or the absence of the one or more objects at the first location and the second location. The apparatus may include means for transmitting a third message including an indication of the communications parameter to at least the first device, or the second device, or any combination thereof.

A non-transitory computer-readable medium storing code for wireless communication is described. The code may include instructions executable by a processor to receive, (e.g., at an RSU) from a first device in a wireless network, a first message including a first set of parameters that indicate a presence or absence of one or more objects that cause interference at a first location of the first device. In some examples, the instructions may be executable to receive, from a second device in the wireless network, a second message including a second set of parameters that indicate a presence or absence of one or more objects that cause interference at second location of the second device that is different from the first location. In some examples, the first set of parameters and the second set of parameters may each include location information, or directional beam information, or antenna array information, or velocity information, or any combination thereof. In some examples, the instructions may be executable to determine a communications parameter based on the first set of parameters and the second set of parameters, the communications parameter indicating at least one or more beam directions for communicating at a location based on the presence or the absence of the one or more objects at the first location and the second location. In some examples, the instructions may be executable to transmit a third message including an indication of the communications parameter to at least the first device, or the second device, or any combination thereof.

In some examples of the method, apparatuses, and non-transitory computer-readable medium described herein, determining the communications parameter may include operations, features, means, or instructions for determining a first set of parameters for a third location of the one or more locations. In some examples, the first set of parameters may include beam directions for communicating in the third location based on a first estimate of one or more objects at the third location. Some examples of the method, apparatuses, and non-transitory computer-readable medium described herein may further include operations, features, means, or instructions for determining a second set of parameters for a fourth location of the set of one or more locations, the second set of parameters including beam directions for communicating in the fourth location based on a second estimate of one or more objects at the fourth location. In some cases, the third message may include the first subset of parameters, or the second subset of parameters, or any combination thereof.

In some examples of the method, apparatuses, and non-transitory computer-readable medium described herein, the first subset of parameters includes first location information, or first directional beam information, or first antenna array information, or first velocity information, or any combination thereof, for one or more nodes at the third location. In some aspects, the second subset of parameters may include second location information, or second directional beam information, or second antenna array information, or second velocity information, or any combination thereof, for one or more nodes at the fourth location.

Some examples of the method, apparatuses, and non-transitory computer-readable medium described herein may further include operations, features, means, or instructions for receiving, from the first device, a configuration for transmitting the communications parameter, the configuration indicating a periodicity for transmitting the communications parameter, one or more event triggers for transmitting the communications parameter, a dynamic request for the communications parameter, or any combination thereof. Some examples of the method, apparatuses, and non-transitory computer-readable medium described herein may further include operations, features, means, or instructions for transmitting, to the first device, a fourth message including the communications parameter based on the configuration.

In some examples of the method, apparatuses, and non-transitory computer-readable medium described herein, the communications parameter includes an indication of one or more transmit directions, or one or more receive directions, or any combination thereof, that may be based on the one or more objects that cause interference at a location.

In some examples of the method, apparatuses, and non-transitory computer-readable medium described herein, the location information of the first message includes an indication of the first location of the first device and a location of one or more other devices communicating with the first device. In some cases, the first location and the location of the one or more other devices may each include GPS coordinates, or an absolute location, or a zone ID, or any combination thereof, where the communications parameter may be based on the first location and the location of the one or more other devices.

In some examples of the method, apparatuses, and non-transitory computer-readable medium described herein, the directional beam information of the first message including a first beam index corresponding to a first direction of a first directional beam of the first device, or a second beam index corresponding to a second direction of a second directional beam of the first device, or any combination thereof. In some cases, the communications parameter may be based on the first beam index, or the second beam index, or any combination thereof.

In some examples of the method, apparatuses, and non-transitory computer-readable medium described herein, the antenna array information of the first message including first direction information for a main transmit beam of a transmit antenna array at the first device, second direction information for one or more nulls at the transmit antenna array, third direction information for a main receive beam at a receive antenna array at the first device, and fourth direction information for one or more nulls at the receive antenna array. In some examples, the first direction information and the second direction information may each include an index of a codebook for transmitting messages, and the third direction information and the fourth direction information may each include an index of a codebook for receiving messages. In some examples, the communications parameter may be based on the first direction information, or the second direction information, or the third direction information, or any combination thereof.

Some examples of the method, apparatuses, and non-transitory computer-readable medium described herein may further include operations, features, means, or instructions for determining a speed of the first device or a direction of the first device, or any combination thereof, based on a message from the first device, or a first measurement performed by the road side unit, or any combination thereof.

Some examples of the method, apparatuses, and non-transitory computer-readable medium described herein may further include operations, features, means, or instructions for determining a speed of the second device or a direction of the second device, or any combination thereof, based on a message from the second device or a second measurement performed by the road side unit, or any combination thereof. In some aspects, the velocity information of the first message may include the speed of the first device, or the direction of the first device, or the speed of the second device, or the direction of the second device, or any combination thereof. In such cases, the communications parameter may be based on the speed of the first device, or the direction of the first device, or the speed of the second device, or the direction of the second device, or any combination thereof.

In some examples of the method, apparatuses, and non-transitory computer-readable medium described herein, transmitting the third message may include operations, features, means, or instructions for broadcasting, unicasting, or groupcasting the third message to one or more devices in the wireless network.

A method of wireless communication is described. The method may include receiving, (e.g., by a first device that supports full-duplex communications in a wireless network) from a second device, a first message including a first set of parameters that indicate a presence or absence of one or more objects that cause interference at a first location of the second device. The method may also include receiving, from a third device, a second message including a second set of parameters that indicate a presence or absence of one or more objects that cause interference at second location of the third device that is different from the first location. In some examples, the first set of parameters and the second set of parameters may each include location information, or directional beam information, or antenna array information, or velocity information, or any combination thereof. The method may include determining a communications parameter based on the first set of parameters and the second set of parameters and communicating with a fourth device over a sidelink communication link using the communications parameter.

An apparatus for wireless communication is described. The apparatus may include a processor and memory coupled to the processor. The processor and memory may be executable to receive, (e.g., by a first device that supports full-duplex communications in a wireless network) from a second device, a first message including a first set of parameters that indicate a presence or absence of one or more objects that cause interference at a first location of the second device. In some examples, the processor and memory may be configured to receive, from a third device, a second message including a second set of parameters that indicate a presence or absence of one or more objects that cause interference at second location of the third device that is different from the first location. In some cases, the first set of parameters and the second set of parameters may each include location information, or directional beam information, or antenna array information, or velocity information, or any combination thereof. In some examples, the processor and memory may be configured to determine a communications parameter based on the first set of parameters and the second set of parameters and communicate with a fourth device over a sidelink communication link using the communications parameter.

Another apparatus for wireless communication is described. The apparatus may include means for receiving, (e.g., at a first device in a wireless network that supports full-duplex communications) from a second device, a first message including a first set of parameters that indicate a presence or absence of one or more objects that cause interference at a first location of the second device. In some examples, the apparatus may include means for receiving, from a third device, a second message including a second set of parameters that indicate a presence or absence of one or more objects that cause interference at second location of the third device that is different from the first location. In some cases, the first set of parameters and the second set of parameters may each include location information, or directional beam information, or antenna array information, or velocity information, or any combination thereof. The apparatus may further include means for determining a communications parameter based on the first set of parameters and the second set of parameters and communicating with a fourth device over a sidelink communication link using the communications parameter.

A non-transitory computer-readable medium storing code for wireless communication is described. The code may include instructions executable by a processor to receive, (e.g., at a first device that supports full-duplex communications in a wireless network) from a second device, a first message including a first set of parameters that indicate a presence or absence of one or more objects that cause interference at a first location of the second device. In some cases, the instructions may be executable to receive, from a third device, a second message including a second set of parameters that indicate a presence or absence of one or more objects that cause interference at second location of the third device that is different from the first location, the first set of parameters and the second set of parameters each including location information, or directional beam information, or antenna array information, or velocity information, or any combination thereof. In some aspects, the instructions may be executable to determine a communications parameter based on the first set of parameters and the second set of parameters and communicate with a fourth device over a sidelink communication link using the communications parameter.

In some examples of the method, apparatuses, and non-transitory computer-readable medium described herein, determining the communications parameter may include operations, features, means, or instructions for determining a third location of the first device for communicating with the fourth device, the third location being different from the first location and the second location, and determining the communications parameter based on a proximity of the third location to the first location, or a proximity of the third location to the second location, or any combination thereof.

In some examples of the method, apparatuses, and non-transitory computer-readable medium described herein, the first location, the second location, and the third location each correspond to different GPS coordinates, or different absolute locations, or different zone IDs, or any combination thereof.

In some examples of the method, apparatuses, and non-transitory computer-readable medium described herein, determining the communications parameter may include operations, features, means, or instructions for determining one or more beam directions for communicating with at least the fourth device based on the first set of parameters and the second set of parameters. In some cases, the fourth device may be located at a fourth location different from the first location, the second location, and the third location.

In some examples of the method, apparatuses, and non-transitory computer-readable medium described herein, the communications parameter may be based on one or more beam directions used by the second device at the first location, or one or more beam directions used by the third device at the second location, or any combination thereof.

A method of wireless communication is described. The method may include determining a first location of a first device that supports full-duplex communications in a wireless network, and receiving, from an RSU, a message including a communications parameter that indicate a presence or absence of one or more objects that cause interference at the first location of the first device. The method may include determining, based on the communications parameter and a second location of a second device, one or more beam directions for communicating with at least the second device and communicating with the second device over a sidelink communication link using a directional beam in accordance with the one or more beam directions.

An apparatus for wireless communication is described. The apparatus may include a processor and memory coupled to the processor. The processor and memory may be configured to determine a first location of a first device that supports full-duplex communications in a wireless network and receive, from an RSU, a message including a communications parameter that indicate a presence or absence of one or more objects that cause interference at the first location of the first device. The processor and memory may be configured to determine, based on the communications parameter and a second location of a second device, one or more beam directions for communicating with at least the second device and communicate with the second device over a sidelink communication link using a directional beam in accordance with the one or more beam directions.

Another apparatus for wireless communication is described. The apparatus may include means for determining a first location of a first device that supports full-duplex communications in a wireless network, and receiving, from an RSU, a message including a communications parameter that indicate a presence or absence of one or more objects that cause interference at the first location of the first device. The apparatus may include means for determining, based on the communications parameter and a second location of a second device, one or more beam directions for communicating with at least the second device and communicating with the second device over a sidelink communication link using a directional beam in accordance with the one or more beam directions.

A non-transitory computer-readable medium storing code for wireless communication is described. The code may include instructions executable by a processor to determine a first location of a first device that supports full-duplex communications in a wireless network, and receive, from an RSU, a message including a communications parameter that indicate a presence or absence of one or more objects that cause interference at the first location of the first device. The instructions may be executable to determine, based on the communications parameter and a second location of a second device, one or more beam directions for communicating with at least the second device and communicate with the second device over a sidelink communication link using a directional beam in accordance with the one or more beam directions.

In some examples of the method, apparatuses, and non-transitory computer-readable medium described herein, determining the one or more beam directions may include operations, features, means, or instructions for determining, from the communications parameter, a transmit direction for a first directional beam, or a receive direction for a second directional beam, or a combination thereof, for a device communicating at the first location of the first device. In some cases, the one or more beam directions may be based on the transmit direction, or the receive direction, or a combination thereof.

In some examples of the method, apparatuses, and non-transitory computer-readable medium described herein, the first location of the first device includes a sublocation from a set of two or more sublocations, and where the second location of the second device includes a second sublocation from the set of two or more sublocations, the communications parameter being associated with the first sublocation.

Some examples of the method, apparatuses, and non-transitory computer-readable medium described herein may further include operations, features, means, or instructions for transmitting, to the road side unit, a configuration for broadcasting, or unicasting, or groupcasting, or any combination thereof, the communications parameter. In some examples, the configuration may indicate a periodicity for transmitting the communications parameter, one or more event triggers for transmitting the communications parameter, a dynamic request for the communications parameter, or any combination thereof, where receiving the message may be based on the configuration.

Some examples of the method, apparatuses, and non-transitory computer-readable medium described herein may further include operations, features, means, or instructions for performing one or more beam refinement procedures for modifying the one or more beam directions for communicating with at least the second device.

In some examples of the method, apparatuses, and non-transitory computer-readable medium described herein, the first location and the second location, each correspond to different GPS coordinates, or different absolute locations, or different zone IDs, or any combination thereof.

DETAILED DESCRIPTION

Figure 1:
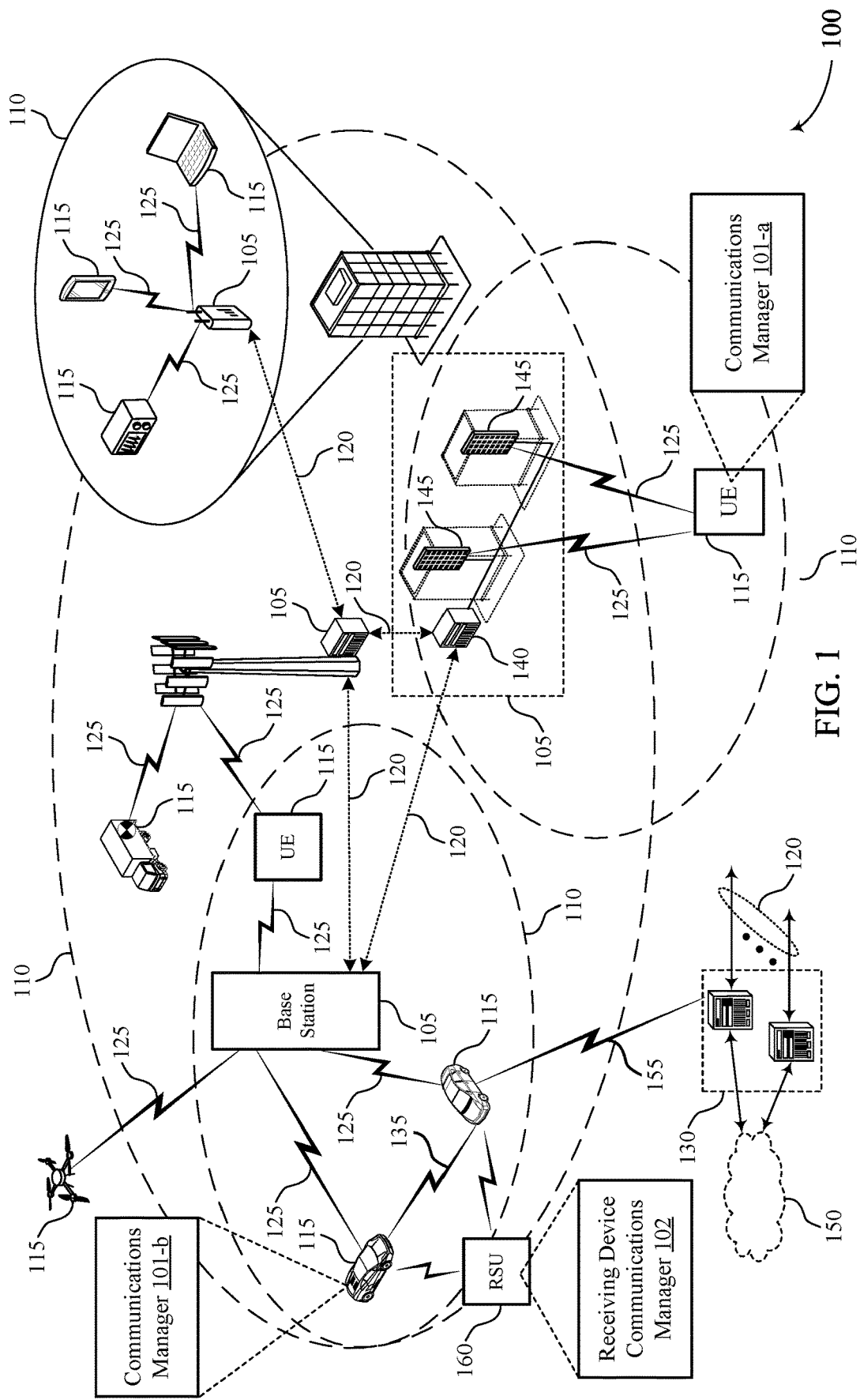
FIG. 1 illustrates an example of a wireless communications system that supports cooperative full-duplex techniques for sidelink communications in accordance with one or more aspects of the present disclosure.

Wireless communications systems may support both access links (e.g., Uu links) and sidelinks (e.g., PC5 links) for communications between wireless devices. For example, a UE, which may be an example of a vehicle that supports vehicle-to-everything (V2X) communications, vehicle-to-vehicle (V2V) communications, device-to-device (D2D) communications, or the like, may select different directional beams for sidelink communications with other UEs. In some wireless communications systems, such as a V2X system, one or more wireless devices may have the capability of performing full-duplex communications for communications over the sidelinks. In such cases, one or more wireless devices may have the capability of performing of simultaneous transmission and reception with one or more different devices over various sidelink communication links. As such, the one or more wireless devices may be susceptible to self-interference while performing full-duplex communications.

For example, a wireless device may experience self-interference due to antenna array leakage (e.g., interference between elements of an antenna array) or usage of both a transmit antenna array and a receive antenna array (e.g., causing interference at the receive antenna array by communications at the transmit array, or vice versa). The wireless device may, in some cases, perform one or more techniques to manage such self-interference for full-duplex communications. However, a device that supports full-duplex communications may experience additional interference due to signal reflections from objects in the vicinity of the device (which may be referred to as a signaling echo, clutter echo, clutter interference, or other like terminology, where the objects may be similarly referred to as clutter objects or other terminology). More specifically, a first device may transmit a message to a second device in some direction (e.g., using a directional beam), and the transmitted signaling may reflect back to, or otherwise be detected at, the first device while concurrently receiving another message (e.g., from a third device using another directional beam) when using full-duplex communications. As such, the first device may experience interference from its own signaling that is reflected off one or more objects. In some examples, the interference may be based on the physical characteristics of the object or objects, as well as a positional relationship between the object(s) and the wireless device. Further, the objects may be stationary, quasi-stationary, or moving with respect to the wireless device, and the objects may include buildings, vehicles, infrastructure, or other devices, among other examples. The interference from nearby objects may therefore vary with time, in some cases, and may also be based on the movement of the device that is simultaneously transmitting and receiving (e.g., transmitting at a time that at least partially overlaps with a time that the device is receiving). In addition, a wireless device may experience interference from one or more objects concurrently (e.g., may experience interference from one or more objects at a time or at overlapping times).

As described herein, to account for the objects at different locations, a wireless device may report a set of parameters that indicate the presence or absence of objects that may cause interference at a full-duplex device. A set of parameters may refer to one or more parameters. For example, two or more wireless devices supporting full-duplex communications may exchange information regarding objects impacting communications performance at various locations. The information regarding the objects may, in turn, be used for determining one or more communications parameters (e.g., for transmit and receive beams used in a particular location) that take into account any detected objects that cause interference. The communications parameters may accordingly be configured to enable efficient communications in the presence of one or more objects at multiple locations (e.g., as previously reported by one or more devices).

In some aspects, one or more wireless devices may transmit (e.g., broadcast, unicast, groupcast) a set of parameters that indicate the presence or absence of nearby objects causing interference, and the parameters may be used by other wireless devices. For instance, the parameters reported by a first wireless device (e.g., a UE) may include a location of the first wireless device and the location of other wireless device (e.g., other UEs) that are engaging in full-duplex communication with the first wireless device. The parameters may further include one or more beam directions corresponding to one or more directional beams used by the first wireless device for communicating with the other wireless devices. Additionally or alternatively, the parameters may include main beam directions and directions of null interference beams at a transmit and/or receive antenna array with which the first wireless device is using to communicate with the other wireless devices. Here, the main beam direction information and direction information for null interference beams may be indicative of directional beams used for communications (e.g., based on an analog beamforming codebook) and directions of reflected signaling/interference (e.g., from the device's own transmission), respectively. For example, direction information for null interference beams may be identified based on a diminished size of a communication beam based on interference at the first wireless device (e.g., a magnitude of the communication beamed has been nulled or affected by destructive interference). In some examples, the parameters may also include velocity information that provides a speed and/or direction of the first wireless device and each of the other wireless devices (which may be based on signaling received from the other devices, measurements performed by the first wireless device, or the like). Accordingly, the first wireless device may report the various parameters that indicate its current communications conditions and parameters, which may in turn be used to identify a location of each of one or more objects that potentially cause reflective-type interference at a full-duplex device (e.g., interference from the device's own transmissions). This information may then be used to configure, modify, or adjust communications parameters (such as beam directions or other parameters) when communicating in an area corresponding to or near the one or more objects.

As further described herein, a receiving device such as an RSU may provide a wireless device with information related to objects detected at a location, where the information may be based on synthesized information collected from one or more other wireless devices. For example, one or more wireless devices within a coverage area of an RSU may transmit, to the RSU, a set of parameters including, but not limited to, location information, directional beam information, main beam information and information for null interference beams, and/or velocity information corresponding to full-duplex communications performed by each wireless device. In some examples, the RSU may gather the information from the one or more wireless devices and estimate the location of objects that cause reflective interference. In addition, the RSU may estimate communications parameters that take into account the detected objects. As such, the RSU may transmit (e.g., broadcast, unicast, groupcast) the information to wireless devices within its coverage area. Additionally or alternatively, the RSU may transmit the information based on a configuration received from a particular wireless device.

Aspects of the disclosure are initially described in the context of wireless communications systems. Additionally, aspects of the disclosure are illustrated by additional wireless communications systems and example process flow diagrams. Aspects of the disclosure are further illustrated by and described with reference to apparatus diagrams, system diagrams, and flowcharts that relate to cooperative full-duplex techniques for sidelink communications.

FIG. 1 illustrates an example of a wireless communications system 100 that supports cooperative full-duplex techniques for sidelink communications in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 described herein may be able to communicate with RSUs 160. In some cases, an RSU 160 may be a wireless node used to connect road infrastructure and vehicles. In some cases, an RSU 160 may perform many functions including, but not limited to, receiving data, consolidating data, synthesizing data, transmitting data, and configuring wireless resources.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include or consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) (e.g., sidelink) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In various examples, a communications manager may be a component of or included in a device to support various full-duplex techniques, such as the reporting of parameters that indicate the presence or absence of objects that may cause reflective-type interference. For example, a UE 115 may include a communications manager 101 or an RSU 160 may include a receiving device communications manager 102.

In some examples, a communications manager 101 may transmit a first message over a first sidelink communication link to a device (e.g., a UE 115), the first message may be transmitted using a first directional beam. The communications manager 101 may also receive, while concurrently transmitting, a second message over a second sidelink communication link from another device (e.g., a UE 115), the second message may be received using a second directional beam different from the first directional beam. In some examples, the communications manager 101 may determine, based on concurrently transmitting the first message and receiving the second message, a set of parameters that indicate a presence or absence of one or more objects that cause interference at the first device. In some aspects, the set of parameters may include location information, or directional beam information, or antenna array information, or velocity information, or any combination thereof. The communications manager 101 may broadcast a fourth message including an indication of the set of parameters.

The communications manager 101 may also receive, from a device (e.g., a UE 115), a first message including a first set of parameters that indicate a presence or absence of one or more objects that cause interference at a first location of the second device. The communications manager 101 may receive, from another device (e.g., a UE 115), a second message including a second set of parameters that indicate a presence or absence of one or more objects that cause interference at second location of the third device that is different from the first location. In some examples, the first set of parameters and the second set of parameters may each include location information, or directional beam information, or antenna array information, or velocity information, or any combination thereof. The communications manager 101 may determine a communications parameter (e.g., beam directions) based on the first set of parameters and the second set of parameters, and communicate with one or more device over a sidelink communication link using the communications parameter.

In some examples, the communications manager 101 may also determine a first location of the UE 115 and receive, from an RSU 160, a message including a communications parameter that indicates a presence or absence of one or more objects that cause interference at the first location of the UE 115. The communications manager 101 may determine, based on the communications parameter and a second location of a second device (e.g., another UE 115), one or more beam directions for communicating with at least the second device. In some examples, the communications manager 101 may communicate with the second device over a sidelink communication link using a directional beam in accordance with the one or more beam directions.

The receiving device communications manager 102 may receive, from a first device (e.g., a first UE 115), a first message including a first set of parameters that indicate a presence or absence of one or more objects that cause interference at a first location of the first device. In some examples, the receiving device communications manager 102 may receive, from a second device (e.g., a second UE 115), a second message including a second set of parameters that indicate a presence or absence of one or more objects that cause interference at second location of the second device that is different from the first location. In some aspects, the first set of parameters and the second set of parameters may each include location information, or directional beam information, or antenna array information, or velocity information, or any combination thereof. The receiving device communications manager 102 may determine a communications parameter based on the first set of parameters and the second set of parameters, the communications parameter indicating at least one or more beam directions for communicating at a location based on the presence or the absence of the one or more objects at the first location and the second location. In some cases, the receiving device communications manager 102 may transmit a third message including an indication of the communications parameter to at least the first device, or the second device, or any combination thereof.

Wireless communications system 100 may support techniques that enable a UE 115 to report a set of parameters used for communicating with other devices, where the set of parameters may provide an indication of one or more nearby objects that cause reflective interference when the UE 115 is communicating using full-duplex operations. For example, a UE 115 may be communicating with two additional UEs 115 over sidelink communication links and using directional beams. The UE 115 may determine its current location (e.g., GPS) coordinates, an absolute location, a zone ID, etc.) as well as the respective locations of the additional UEs 115. The UE 115 may also determine the directions of the directional beams used for transmitting and receiving messages from the other UEs 115 (where the beam directions may correspond to a beam index). In addition, the UE 115 may determine the directions of its main beams, and any null interference beams, for its transmit and receive antenna arrays (where the null interference beams may be caused by the reflective interference described herein), and the UE 115 may also determine its current speed and/or direction of movement. Using this information, the UE 115 may broadcast the parameters including the location information, the beam information, the antenna array information, and the velocity information to other UEs 115, which may then use the parameters to identify the most efficient beams to use based on the objects that cause interference at a particular location. Put another way, the parameters reported by UEs 115 may provide for crowdsourced information on a number of different objects at a particular location, and the crowdsourced information may then be used for estimating the location of other objects and for optimizing directional communications with other UEs. In some examples, the parameters may be transmitted by multiple UEs 115 to an RSU 160, and the RSU 160 may accumulate the information received and broadcast or transmit estimated communications parameters (e.g., beam directions) to various UEs 115 based on their respective locations (e.g., based on a zone ID). A UE 115 receiving such parameters may utilize the information to set its initial beams for communicating with other UEs at a particular location (which may be further adjusted through additional beam refinement procedures).

FIGS. 2A, 2B, 2C, and 2D illustrate examples of wireless communications systems 200 (e.g., wireless communications system 200-a, wireless communications system 200-b, wireless communications system 200-c, and wireless communications system 200-d) that supports cooperative full-duplex techniques for sidelink communications in accordance with one or more aspects of the present disclosure. In some examples, wireless communications system 200-a, wireless communications system 200-b, wireless communications system 200-c, and wireless communications system 200-d may implement aspects of wireless communications system 100. For example, wireless communications system 200-a, wireless communications system 200-b, wireless communications system 200-c, and wireless communications system 200-d may include one or more devices 205 in a wireless network (e.g., one or more wireless devices), where the device 205 may include, for example, a UEs 115. In some examples, the devices 205 may be an example of a vehicle or another device that supports wireless communications (e.g., over access links, over sidelinks, or both). In some examples, wireless communications system 200-a, wireless communications system 200-b, wireless communications system 200-c, and wireless communications system 200-d may include two or more wireless devices that communicate over sidelink communication links using full-duplex communication techniques in the presence of clutter objects. Accordingly, the wireless devices described herein may include, but are not limited to, a UE, a vehicular user equipment (V-UE), a vulnerable road user (VRU), a drone, a satellite, an MTC device, an IoT device, a relay, a repeater, or the like.

Figure 2A:
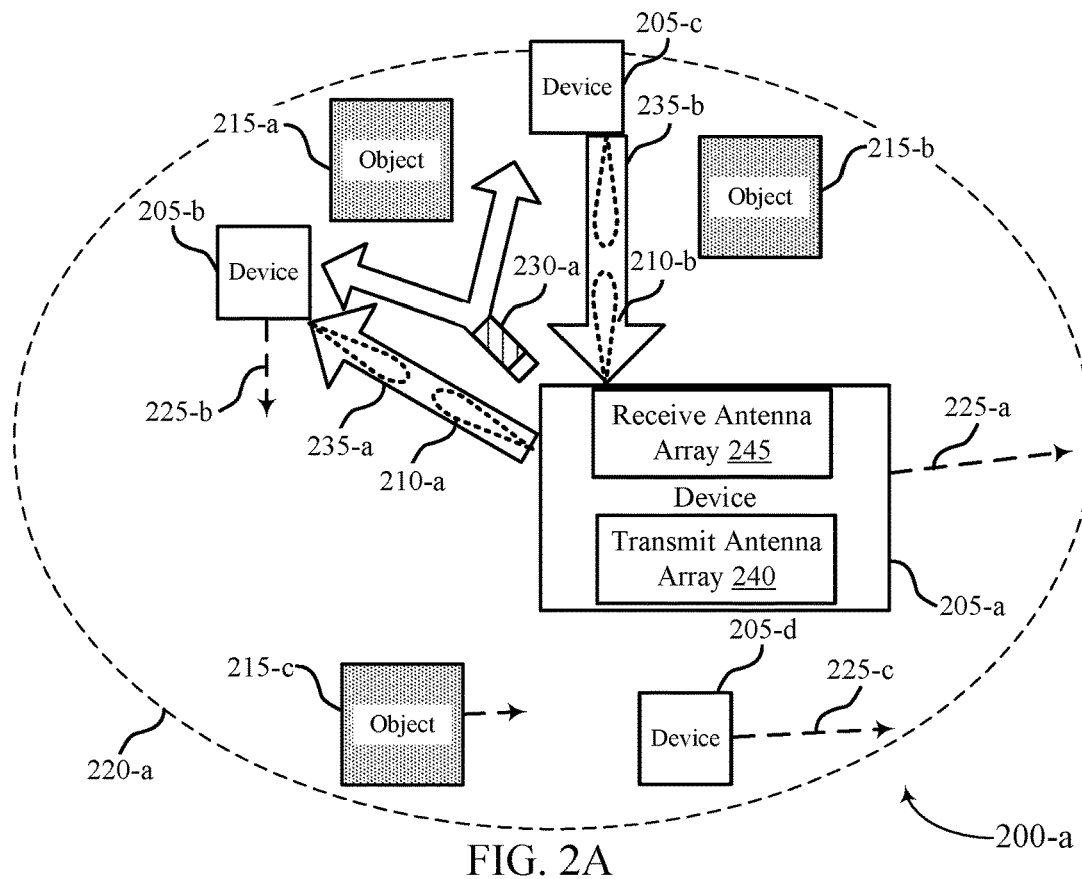
FIGS. 2A, 2B, 2C, and 2D illustrate examples of wireless communications systems that supports cooperative full-duplex techniques for sidelink communications in accordance with one or more aspects of the present disclosure.

As an example, FIG. 2A illustrates an example of a wireless communications system 200-a that supports cooperative full-duplex techniques for sidelink communications in accordance with one or more aspects of the present disclosure. In FIG. 2A, a first device 205-a may perform full-duplex communications over a sidelink 235-a with a second device 205-b and over a sidelink 235-b with a third device 205-c. For example, the first device 205-a may transmit one or more messages to the second device 205-b over the sidelink 235-a using a first directional beam 210-a. In addition, the first device 205-a may concurrently receive one or more messages from the third device 205-c over another sidelink 235-b using a second directional beam 210-b. As illustrated, the first directional beam 210-a may be an example of a transmit beam (e.g., generated by one or more antenna elements of a transmit antenna array 240 at the first device 205). The second directional beam 210-b may be an example of a receive beam (e.g., generated by one or more antenna elements of a receive antenna array 245 at the first device 205). Further, it is noted that each device may form respective transmit and receive beams in directions corresponding to one or more beam directions, which may be based on precoding vectors of an analog beamforming codebook.

The devices 205 (e.g., first device 205-a, second device 205-b, and third device 205-c) may communicate with each other in the presence of one or more objects 215 (e.g., clutter objects). Because at least first device 205-a may support full-duplex communications, the objects 215 may be a source of interference (e.g., echo or reflective interference) at the first device 205-a when communicating using full duplex communications. In particular, and as described in further detail with regard to FIG. 3, transmissions by the first device 205-a may reflect off of a first object 215-a and be detected at the receive antenna array of the first device 205-a (e.g., when the first device is concurrently receiving from the third device 205-c). Such interference may impact communications performance and/or signal quality at the first device 205-a. In some examples, the objects (e.g., the first object 215-a, a second object 215-b, and/or a third object 215-c) may be stationary or mobile. Additionally or alternatively, the objects 215 may be specific to some area 220 (e.g., area 220-a) or region. While the area 220 is illustrated as being circular in shape, the area 220 may have a different shape, including rectangular, hexagonal, or the like. In addition, an area 220 may correspond to a zone that may be identified by a zone ID. The area 220 may have different size or configuration, and the examples provided herein are provided for illustrative purposes and should not be considered limiting.

In some examples, one or more of the devices 205 may be moving with respect to each other and/or with respect to the one or more objects 215. As an example, the first device 205-a may be mobile and moving in some direction and at some speed, as illustrated by arrow 225-a. Likewise, the second device 205-b may also be mobile, but moving in a different direction and/or at a different speed than the first device 205-a, for example, as illustrated by arrow 225-b. Alternatively, the third device 205-c may be stationary. In some examples, velocity information, including speed and direction, of the respective devices 205 may be determined by the first device 205-a using signaling (e.g., safety messaging) from the other devices 205. In other cases, the first device 205-a may measure the speed and/or direction of the other devices 205.

The first device 205-a may also communicate with other devices using full-duplex communications. For example, the first device 205-a may communicate with other devices 205, such as fourth device 205-d, that are in different directions (e.g., using corresponding directional beams 210). Likewise, the fourth device 205-d may move in a same direction as the first device 205-a, but may have a different speed, as shown by arrow 225-c. Each device 205 of wireless communications system 200-a may be at a different location. For example, the first device 205-a may be at a first location, the second device 205-b may be at a second location different from the first location, and the third device 205-c may be at a third location different from the first and second locations. Likewise, the one or more objects 215 in the area 220 may be at respective locations. Each location may correspond to an absolute location, a set of GPS coordinates, a zone ID, or the like. In addition, the devices may be located and moving in different planes, where the first device 205-a, for example, may be a vehicle travelling on a road or highway, and the second device 205-b may be another vehicle travelling on an overpass or bridge that is on a different plane (e.g., above) the first device 205-a. As such, one or more of the objects 215 (such as objects 215-a or 215-c) may correspond to at least some portion of infrastructure that may reflect transmissions of a device 205.

Figure 2B:
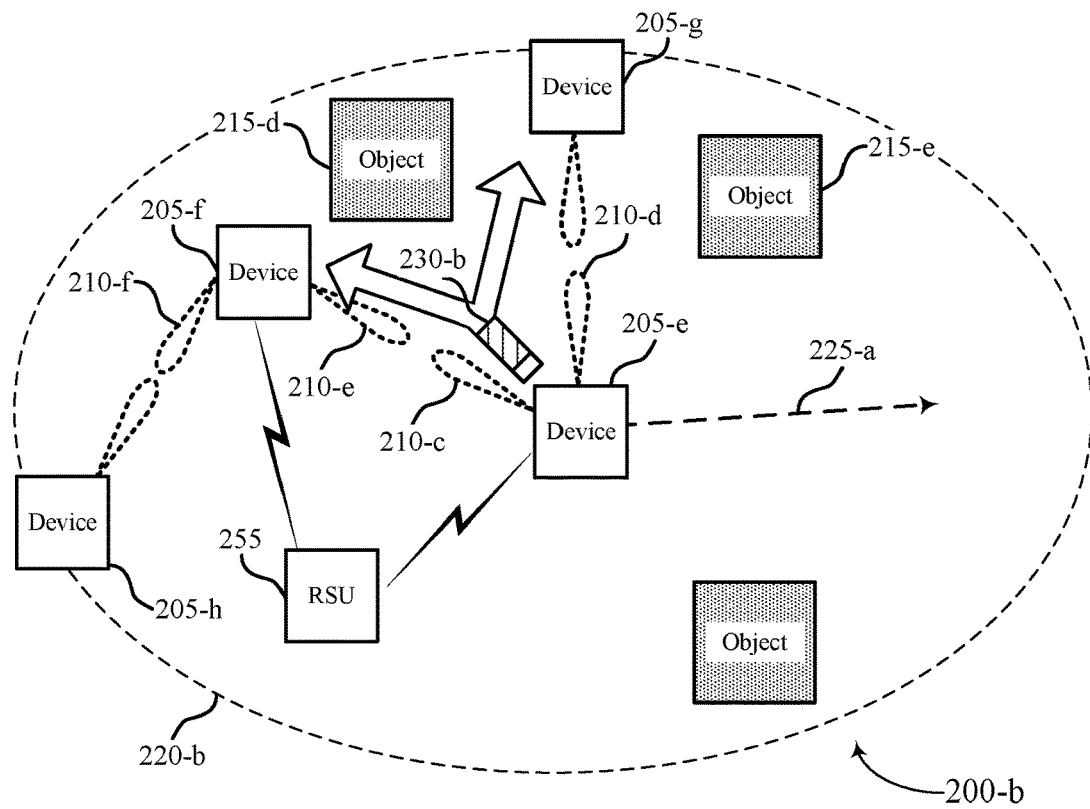

In another example, FIG. 2B may illustrate devices 205 (e.g., device 205-e, device 205-f, device 205-g, device 205-h) that may each perform full-duplex communication over sidelink communication links (e.g., using directional beams 210). Each device may be an example of a vehicle, and one or more of the devices 205 may communicate with an RSU 230, which may be an example of the RSU 160 described with reference to FIG. 1. In such cases, the device 205-e may communicate with other devices over a sidelink using full-duplex communications (e.g., using directional beams 210-c and 210-d), and device 205-f may communicate with the same or other devices 205 over a sidelink using full-duplex communications (e.g., using directional beams 210-e and 210-f). Here, the full-duplex communications may be performed in the presence of one or more objects 215 (e.g., objects 215-c and 215-e) that are within an area 220-b. In addition, each device 205 may exchange messaging with the RSU 230.

Figure 2C:
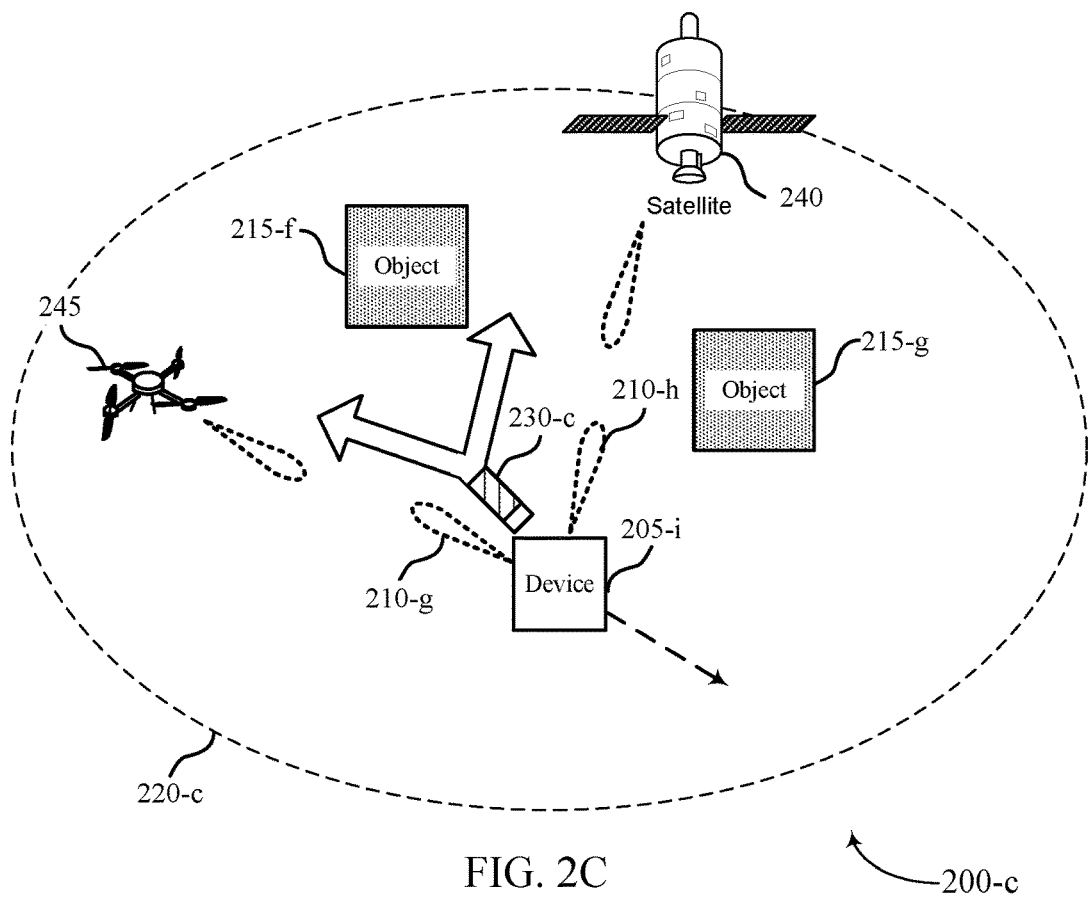

Additionally or alternatively, as illustrated by FIG. 2C, a device 205-i may perform full-duplex communications over the sidelinks with other devices, which may include a vehicle 245 (e.g., an unmanned aerial vehicle, a drone, an aircraft, etc.) or a satellite 240, to name a few examples. As such, device 205-i, aerial vehicle 245, and satellite 240 may be vertically displaced from each other. The device 205-*i* may communicate with the other devices (e.g., vehicle 245 and/or satellite 240) using directional beams 210-*g* and 210-*h*. Further, one or more objects 215 (e.g., objects 215-*f* and 215-*g*) may result in interference (e.g., reflective interference) at the device 205-*i* based on the full-duplex communications. Based on an altitude of the vehicle 245 and/or satellite 240, the objects may likewise be above the device 205-*i* within an area 220-*c*. For instance, the object 215-*f* may be an example of a building or other infrastructure above the device 205-*i*.

Figure 2D:
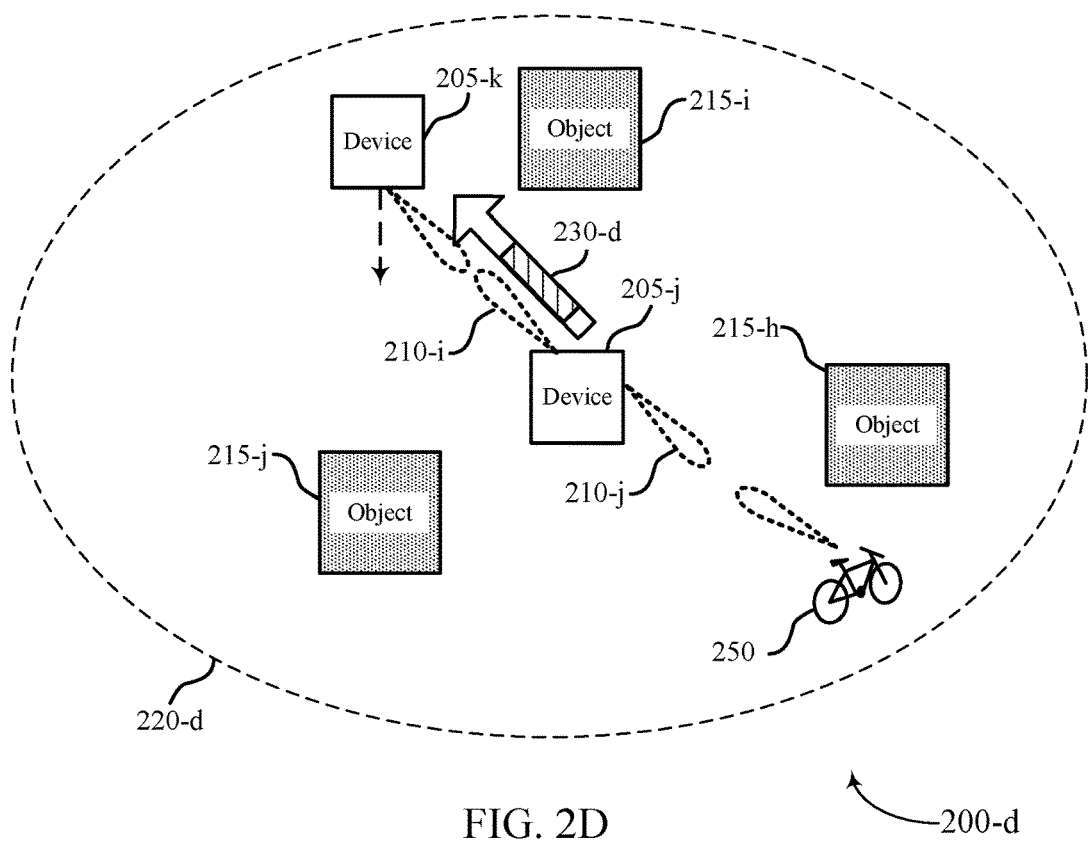

In another example, FIG. 2D, wireless communications system 200-*d* may illustrate devices 205 that may communicate with each other using full-duplex communications, where one or more of the devices 205 may include VRUs. As an example, a first device 205-*j* may use directional beams 210-*i* and 210-*j* for communicating with other devices 205, such as a second device 205-*k* and bicycle 245, within an area 220-*d*. The first device 205-*j* may be an example of a UE (e.g., a UE 115) carried by a pedestrian, whereas a second device 205-*k* may be a vehicle (e.g., moving in some direction with some speed). The bicycle 245 may have an onboard device that has the capability of performing wireless communications, or may be operated by a user having a UE. In any case, each device 205 and/or the bicycle 245 may communicate in the presence of one or more objects 215 (e.g., objects 215-*h*, 215-I, 215-*j*) within the area 220-*d*. The objects may cause reflective-type interference at one or more of the devices 205 communicating over sidelink using full-duplex communications. It is understood that the aforementioned examples are only some scenarios, environments, or arrangements in which objects 215 may cause interference at a full-duplex-capable device 205, and other examples, scenarios, environments, and arrangements are possible, but are not described herein for the sake of brevity.

As described herein, to account for the objects 215 at different locations (e.g., within an area 220), a device 205 (e.g., a wireless device) may report a set of parameters 230 that indicate the presence or absence of objects 215 that may cause interference at a full-duplex device 205. For example, two or more devices 205 supporting full-duplex communications may exchange information regarding objects 215 impacting communications performance at various locations. The information regarding the objects 215 may, in turn, be used for determining one or more communications parameters (e.g., for transmit and receive beams used in a particular location) that take into account any detected objects 215 that cause interference. The communications parameters may accordingly be configured to enable efficient communications in the presence of one or more objects 215 at multiple locations (e.g., as previously reported by one or more devices 205).

As an example, one or more devices 205 may transmit (e.g., broadcast, unicast, groupcast) a set of parameters 230 that indicate the presence or absence of nearby objects 215 causing interference, and the set of parameters 230 may be used by other devices 205. For instance, the parameters 230-*a*, 230-*b*, 230-*c*, and 230-*d* reported respectively by first devices device 205-*a*, device 205-*e*, device 205-*i*, device 205-*j*. may include a location of the first device 205 and the location of other devices 205 that are using full-duplex communications for exchanging messages with the first device 205. The location of the devices 205 may be an absolute location, GPS coordinates, coordinates of a global navigation satellite system (GNSS), a zone ID, or the like. In some cases, the zone ID may be mapped based on absolute GPS coordinates.

The set of parameters 230 may further include one or more beam directions corresponding to one or more directional beams 210 used by the first device 205 for communicating with the other devices 205. In such cases, the beam directions may be represented by a beam index corresponding to each directional beam 210. For instance, a first directional beam 210-*a* may have a first index, and a second directional beam 210-*b* may have a second index. The determined parameters may provide an indication of the indices used by the device 205 for communicating using full-duplex communications.

Additionally or alternatively, the set of parameters 230 may include main beam directions and directions of null interference beams at a transmit and/or receive antenna array with which the first wireless device is using to communicate with the other wireless devices. Here, the main beam direction information and direction information for null interference beams may be indicative of directional beams used for communications (e.g., based on an analog beamforming codebook) and directions of reflected signaling/interference (e.g., from the device's own transmission), respectively. In some examples, the main beam direction information and direction information for null interference beams may be denoted as an index of a codebook of the precoding vectors that the device 205 is using for communication with one or more other devices 205. In particular, and with reference to FIG. 2A, transmit main beam directions and directions for null interference beams may be denoted as an index of a codebook of the precoding vectors that first device 205-*a* uses for communication with second device 205-*b*. Similarly, another index may be used to denote the receive main beam directions and directions for null interference beams that the first device 205-*a* uses for communication with the third device 205-*c*.

In some examples, the parameters may also include velocity information that provides a speed and/or direction of the first wireless device and each of the other wireless devices (which may be based on signaling received from the other devices, measurements performed by the first wireless device, or the like). As described herein, the velocity information may include a speed and/or direction of other devices 205, which may be determined or inferred based on messaging from the devices 205 or through measurements performed by one or more devices 205.

Accordingly, a device 205 may report the various parameters that indicate its current communications conditions and parameters, which may in turn be used to identify a location of each of one or more objects 215 that potentially cause reflective-type interference at a full-duplex device 205 (e.g., interference from the device's own transmissions). This information may then be used to configure, modify, or adjust communications parameters (such as beam directions or other parameters) when communicating in an area corresponding to or near the one or more objects.

In some examples, a device 205 may be configured to transmit the set of parameters 230 periodically. The periodicity may be preconfigured or the periodicity may be dynamically configured. In some cases, the periodicity may be configured by a base station (e.g., a base station 105 described with reference to FIG. 1), the RSU 230, or another controller or device. In some examples, a device 205 may be configured to transmit the set of parameters 230 with some probability, p, where the probability may be configured so as to not overwhelm a channel with many wireless devices transmitting their sets of parameters at the same time. In some cases, the probability may also be configured based on a priority of the wireless device, which may depend on the full-duplex capability of the device 205. As an example, a device 205 may have relatively high capabilities (e.g., related to a configured processor of the device 205), and the configured probability may determine how frequently the device 205 reports the set of parameters 230 to other devices. Additionally or alternatively, the configured probability may be based on a speed of a device, which may also determine how often the parameters are reported by a device 205. In yet another example, information regarding objects 215 at some area 220 may have been previously gathered with some degree of accuracy, and a probability may be configured which enables a device 205 to report the set of parameters 230 less frequently, for example, based on the accurate information of objects 215 in the area 220.

In some examples, a first device 205 may determine communications parameters for transmit or receive beams (e.g., directional beams 210) based on the set of parameters 230 received from one or more other devices 205. In such cases, the first device 205 may receive a set of parameters 230 from another devices 205, and use the set of parameters 230 to determine the direction(s) for transmit and/or receive beams to a second device 205. The set of parameters 230 may indicate the location, presence, or absence of objects 215 within some location, and may be used to inform starting directions for one or more directional beams 210. For example, the first device 205 at a first location may determine the beam direction to be used for a communication with a second device 205 at a second location based at least on the transmission or reception beam directions used by a third wireless device at a third location (e.g., to communicate with a fourth device 205 at a forth location). In this example, the first device 205 may also receive, from a fifth device 205 at a fifth location, beam directions used by the fifth device 205 to communicate with a sixth device 205 at a sixth location. In some examples, the first device 205 may use sets of parameters (e.g., indicating object locations) from any number of other wireless devices 205 to determine beam directions to be used for communication with the second device 205.

As further described herein, an RSU 230 may provide a device 205 with information related to objects detected at a location, where the information may be based on synthesized information collected from one or more other devices 205. In such cases, the RSU 230 may provide information to devices 205 based on synthesized information from multiple devices 205 in a geographic location (e.g., an area 220). For example, one or more devices 205 may transmit, to the RSU 230, a set of parameters 230 including, but not limited to, location information, directional beam information, main beam information and information for null interference beams, and/or velocity information corresponding to full-duplex communications performed by each wireless device. That is, each device 205 may report the location of itself and the location other devices 205 with which it is performing full duplex communications. In addition, each device 205 may report transmit and receive main beam directions and directions for null interference beams along with the locations of the devices 205 with which it is performing full duplex communications. The device 205 may also report the speed and/or direction of movement for the devices with which it is performing full duplex communications.

In some examples, the RSU may gather the information from the one or more wireless devices and estimate the location of objects that cause reflective interference. In addition, the RSU may estimate communications parameters that take into account the detected objects. As such, the RSU may transmit (e.g., broadcast, unicast, groupcast) the information to wireless devices within its coverage area. Additionally or alternatively, the RSU may transmit the information based on a configuration received from a particular wireless device.

In some examples, the RSU 230 may transmit (broadcast, unicast, groupcast) the refined estimates based on the zone-ID. In such cases, there may be different parameter sets or subsets for different locations (zones). As an example, a first parameter set may correspond to a first zone (e.g., zone-ID1), whereas a second parameter set may correspond to a second zone (e.g., zone-ID2), and so forth. the first parameter set may include locations of nodes (or their zone-IDs) and their corresponding transmit, receive, main beam directions, and/or, directions for null interference beams denoted by beam indices and precoding vector indices in an analog beamforming codebook. Accordingly, the devices 205 receiving such information from the RSU 230 may identify the refined estimates and use the communications parameters based on the current location of the device 205.

Additionally or alternatively, a device 205 may configure the RSU 230 (e.g., via RRC signaling) to report refined communications parameters. For example, the RSU 230 may be configured to periodically report the parameters, report the parameters, or report the parameters based on some event trigger. The event trigger may include, for example, the first time a device 205 enters a particular location, where the information may be provided to the device 205 so that it is aware of any objects 215 nearby and the possible beam directions to use to avoid interference from those objects 215 (e.g., based on previously collected information). In another example, the event trigger may be based on increased network load or congestion (e.g., due to an increase in the number of devices 205 within an area 220), where the number of and location of objects 215 causing interference may dynamically change or be different from the object 215 previously detected/reported at an area 220. Other examples of event triggers are possible.

Figure 3:
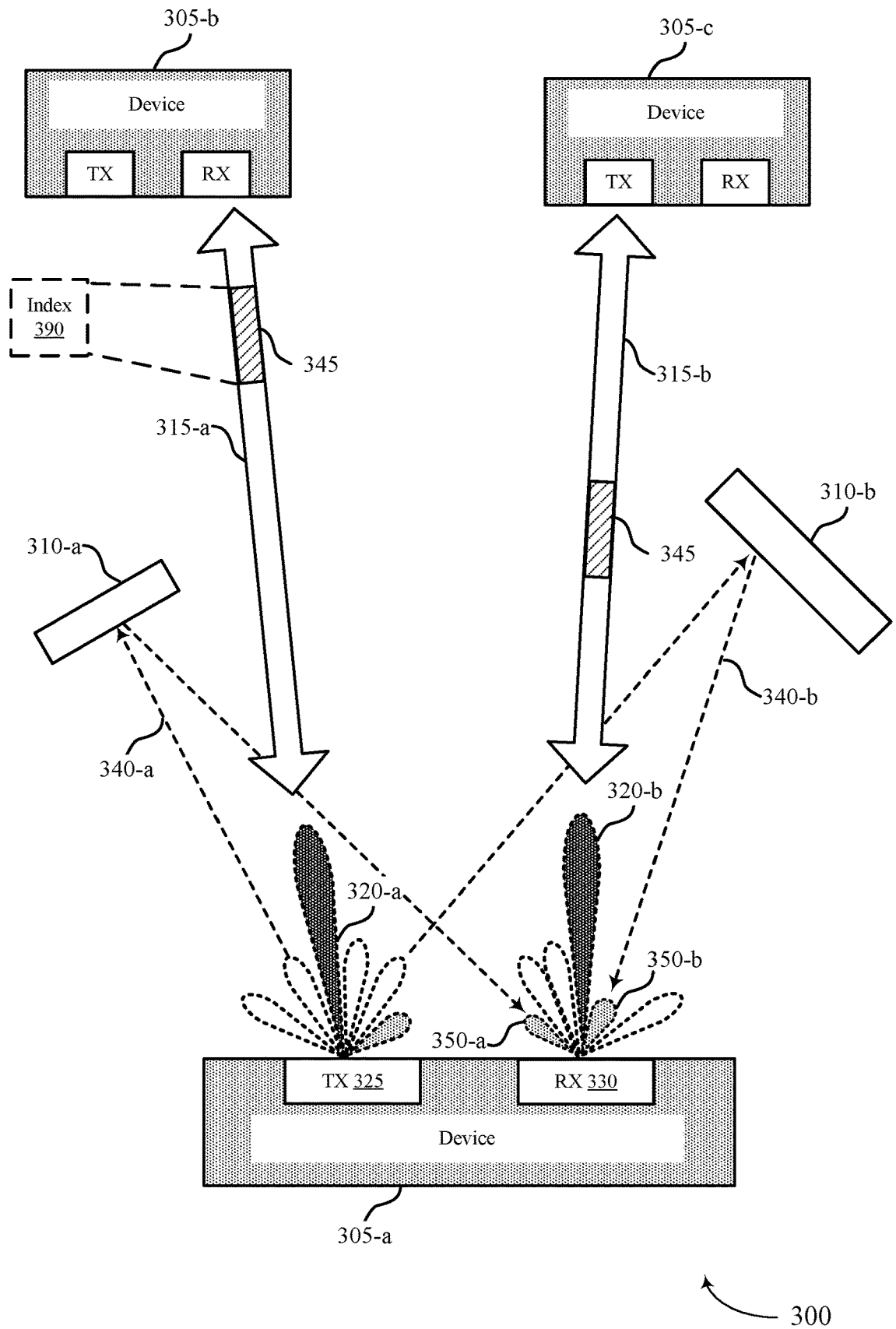
FIG. 3 illustrates an example of communications between devices in a system that supports cooperative full-duplex techniques for sidelink communications in accordance with one or more aspects of the present disclosure.

FIG. 3 illustrates an example of communications between devices in a system 300 that supports cooperative full-duplex techniques for sidelink communications in accordance with one or more aspects of the present disclosure. In some examples, the communications between devices in a system 300 may implement aspects of wireless communications systems 100 or wireless communications system 200. The system 300 may include two or more devices 305 (e.g., device 305-a, device 305-b, and device 305-c), which may perform full-duplex communications on the sidelink. In some cases, one or more objects 310 (e.g., objects 310-a and 310-b) may cause interference for one or more of the devices 305. In such cases, a device 305 may report a set of parameters 345 that identify the objects 310 that cause the interference. For example, the set of parameters 345 may include an index of As illustrated, a first device 305-a may communicate with a second device 305-b over a communication link 315-a, and the first device 305-a may communicate with a third device 305-c over another communication link 315-b. The communication links 315-a and 315-b may be an example of sidelinks (e.g., where both the first device 305-a, the second device 305-b, and the third device 305-c are UEs 115). In other examples, the communication links 315 may be examples of access links or other channels used for communications between devices 305.

When communicating with the second device 305-*b* and the third device 305-*c*, the first device may form directional beams 320 for transmitting and receiving messages to and from the other devices 305. As an example, the first device 305-*a* may use a first antenna array (e.g., transmit array, TX 325) to form one or more directional transmit beams (e.g., directional beam 320-*a*) in a first direction of the second device 305-*b*. The first direction of directional beam 320-*a* may be based at least in part on minimizing pathloss and maximizing SNR for communications between first device 305-*a* and second device 305-*b*. Likewise, the first device 305-*a* may concurrently use a second antenna array (e.g., receive array, RX 330) to form one or more directional receive beams (e.g., including directional beam 320-*b*) in a second direction of the third device 305-*c*. The second direction for the directional beam 320-*b* may be based at least in part on minimizing pathloss an maximizing SNR for communications between the first device 305-*a* and the third device 305-*c*.

In some cases, when transmitting to the second device 305-*b* and receiving from the third device 305-*c*, emissions 340-*a* and 340-*b* from the transmit array may propagate from the first device 305-*a*, which may be in one or more directions similar to or different from the first direction of the directional beam 320-*a*. Here, the emissions 340-*a* and 340-*b* may reflect off one or more of the objects 310 that are located near or around the first device 305-*a*. That is, the emission 340-*a* may interact with, and be reflected off, a first object 310-*a* (e.g., a clutter object). Similarly, another emission 340-*b* may encounter and reflect off a second object 310-*b*. The emissions 340-*a* and/or 340-*b* may be directional in nature.

As illustrated, if one or more of the emissions 340-*a* and 340-*b* is reflected back into the receiver array of the first device 305-*a*, then the signaling may cause interference with the reception of the communications from the third device 305-*c* received over directional beam 320-*b*. For example, emissions 340-*a* may be transmitted in a third direction such that the emissions 340-*a* may reflect off of object 310-*a* into the receiver of the first device 305-*a*, causing interference. Such interference may be identified at the first device 305-*a* by a null interference beam 350 at a receive antenna array of the first device 305-*a*. As such, the emission 340-*a* may result in a first null interference beam 350-*a* and the emission 340-*b* may result in a second null interference beam 350-*b*. However, each null interference beam 350 created by the emissions may be indicative of one or more of the objects 310 near or surrounding the first device 305-*a*.

Accordingly, the first device 305-*a* may transmit (e.g., over communication link 315) an indication of a set of parameters 345 that indicate a presence or absence of the objects 310. For example, the first device 305-*a* may transmit (e.g., broadcast, unicast, groupcast) the set of parameters 345 that indicate the presence or absence of the objects 310 causing interference, and the set of parameters 345 may be used by other devices (e.g., that are in the same location and may be similarly affected by the objects 310). The set of parameters 345 reported by the first device 305-*a* may include a location of the first device 305-*a*, the location of the second device 305-*b*, and the location of the third device 305-*c*. The set of parameters 345 may further include one or more beam directions corresponding to one or more directional beams 320-*a* used by the first device 305-*a* for communicating with the other devices 305. In addition, the set of parameters 345 may include main beam directions and directions of null interference beams at a transmit and/or receive antenna array with which the first wireless device is using to communicate with the other wireless devices. For example, transmit main beam directions and directions of null interference beams may be indicated by an index 390 of an analog beamforming codebook of the precoding vectors that the first device 305-*a* has been using for communication with the second device 305-*b*, where the main beam direction may correspond to a direction of the directional beam 320-*a*, and the directions of null interference beams may correspond to a direction of one or more null interference beams at transmit array (TX 325). Likewise, another index may be indicated for the receive main beam directions and directions of null interference beams that the first device 305-*a* uses for communications with the third device 305-*c*, where the main beam direction may correspond to a direction of the directional beam 320-*b*, and the directions of null interference beams may correspond to directions of one or more null interference beams 350-*a* and/or 350-*b* at the receive antenna array (RX 330).

In some examples, the set of parameters 345 may also include velocity information that provides a speed and/or direction of the first device 305-*a* as well as the speed and/or direction of each of the second device 305-*b* and the third device 305-*c* (which may be based on signaling received from the other devices, measurements performed by the first device 305-*a*, or the like). Accordingly, the first device 305-*a* may report the set of parameters 345 that indicate its current communications conditions and parameters, which may in turn be used to identify a location of each of one or more objects 310 that potentially cause reflective-type interference at a full-duplex device (e.g., interference from the device's own transmissions) in a same or similar location. This information may then be used to configure, modify, or adjust communications parameters (such as beam directions or other parameters) when communicating in an area corresponding to or near the one or more objects. For example, another device 305 may receive the set of parameters 345 from the first device 305-*a*, and may determine that is close to the location of the first device 305-*a* when it reported it set of parameters. Based on this proximity, the other device 305 may identify the beam directions to use for communicating in the presence of the same objects 310. In other examples, the other device 305 may receive communications parameters from an RSU based on the device's location, and the device 305 may determine the beam directions to use based on the information received from the RSU.

Figure 4:
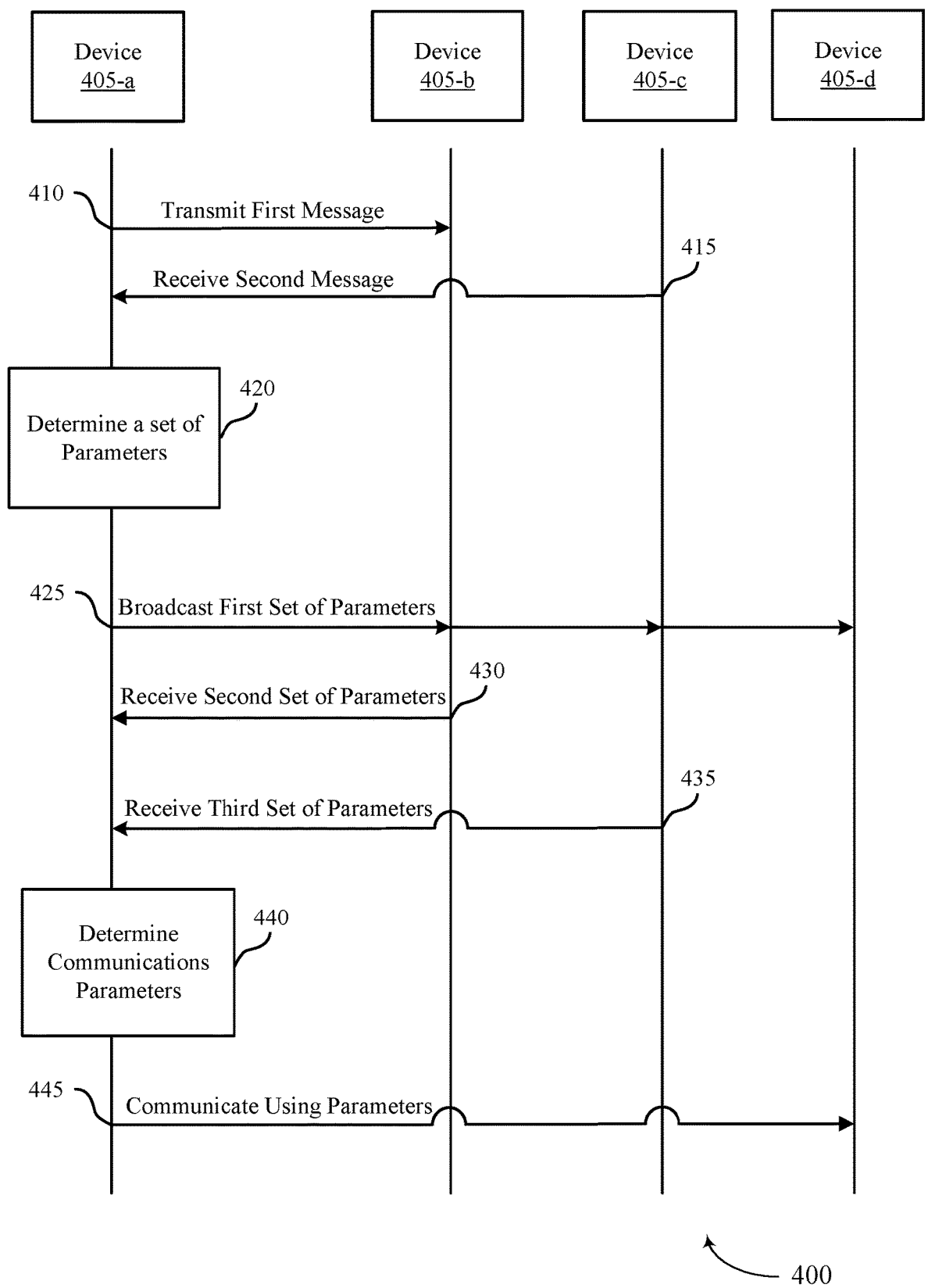
FIGS. 4 and 5 illustrate examples of process flows in a system that supports cooperative full-duplex techniques for sidelink communications in accordance with one or more aspects of the present disclosure.

FIG. 4 illustrates an example of a process flow 400 in a system that supports cooperative full-duplex techniques for sidelink communications in accordance with one or more aspects of the present disclosure. In some examples, process flow 400 may implement aspects of wireless communications systems 100 and 200. Process flow 400 may include a first device 405-*a*, a second device 405-*b*, a third device 405-*c*, and a fourth device 405-*d* which may be examples of UEs 115 or other devices, as described herein with reference to FIGS. 1 and 2. In the following description of the process flow 400, the operations between wireless devices 405 may be transmitted in a different order than the order shown. Certain operations may also be left out of the process flow 400, or other operations may be added to the process flow 400.

At 410, first device 405-*a* may transmit a first message over a first sidelink communication link to first device 405-*b* using a first beam direction. At 415, first device 405-*a* may receive a second message over a second sidelink communication link from third device 405-*c*, while concurrently transmitting. The second message may be received using a second directional beam different from the first directional beam.

At 420, the first device 405-a may determine, based on concurrently transmitting the first message and receiving the second message, a set of parameters that indicate a presence or absence of one or more objects that cause interference at the first device 405-a, the set of parameters including location information, or directional beam information, or antenna array information, or velocity information, or any combination thereof.

In some cases, determining the set of parameters may include determining the location information based on a first location of the first device 405-a, a second location of the second device 405-b, and a third location of the third device 405-c, the first location, the second location, and the third location being different locations. Additionally or alternatively the first device 405-a may determine the directional beam information based on the first directional beam and the second directional beam, the directional beam information including a first beam index corresponding to a first direction of the first directional beam, or a second beam index corresponding to a second direction of the second directional beam, or any combination thereof. In some cases, the determination of the set of parameters may include determining the antenna array information based on a transmit antenna array of the first device 405-a for transmitting the first message and a receive antenna array of the first device 405-a for receiving the second message. In such cases, the antenna array information including first direction information for a main transmit beam of the transmit antenna array, second direction information for one or more null interference beams at the transmit antenna array, third direction information for a main receive beam at the receive antenna array, and fourth direction information for one or more null interference beams at the receive antenna array.

In some cases, the first device 405-a may determine the velocity information based on a speed of the first device 405-a or a direction of the first device 405-a, or any combination thereof. Further, the first device 405-a may determine a speed of the second device 405-b or a direction of the second device 405-b, or any combination thereof, based on a message from the second device 405-b, or a measurement performed by the first device 405-a, or any combination thereof. The first device 405-a may also determine a speed of the third device 405-c or a direction of the third device 405-c, or any combination thereof, based on a message from the third device 405-c or a second measurement performed by the first device 405-a, or any combination thereof At 425, the first device 405-a may broadcast a fourth message including an indication of the set of parameters determined at 420. That is, the first device 405-a may report the information that indicates the presence or absence of objects that may cause interference at a location of the first device 405-a.

In some examples, at 430, the first device 405-a may receive from the second device 405-b, a first message including a second set of parameters that indicate a presence or absence of one or more objects that cause interference at a location of the second device 405-b. Similarly, at 435, the first device 405-a may receive from the fourth device 405-c, a second message including a third set of parameters that indicate a presence or absence of one or more objects that cause interference at a location of the third device 405-c. Here, the second set of parameters and the third set of parameters may each include location information, or directional beam information, or antenna array information, or velocity information, or any combination thereof.

At 440, the first device 405-a may determine a set of communications parameters based on the second set of parameters and the third set of parameters (e.g., from the other devices). For example, the communications parameters may include one or more initial beam directions for communicating within another area, zone, or location. At 445, the first device 405-a may communicate with the fourth device 405-d over a sidelink communication link using the set of communications parameters determined at 440.

Figure 5:
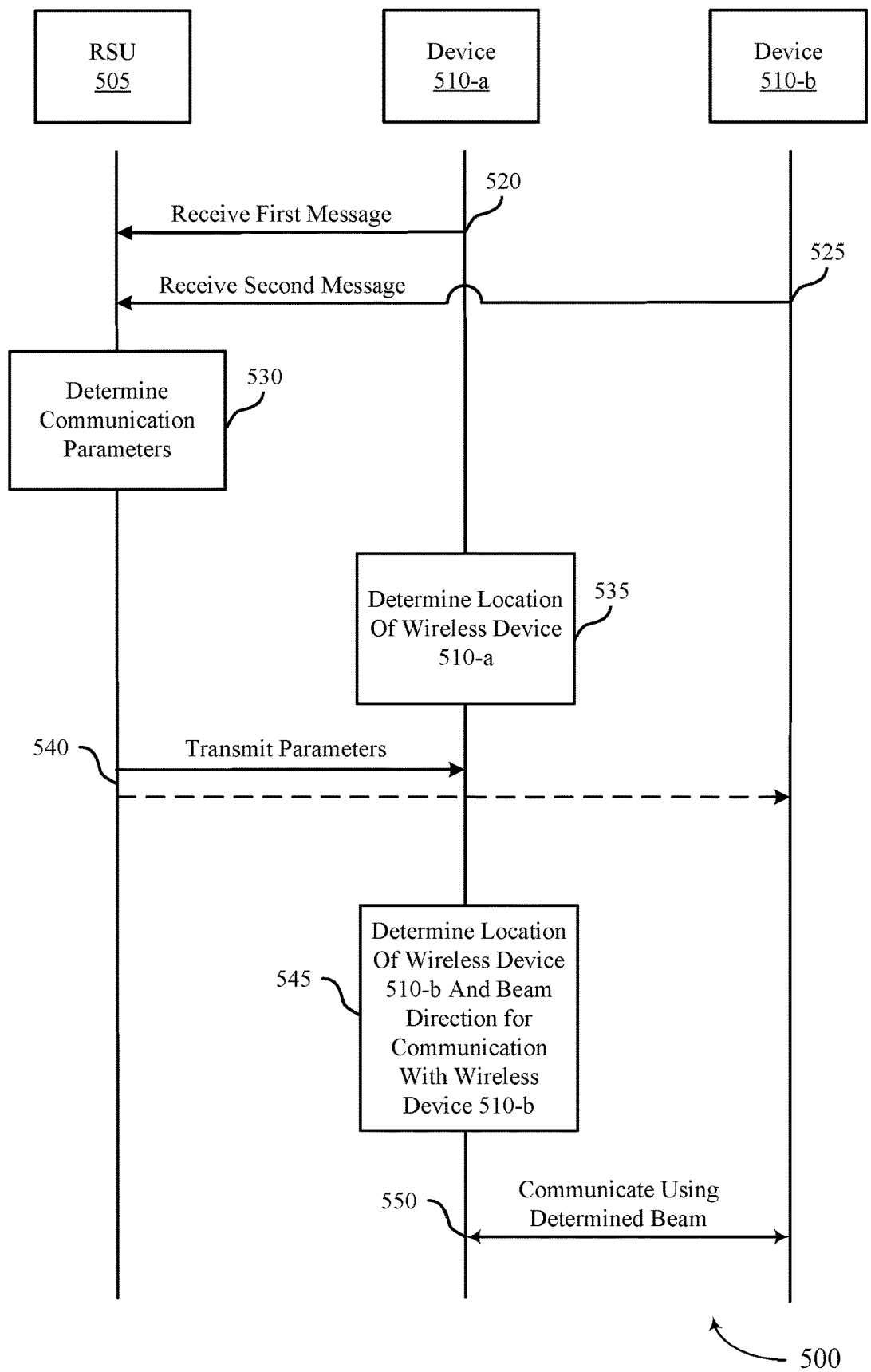

FIG. 5 illustrates an example of a process flow 500 in a system that supports cooperative full-duplex techniques for sidelink communications in accordance with one or more aspects of the present disclosure. In some examples, process flow 500 may implement aspects of wireless communications systems 100 and 200. In the following description of the process flow 500, the operations between wireless devices 510 (e.g., a first device 510-a and a second device 510-b) and RSU 505 may be transmitted in a different order than the order shown. Certain operations may also be left out of the process flow 400, or other operations may be added to the process flow 500. It is to be understood that while RSU 505 and wireless devices 510 are shown performing a number of the operations of process flow 500, any wireless device may perform the operations shown.

At 520, RSU 505 may receive, from wireless device 510-a, a first message including a first set of parameters that indicate a presence or absence of one or more objects that cause interference at a first location of the wireless device 510-a.

At 525, RSU 505 may receive, from wireless device 510-b, a second message including a second set of parameters that indicate a presence or absence of one or more objects that cause interference at second location of wireless device 510-b that is different from the first location, the first set of parameters and the second set of parameters each including location information, or directional beam information, or antenna array information, or velocity information, or any combination thereof.

At 530, RSU 505 may determine a set of communications parameters based on the first set of parameters and the second set of parameters, the set of communications parameters indicating at least one or more beam directions for communicating at one or more locations based on the presence or the absence of the one or more objects at the first location and the second location.

At 535, wireless device 510-a may determine the location wireless device 510-a. At 540, RSU 505 may broadcast a third message including an indication of the set of communications parameters to at least wireless device 510-a, or wireless device 510-b, or any combination thereof. Similarly, at 540, wireless device 510-a may receive, from the RSU 505, a message including a set of communications parameters that indicate a presence or absence of one or more objects that cause interference at the first location of wireless device 510-a.

At 545, wireless device 510-a may determine, based on the set of communications parameters and a second location of a wireless device 510-b, one or more beam directions for communication with at least wireless device 510-b. At 550, wireless device 510-a may communicate with wireless device 510-b over a sidelink communication link using a directional beam in accordance with the one or more beam directions.

Figure 6:
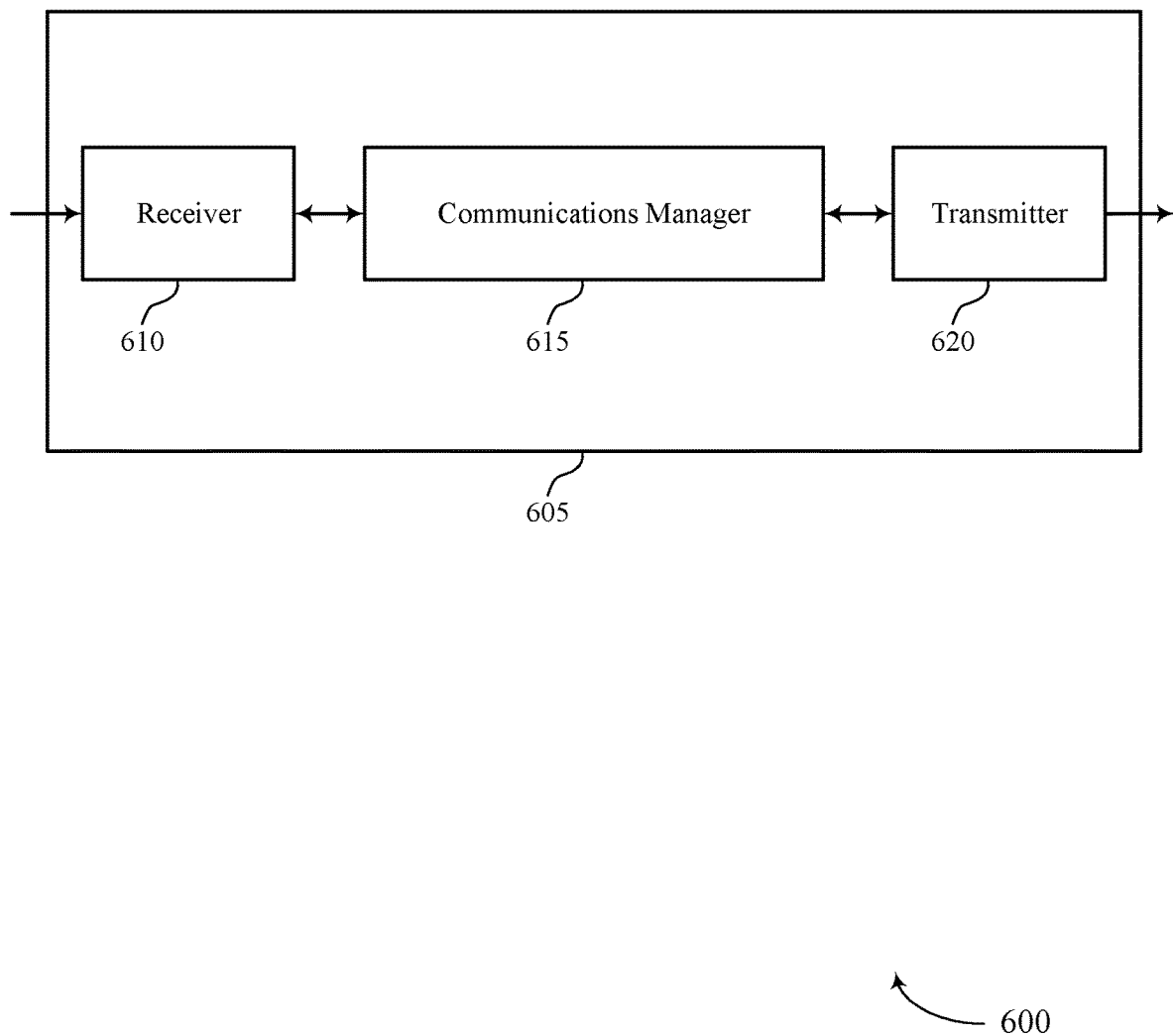
FIGS. 6 and 7 show block diagrams of devices that support cooperative full-duplex techniques for sidelink communications in accordance with one or more aspects of the present disclosure.

FIG. 6 shows a block diagram 600 of a device 605 that supports cooperative full-duplex techniques for sidelink communications in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may provide means for receiving information such as packets, user data, or control information associated with various information channels (e.g., control channels, data channels, and information related to cooperative full-duplex techniques for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may support wireless communications in accordance with examples as described herein. The communications manager 615 may be an example of means for performing various aspects of cooperative full-duplex techniques for sidelink communications as described herein. The communications manager 615, or its sub-components, may be implemented in hardware (e.g., in communications management circuitry). The circuitry may comprise that of a processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device.

In some examples, the communications manager 615 may be configured to perform various operations (e.g., receiving, determining, transmitting) using or otherwise in cooperation with the receiver 610, the transmitter 620, or both.

For example, the communications manager 615 may be configured to provide or support a means for transmitting a first message over a first sidelink communication link to a second device, the first message transmitted using a first directional beam. The communications manager 615 may also be configured to provide or support means for receiving, while concurrently transmitting, a second message over a second sidelink communication link from a third device, the second message received using a second directional beam different from the first directional beam. The communications manager 615 may also be configured to provide or support means for determining, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. The communications manager 615 may also be configured to provide or support means for broadcasting a fourth message including an indication of the set of parameters.

The communications manager 615 may also be configured to provide or support a means for receiving, from a second device, a first message including a first set of parameters that indicate a presence or absence of one or more objects that cause interference at a first location of the second device. The communications manager 615 may also be configured to provide or support means for receiving, from a third device, a second message including a second set of parameters that indicate a presence or absence of one or more objects that cause interference at second location of the third device that is different from the first location, the first set of parameters and the second set of parameters each including location information, or directional beam information, or antenna array information, or velocity information, or any combination thereof. The communications manager 615 may also be configured to provide or support means for determining a communications parameter based on the first set of parameters and the second set of parameters. The communications manager 615 may also be configured to provide or support means for communicating with a fourth device over a sidelink communication link using the communications parameter.

The communications manager 615 may also be configured to provide or support a means for determining a first location of the first device, receive, from an RSU, a message including a communications parameter that indicates a presence or absence of one or more objects that cause interference at the first location of the first device. The communications manager 615 may also be configured to provide or support means for determining, based on the communications parameter and a second location of a second device, one or more beam directions for communicating with at least the second device. The communications manager 615 may also be configured to provide or support means for communicating with the second device over a sidelink communication link using a directional beam in accordance with the one or more beam directions. The communications manager 615 may be an example of aspects of the communications manager 910 described herein.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may provide a means for transmitting signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential implementations. One implementation may allow the device 605 to determine appropriate transmit and receive beam directions for full-duplex sidelink communications in a cluttered environment. Such techniques may allow for beam selection to reduce self-interference due to reflection from clutter objects. Based on the beam selection techniques between the device 605 and other devices in the network, the device 605 may efficiently utilize time-frequency resources used for uplink transmissions and resources of the device 605.

As such, the device 605 may provide a means for increasing the likelihood determining transmission and reception beams to mitigate clutter interference and, accordingly, may communicate over the channel with a greater likelihood of successful communications. In some examples, based on a greater likelihood of successful communications, the device 605 may more efficiently power a processor or one or more processing units associated with beam determination and transmitting and receiving communications, which may enable the device to save power and increase battery life.

Figure 7:
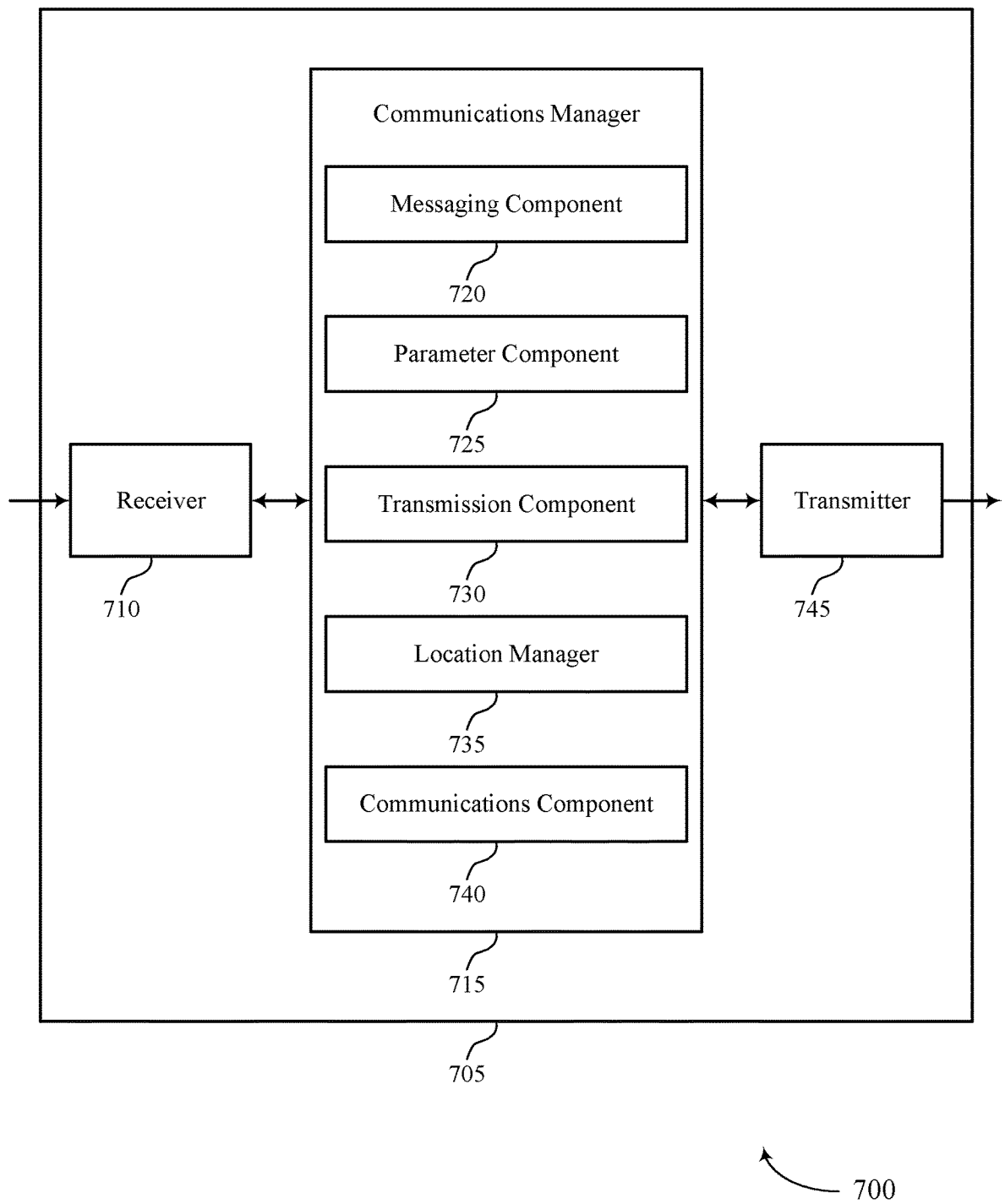

FIG. 7 shows a block diagram 700 of a device 705 that supports cooperative full-duplex techniques for sidelink communications in accordance with one or more aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may provide a means for receiving information such as packets, user data, or control information associated with various information channels (e.g., control channels, data channels, and information related to cooperative full-duplex techniques for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715, or components thereof, may be an example of means for performing various aspects of managing full-duplex communications as described herein. For example, the communications manager 715 may include a messaging component 720, a parameter component 725, a transmission component 730, a location manager 735, and a communications component 740. The communications manager 715 may be an example of aspects of the communications manager 910 described herein. In some examples, the communications manager 715 may be configured to perform various operations (e.g., receiving, determining, transmitting) using or otherwise in cooperation with the receiver 710, the transmitter 745, or both.

In some examples, the communications manager 715, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 715, or its sub-components, may be implemented in code (e.g., as communications management software or firmware) executed by a processor, or any combination thereof. If implemented in code executed by a processor, the functions of the communications manager 715, or its sub-components may be executed by a general-purpose processor, a DSP, an ASIC, an FPGA or other programmable logic device.

In some examples, the communications manager 715 may be configured to perform various operations (e.g., receiving, determining, transmitting) using or otherwise in cooperation with the receiver 710, the transmitter 745, or both.

The messaging component 720 may be configured to provide or support a means for transmitting a first message over a first sidelink communication link to a second device, the first message transmitted using a first directional beam. In some examples, the messaging component 720 may be configured to provide or support a means for receiving, while concurrently transmitting, a second message over a second sidelink communication link from a third device, the second message received using a second directional beam different from the first directional beam.

The parameter component 725 may be configured to provide or support a means for determining, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. The transmission component 730 may be configured to provide or support for a means for broadcasting or unicasting a fourth message including an indication of the set of parameters.

In some examples, the messaging component 720 may be configured to provide or support for a means for receiving, from a second device, a first message including a first set of parameters that indicate a presence or absence of one or more objects that cause interference at a first location of the second device. In some examples, the messaging component 720 may be configured to provide or support for a means for receiving, from a third device, a second message including a second set of parameters that indicate a presence or absence of one or more objects that cause interference at second location of the third device that is different from the first location. In some cases, the first set of parameters and the second set of parameters each including location information, or directional beam information, or antenna array information, or velocity information, or any combination thereof.

The parameter component 725 may be configured to provide or support a means for determining a communications parameter based on the first set of parameters and the second set of parameters. The transmission component 730 may be configured to provide or support a means for communicating with a fourth device over a sidelink communication link using the communications parameter.

The location manager 735 may be configured to provide or support a means for determining a first location of the first device. The messaging component 720 may be configured to provide or support a means for receiving, from an RSU, a message including a communications parameter that indicates a presence or absence of one or more objects that cause interference at the first location of the first device.

The communications component 740 may be configured to provide or support a means for determining, based on the communications parameter and a second location of a second device, one or more beam directions for communicating with at least the second device and communicate with the second device over a sidelink communication link using a directional beam in accordance with the one or more beam directions.

The transmitter 745 may be configured to provide or support a means for transmitting signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
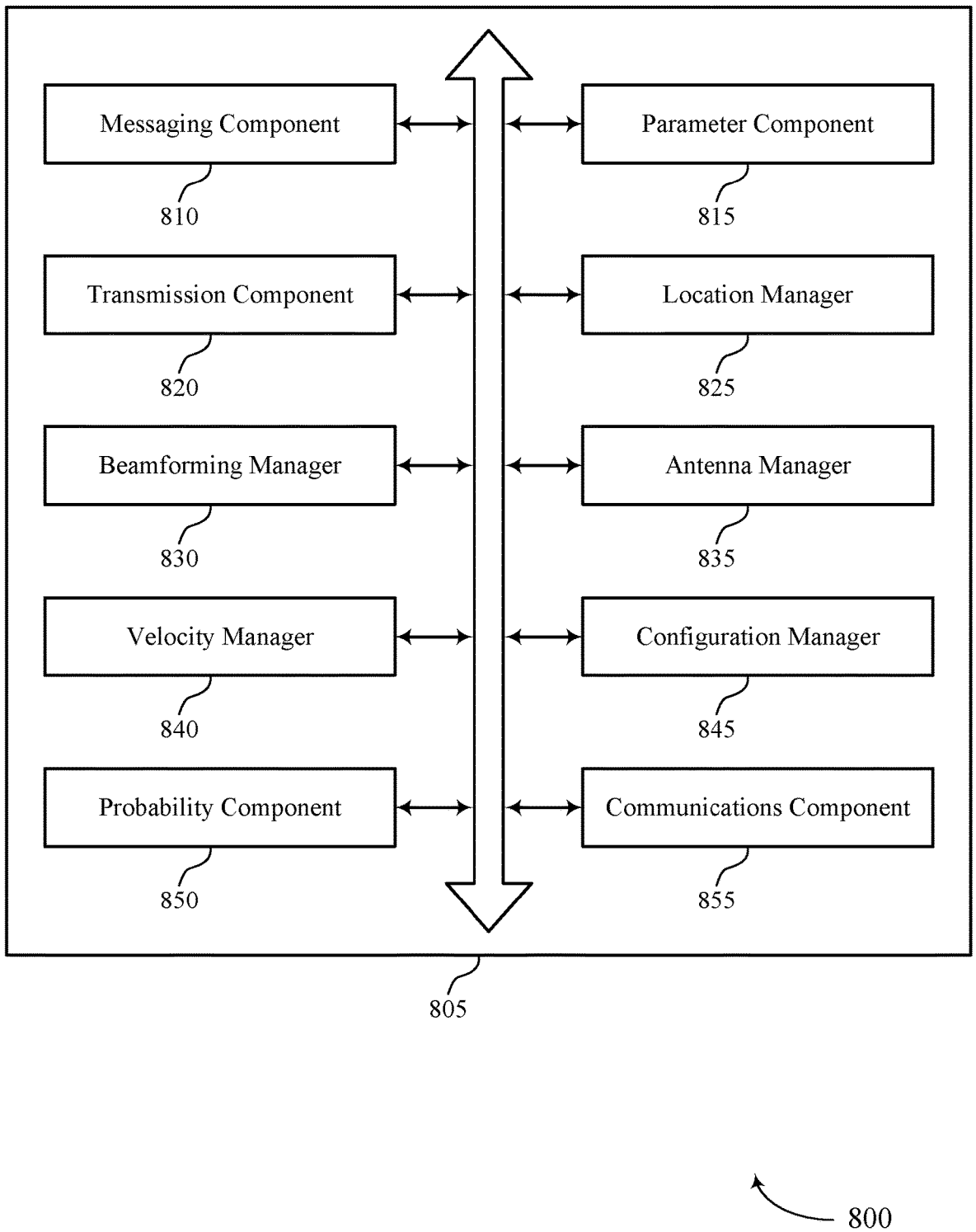
FIG. 8 shows a block diagram of a communications manager that supports cooperative full-duplex techniques for sidelink communications in accordance with one or more aspects of the present disclosure.

FIG. 8 shows a block diagram 800 of a communications manager 805 that supports cooperative full-duplex techniques for sidelink communications in accordance with one or more aspects of the present disclosure. The communications manager 805 may be an example of aspects of a communications manager 615, a communications manager 715, or a communications manager 910 described herein. The communications manager 805, or various components thereof, may be an example of means for performing various aspects of full-duplex communications, such as the reporting of various parameters. The communications manager 805 may include a messaging component 810, a parameter component 815, a transmission component 820, a location manager 825, a beamforming manager 830, an antenna manager 835, a velocity manager 840, a configuration manager 845, a probability component 850, and a communications component 855. Each of these modules may provide a means for communicating, directly or indirectly, with one another (e.g., via one or more buses).

The messaging component 810 may be configured to provide or support a means for transmitting a first message over a first sidelink communication link to a second device, the first message transmitted using a first directional beam. In some examples, the messaging component 810 The communications manager 805 a means for receiving, while concurrently transmitting, a second message over a second sidelink communication link from a third device, the second message received using a second directional beam different from the first directional beam.

In some examples, the messaging component 810 may be configured to provide or support a means for receiving, from a second device, a first message including a first set of parameters that indicate a presence or absence of one or more objects that cause interference at a first location of the second device. In some examples, the messaging component 810 may be configured to provide or support a means for receiving, from a third device, a second message including a second set of parameters that indicate a presence or absence of one or more objects that cause interference at second location of the third device that is different from the first location, the first set of parameters and the second set of parameters each including location information, or directional beam information, or antenna array information, or velocity information, or any combination thereof.

In some examples, the messaging component 810 may be configured to provide or support a means for receiving, from an RSU, a message including a communications parameter that indicates a presence or absence of one or more objects that cause interference at the first location of the first device. The parameter component 815 may be configured to provide or support a means for determining, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof.

In some examples, the parameter component 815 may be configured to provide or support a means for determining a communications parameter based on the first set of parameters and the second set of parameters. In some examples, the parameter component 815 may be configured to provide or support a means for determining the communications parameter based on a proximity of the third location to the first location, or a proximity of the third location to the second location, or any combination thereof. In some cases, the one or more objects that cause interference at the first device include objects that reflect signaling of the first device back to the first device based on the first device concurrently transmitting and receiving. In some cases, the communications parameter is based on one or more beam directions used by the second device at the first location, or one or more beam directions used by the third device at the second location, or any combination thereof.

The transmission component 820 may be configured to provide or support a means for unicasting or broadcasting a fourth message including an indication of the set of parameters. In some examples, the transmission component 820 may be configured to provide or support a means for communicating with a fourth device over a sidelink communication link using the communications parameter.

The location manager 825 may be configured to provide or support a means for determining a first location of the first device. In some examples, determining the location information is based on a first location of the first device, a second location of the second device, and a third location of the third device, the first location, the second location, and the third location being different locations, where the fourth message includes an indication of the first location, or the second location, or the third location, or any combination thereof.

In some examples, the location manager 825 may be configured to provide or support a means for determining a third location of the first device for communicating with the fourth device, the third location being different from the first location and the second location. In some cases, the location information includes GPS coordinates, or an absolute location, or a zone ID, or any combination thereof, for each of the first location, the second location, and the third location. Further, the first location, the second location, and the third location each correspond to different GPS coordinates, or different absolute locations, or different zone IDs, or any combination thereof. In some cases, the first location of the first device includes a sublocation from a set of two or more sublocations, and where the second location of the second device includes a second sublocation from the set of two or more sublocations, the communications parameter being associated with the first sublocation.

The communications component 855 may be configured to provide or support a means for determining, based on the communications parameter and a second location of a second device, one or more beam directions for communicating with at least the second device. In some examples, the communications component 855 may be configured to provide or support a means for communicating with the second device over a sidelink communication link using a directional beam in accordance with the one or more beam directions. In some examples, the communications component 855 may be configured to provide or support a means for receiving, from an RSU, a fifth message including a communications parameter that indicates a presence or absence of one or more additional objects that cause interference at a location of the first device.

In some examples, the communications component 855 may be configured to provide or support a means for determining, from the communications parameter, a transmit direction for a first directional beam, or a receive direction for a second directional beam, or a combination thereof, for a device communicating at the first location of the first device, where the one or more beam directions are based on the transmit direction, or the receive direction, or a combination thereof. In some cases, the communications parameter includes an indication of one or more transmit directions or one or more receive directions, or any combination thereof, that are based on the one or more objects that cause interference at the location.

The beamforming manager 830 may be configured to provide or support a means for determining the directional beam information based on the first directional beam and the second directional beam, the directional beam information including a first beam index corresponding to a first direction of the first directional beam, or a second beam index corresponding to a second direction of the second directional beam, or any combination thereof, where the fourth message includes an indication of the first beam index, or the second beam index, or any combination thereof. In some examples, the beamforming manager 830 may be configured to provide or support a means for determining one or more beam directions for communicating with a fourth device over a third sidelink communication link based on the communications parameter.

In some examples, the beamforming manager 830 may be configured to provide or support a means for determining one or more beam directions for communicating with at least the fourth device based on the first set of parameters and the second set of parameters, where the fourth device is located at a fourth location different from the first location, the second location, and the third location. In some examples, the beamforming manager 830 may be configured to provide or support a means for performing one or more beam refinement procedures for modifying the one or more beam directions for communicating with at least the second device.

The antenna manager 835 may be configured to provide or support determining the antenna array information based on a transmit antenna array of the first device for transmitting the first message and a receive antenna array of the first device for receiving the second message, the antenna array information including first direction information for a main transmit beam of the transmit antenna array, second direction information for one or more null interference beams at the transmit antenna array, third direction information for a main receive beam at the receive antenna array, and fourth direction information for one or more null interference beams at the receive antenna array. In some cases, the fourth message includes an indication of the first direction information, or the second direction information, or the third direction information, or the fourth direction information, or any combination thereof. In some cases, the first direction information and the second direction information each include an index of a codebook for transmitting the first message, the third direction information and the fourth direction information each including an index of a codebook for receiving the second message.

The velocity manager 840 may be configured to provide or support a means for determining the velocity information based on a speed of the first device or a direction of the first device, or any combination thereof, the fourth message including an indication of the speed of the first device or the direction of the first device, or any combination thereof. In some examples, the velocity manager 840 may be configured to provide or support a means for determining a speed of the second device or a direction of the second device, or any combination thereof, based on a message from the second device, or a first measurement performed by the first device, or any combination thereof.

In some examples, the velocity manager 840 may be configured to provide or support a means for determining a speed of a third device or a direction of the third device, or any combination thereof, based on a message from the third device or a second measurement performed by the first device, or any combination thereof, the fourth message including an indication of the speed of the second device, or the direction of the second device, or the speed of the third device, or the direction of the third device, or any combination thereof.

The configuration manager 845 may be configured to provide or support a means for determining a configuration for broadcasting the fourth message including the indication of the set of parameters, the configuration including a periodicity for broadcasting the fourth message or a dynamic instruction to broadcast the fourth message, or any combination thereof, where the fourth message is broadcast in accordance with the periodicity or the dynamic instruction, or any combination thereof. In some examples, the configuration manager 845 may be configured to provide or support a means for receiving an indication of the configuration from an RSU, or a base station, or any combination thereof.

In some examples, the configuration manager 845 may be configured to provide or support a means for transmitting, to the road side unit, a configuration for broadcasting, or unicasting, or groupcasting, or any combination thereof, the communications parameter, the configuration indicating a periodicity for broadcasting the communications parameter, one or more event triggers for broadcasting the communications parameter, a dynamic request for the communications parameter, or any combination thereof, where receiving the fifth message is based on the configuration.

In some examples, the configuration manager 845 may be configured to provide or support a means for transmitting, to the road side unit, a configuration for broadcasting, or unicasting, or groupcasting, or any combination thereof, the communications parameter, the configuration indicating a periodicity for transmitting the communications parameter, one or more event triggers for transmitting the communications parameter, a dynamic request for the communications parameter, or any combination thereof, where receiving the message is based on the configuration. In some cases, the periodicity for broadcasting the fourth message is based on a capability of the first device or a speed of the first device, or any combination thereof.

The probability component 850 may be configured to provide or support a means for determining, from the configuration, a probability value associated with broadcasting the set of parameters, where broadcasting the fourth message is based on the probability value.

Figure 9:
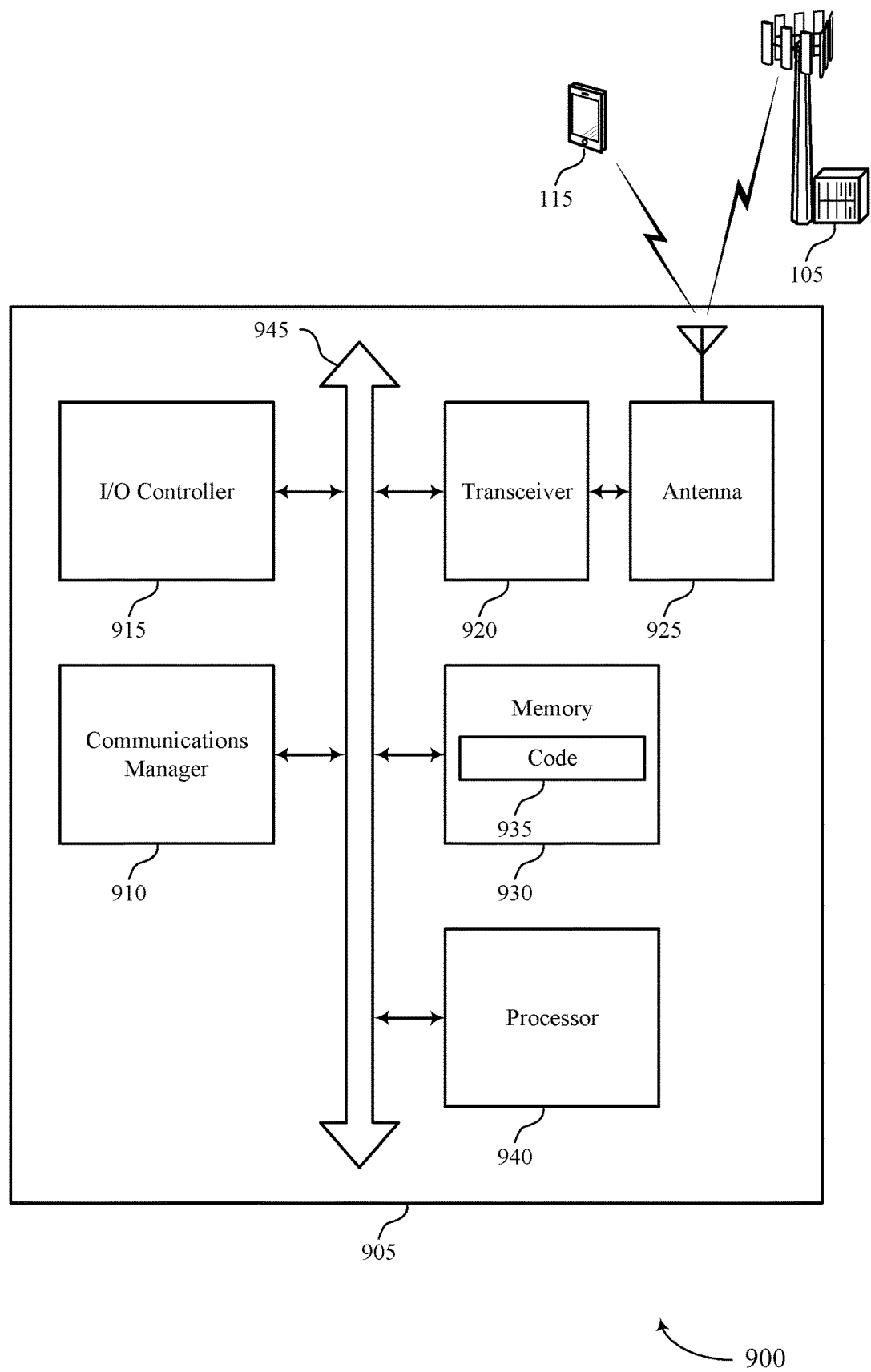
FIG. 9 shows a diagram of a system including a device that supports cooperative full-duplex techniques for sidelink communications in accordance with one or more aspects of the present disclosure.

FIG. 9 shows a diagram of a system 900 including a device 905 that supports cooperative full-duplex techniques for sidelink communications in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may be configured to provide or support a means for transmitting a first message over a first sidelink communication link to a second device, the first message transmitted using a first directional beam. The communications manager 910 may be configured to provide or support a means for receiving, while concurrently transmitting, a second message over a second sidelink communication link from a third device, the second message received using a second directional beam different from the first directional beam. The communications manager 910 may be configured to provide or support a means for determining, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. The communications manager 910 may be configured to provide or support a means for broadcasting a fourth message including an indication of the set of parameters.

The communications manager 910 may also be configured to provide or support a means for receiving, from a second device, a first message including a first set of parameters that indicate a presence or absence of one or more objects that cause interference at a first location of the second device. The communications manager 910 may be configured to provide or support a means for receiving, from a third device, a second message including a second set of parameters that indicate a presence or absence of one or more objects that cause interference at second location of the third device that is different from the first location, the first set of parameters and the second set of parameters each including location information, or directional beam information, or antenna array information, or velocity information, or any combination thereof. The communications manager 910 may be configured to provide or support a means for determining a communications parameter based on the first set of parameters and the second set of parameters. The communications manager 910 may be configured to provide or support a means for communicating with a fourth device over a sidelink communication link using the communications parameter.

The communications manager 910 may also be configured to provide or support a means for determining a first location of the first device. The communications manager 910 may be configured to provide or support a means for receiving, from an RSU, a message including a communications parameter that indicates a presence or absence of one or more objects that cause interference at the first location of the first device. The communications manager 910 may be configured to provide or support a means for determining, based on the communications parameter and a second location of a second device, one or more beam directions for communicating with at least the second device. The communications manager 910 may be configured to provide or support a means for communicating with the second device over a sidelink communication link using a directional beam in accordance with the one or more beam directions.

In some examples, the communications manager 910 may be configured to perform various operations (e.g., receiving, determining, transmitting) using or otherwise in cooperation with the transceiver 920, the one or more antennas 925, or any combination thereof. Although the communications manager 910 is illustrated as a separate component, in some examples, one or more functions described with reference to the communications manager 910 may be supported by or performed by the processor 940, the memory 930 the code 935, or any combination thereof. For example, the code 935 may include instructions executable by the processor 940 to cause the device 905 to perform various aspects of cooperative full-duplex techniques for sidelink communications described herein, or the processor 940 and the memory 930 may be otherwise configured to perform or support such operations.

The I/O controller 915 may provide a means for managing input and output signals for the device 905. The I/O controller 915 may also provide a means for managing peripherals not integrated into the device 905. In some cases, the I/O controller 915 may represent a physical connection or port to an external peripheral. In some cases, the I/O controller 915 may provide a means for utilizing an operating system such as iOS®, ANDROID®, MS-DOS®, MS-WINDOWS®, OS/2®, UNIX®, LINUX®, or another known operating system. In other cases, the I/O controller 915 may provide a means for representing or interacting with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

In some cases, the wireless device may include a single antenna 925. However, in some cases the device may have more than one antenna 925, which may have the capability of concurrently transmitting or receiving multiple wireless transmissions. The transceiver 920 may provide a means for communicating bi-directionally, via one or more antennas, wired, or wireless links as described herein. For example, the transceiver 920 may provide a means for representing a wireless transceiver and may communicate bi-directionally with another wireless transceiver. The transceiver 920 may also include a modem to modulate the packets and provide the modulated packets to the antennas for transmission, and to demodulate packets received from the antennas.

The memory 930 may include random-access memory (RAM) and read-only memory (ROM). The memory 930 may provide a means for storing computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to provide a means for performing various functions (e.g., functions or tasks supporting cooperative full-duplex techniques for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
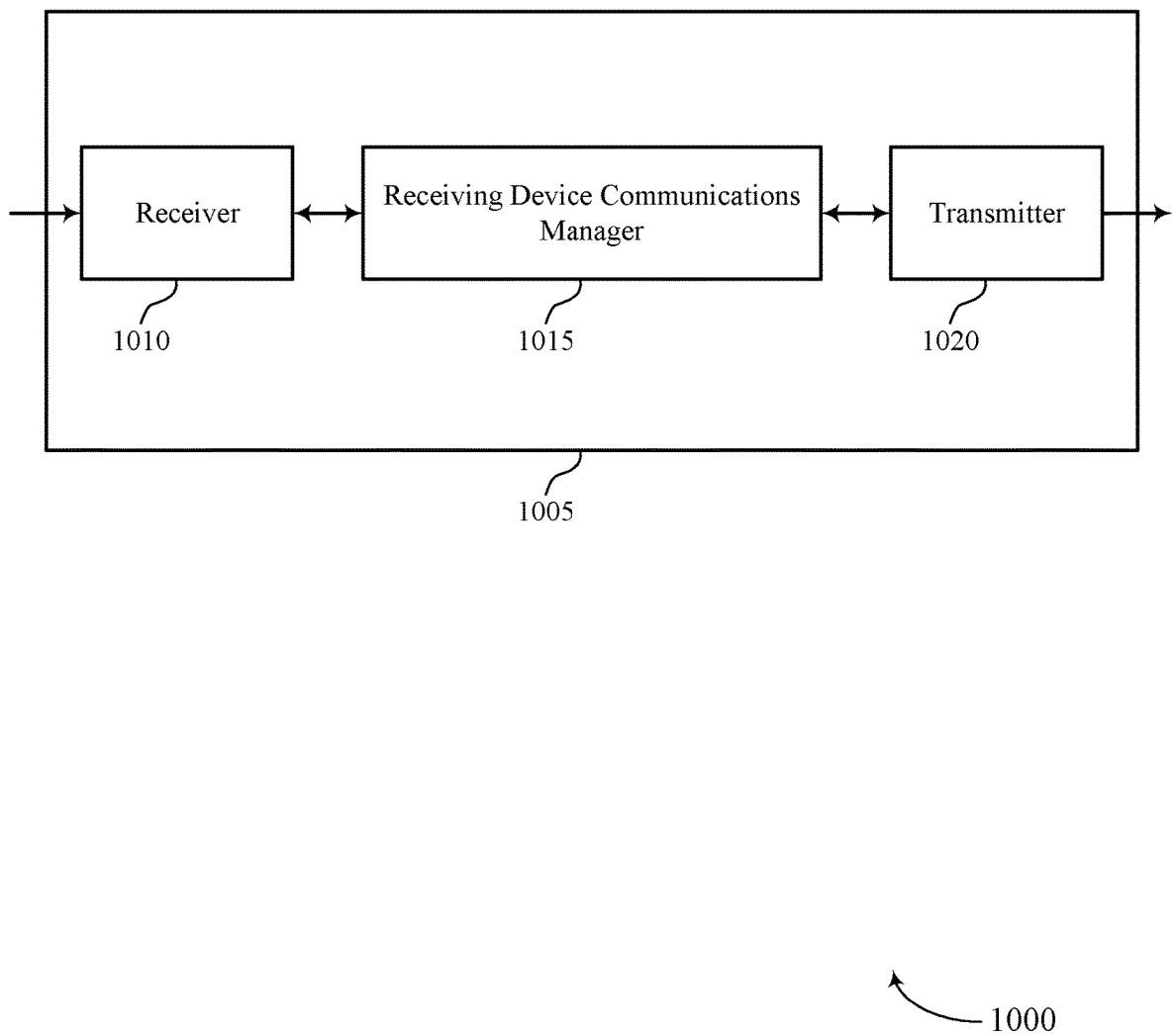
FIGS. 10 and 11 show block diagrams of devices that support cooperative full-duplex techniques for sidelink communications in accordance with one or more aspects of the present disclosure.

FIG. 10 shows a block diagram 1000 of a device 1005 that supports cooperative full-duplex techniques for sidelink communications in accordance with one or more aspects of the present disclosure. The device 1005 may be an example of aspects of a device, such as a receiving device, an RSU, or other wireless device, as described herein. The device 1005 may include a receiver 1010, a communications manager 1015, and a transmitter 1020. The device 1005 may also include a processor. Each of these components may be in communication with one another (e.g., via one or more buses).

The receiver 1010 may provide a means for receiving information such as packets, user data, or control information associated with various information channels (e.g., control channels, data channels, and information related to cooperative full-duplex techniques for sidelink communications, etc.). Information may be passed on to other components of the device 1005. The receiver 1010 may be an example of aspects of the transceiver 1320 described with reference to FIG. 13. The receiver 1010 may provide a means for utilizing a single antenna or a set of antennas.

The receiving device communications manager 1015 may be an example of means for performing various aspects of cooperative full-duplex techniques for sidelink communications as described herein. The receiving device communications manager 1015 may be configured to provide or support a means for receiving, from a first device in a wireless network, a first message including a first set of parameters that indicate a presence or absence of one or more objects that cause interference at a first location of the first device. The receiving device communications manager 1015 may be configured to provide or support a means for receiving, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof. The receiving device communications manager 1015 may be configured to provide or support a means for determining a communications parameter based on the first set of parameters and the second set of parameters, the communications parameter indicating at least one or more beam directions for communicating at a location based on the presence or the absence of the one or more objects at the first location and the second location. The receiving device communications manager 1015 may be configured to provide or support a means for transmitting a third message including an indication of the communications parameter to at least the first device, or the second device, or any combination thereof. The receiving device communications manager 1015 may be an example of aspects of the receiving device communications manager 1310 described herein.

The receiving device communications manager 1015 may be an example of means for performing various aspects of full-duplex communications as described herein. The receiving device communications manager 1015, or its sub-components, may be implemented in hardware (e.g., in communications management circuitry). The circuitry may comprise that of a processor, a DSP, an ASIC, an FPGA or other programmable logic device, discrete gate or transistor logic, discrete hardware components, or any combination thereof designed to perform the functions described in the present disclosure.

In another implementation, the receiving device communications manager 1015, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the receiving device communications manager 1015 may be configured to perform various operations (e.g., receiving, determining, transmitting) using or otherwise in cooperation with the receiver 1010, the transmitter 1020, or both.

The receiving device communications manager 1015, or its sub-components, may be physically located at various positions, including being distributed such that portions of functions are implemented at different physical locations by one or more physical components. In some examples, the receiving device communications manager 1015, or its sub-components, may be a separate and distinct component in accordance with various aspects of the present disclosure. In some examples, the receiving device communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may provide a means for transmitting signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may provide a means for utilizing a single antenna or a set of antennas.

Figure 11:
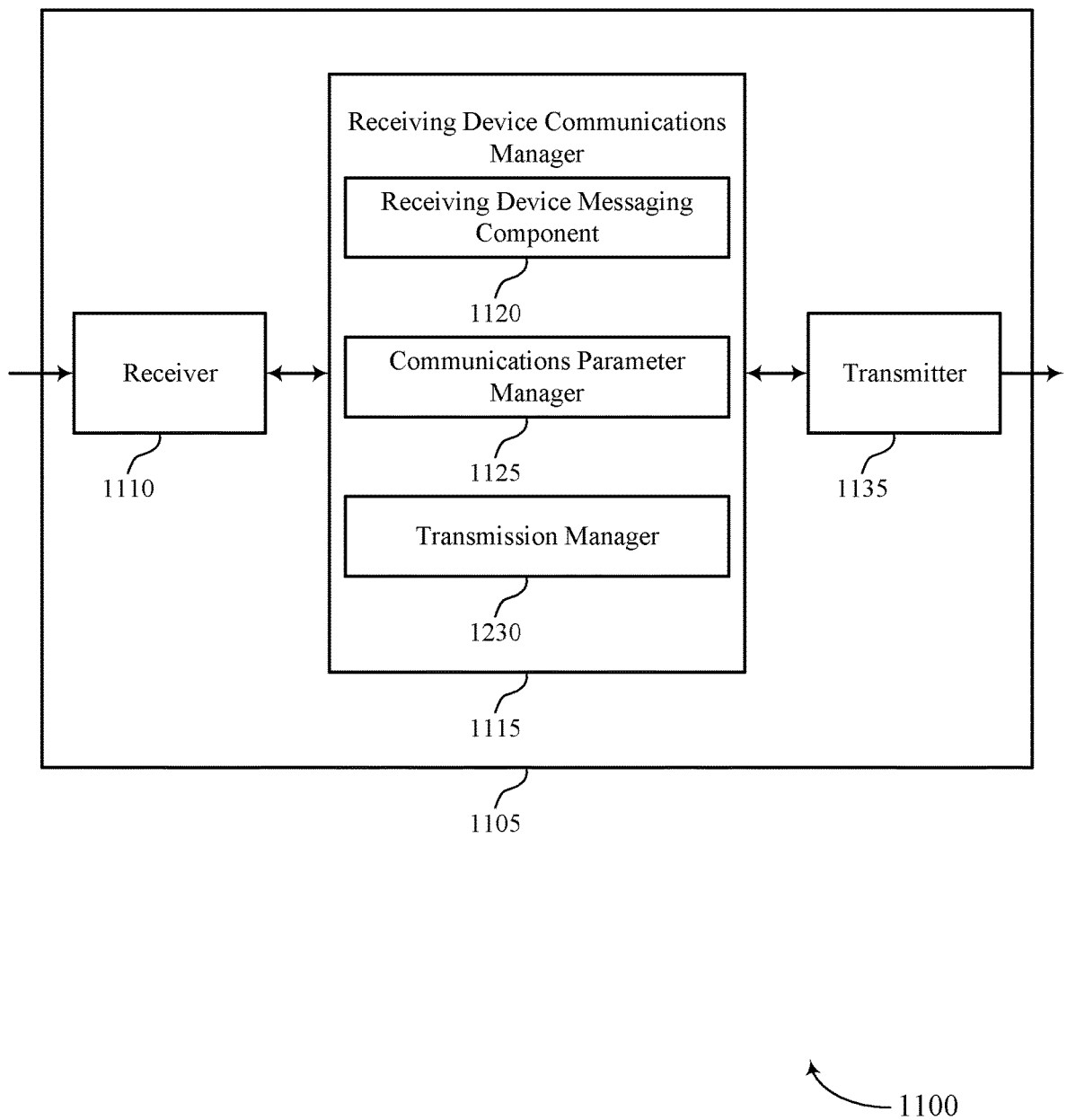

FIG. 11 shows a block diagram 1100 of a device 1105 that supports cooperative full-duplex techniques for sidelink communications in accordance with one or more aspects of the present disclosure. The device 1105 may be an example of aspects of a device 1005, a receiving device, or an RSU, as described herein. The device 1105 may include a receiver 1110, a receiving device communications manager 1115, and a transmitter 1135. The device 1105 may also include a processor. Each of these components may be in communication with one another (e.g., via one or more buses).

The receiver 1110 may provide a means for receiving information such as packets, user data, or control information associated with various information channels (e.g., control channels, data channels, and information related to cooperative full-duplex techniques for sidelink communications, etc.). Information may be passed on to other components of the device 1105. The receiver 1110 may be an example of aspects of the transceiver 1320 described with reference to FIG. 13. The receiver 1110 may provide a means for utilizing a single antenna or a set of antennas.

The receiving device communications manager 1115 may be an example of aspects of the receiving device communications manager 1015 as described herein. The receiving device communications manager 1115 may include a receiving device messaging component 1120, a communications parameter manager 1125, and a transmission manager 1130. The receiving device communications manager 1115 may be an example of aspects of the receiving device communications manager 1310 described herein.

The receiving device messaging component 1120 may be configured to provide or support a means for receiving, from a first device in a wireless network, a first message including a first set of parameters that indicate a presence or absence of one or more objects that cause interference at a first location of the first device and receive, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof.

The communications parameter manager 1125 may be configured to provide or support a means for determining a communications parameter based on the first set of parameters and the second set of parameters, the communications parameter indicating at least one or more beam directions for communicating at a location based on the presence or the absence of the one or more objects at the first location and the second location.

The transmission manager 1130 may be configured to provide or support a means for transmitting a third message including an indication of the communications parameter to at least the first device, or the second device, or any combination thereof.

The transmitter 1135 may provide a means for transmitting signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
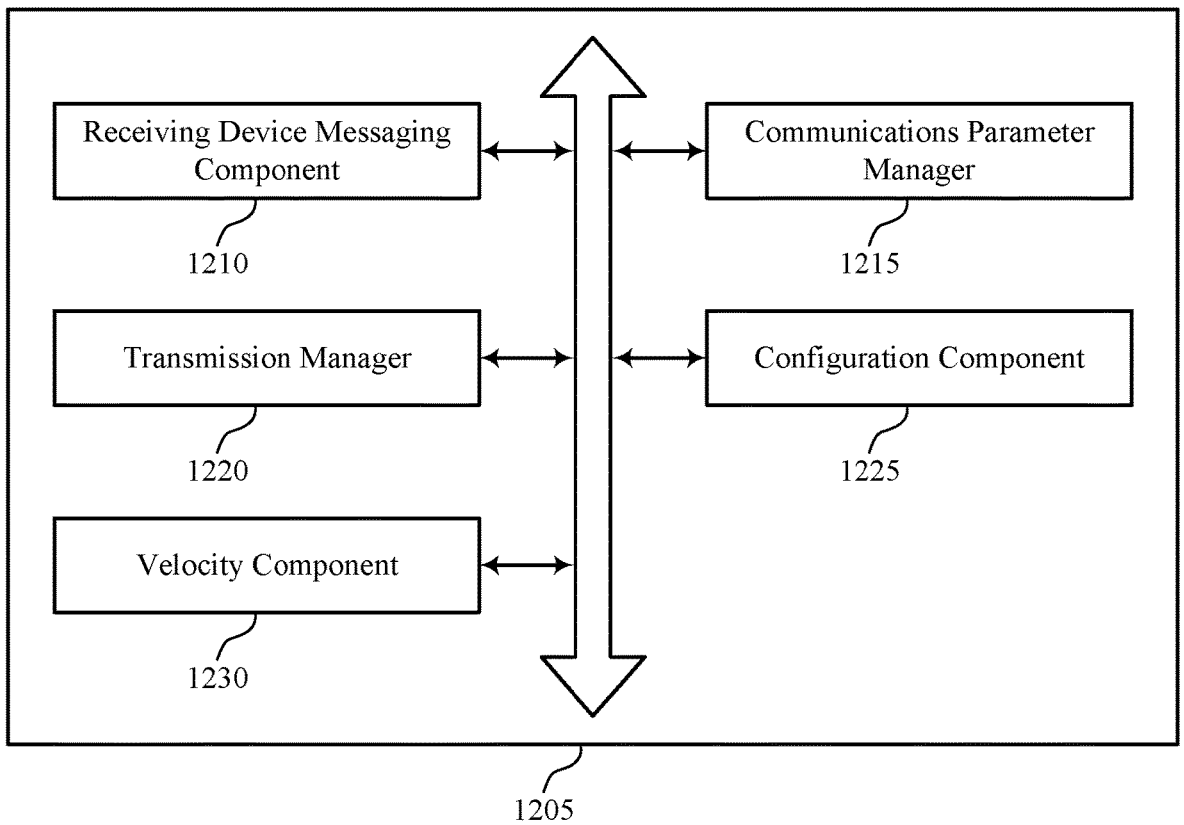
FIG. 12 shows a block diagram of a receiving device communications manager that supports cooperative full-duplex techniques for sidelink communications in accordance with one or more aspects of the present disclosure.

FIG. 12 shows a block diagram 1200 of a receiving device communications manager 1205 that provide a means for supporting cooperative full-duplex techniques for sidelink communications in accordance with one or more aspects of the present disclosure. The receiving device communications manager 1205 may be an example of aspects of a receiving device communications manager 1015, a receiving device communications manager 1115, or a receiving device communications manager 1310 described herein. The receiving device communications manager 1205 may include a receiving device messaging component 1210, a communications parameter manager 1215, a transmission manager 1220, a configuration component 1225, and a velocity component 1230. Each of these modules may communicate, directly or indirectly, with one another (e.g., via one or more buses).

The receiving device messaging component 1210 may be configured to provide or support a means for receiving, from a first device in a wireless network, a first message including a first set of parameters that indicate a presence or absence of one or more objects that cause interference at a first location of the first device.

In some examples, the receiving device messaging component 1210 may be configured to provide or support a means for receiving, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof.

In some cases, the location information of the first message includes an indication of the first location of the first device and a location of one or more other devices communicating with the first device, the first location and the location of the one or more other devices each including GPS coordinates, or an absolute location, or a zone ID, or any combination thereof, where the communications parameter is based on the first location and the location of the one or more other devices.

In some cases, the directional beam information of the first message including a first beam index corresponding to a first direction of a first directional beam of the first device, or a second beam index corresponding to a second direction of a second directional beam of the first device, or any combination thereof, where the communications parameter is based on the first beam index, or the second beam index, or any combination thereof.

In some cases, the antenna array information of the first message including first direction information for a main transmit beam of a transmit antenna array at the first device, second direction information for one or more null interference beams at the transmit antenna array, third direction information for a main receive beam at a receive antenna array at the first device, and fourth direction information for one or more null interference beams at the receive antenna array, the first direction information and the second direction information each including an index of a codebook for transmitting messages, the third direction information and the fourth direction information each including an index of a codebook for receiving messages, where the communications parameter is based on the first direction information, or the second direction information, or the third direction information, or any combination thereof.

The communications parameter manager 1215 may be configured to provide or support a means for determining a communications parameter based on the first set of parameters and the second set of parameters, the communications parameter indicating at least one or more beam directions for communicating at a location based on the presence or the absence of the one or more objects at the first location and the second location.

In some examples, the communications parameter manager 1215 may be configured to provide or support a means for determining a first set of parameters for a third location of the one or more locations, the first set of parameters including beam directions for communicating in the third location based on a first estimate of one or more objects at the third location.

In some examples, determining a second set of parameters for a fourth location of the set of one or more locations, the second set of parameters including beam directions for communicating in the fourth location based on a second estimate of one or more objects at the fourth location, where the third message includes the first subset of parameters, or the second subset of parameters, or any combination thereof.

In some examples, the communications parameter manager 1215 may be configured to provide or support a means for transmitting, to the first device, a fourth message including the communications parameter based on the configuration.

In some cases, the first subset of parameters includes first location information, or first directional beam information, or first antenna array information, or first velocity information, or any combination thereof, for one or more nodes at the third location, the second subset of parameters including second location information, or second directional beam information, or second antenna array information, or second velocity information, or any combination thereof, for one or more nodes at the fourth location.

In some cases, the communications parameter includes an indication of one or more transmit directions, or one or more receive directions, or any combination thereof, that are based on the one or more objects that cause interference at a location.

The transmission manager 1220 may be configured to provide or support a means for transmitting a third message including an indication of the communications parameter to at least the first device, or the second device, or any combination thereof. In some examples, the transmission manager 1220 may be configured to provide or support a means for broadcasting, unicasting, or groupcasting the third message to one or more devices in the wireless network.

The configuration component 1225 may be configured to provide or support a means for receiving, from the first device, a configuration for transmitting the communications parameter, the configuration indicating a periodicity for transmitting the communications parameter, one or more event triggers for transmitting the communications parameter, a dynamic request for the communications parameter, or any combination thereof.

The velocity component 1230 may be configured to provide or support a means for determining a speed of the first device or a direction of the first device, or any combination thereof, based on a message from the first device, or a first measurement performed by the road side unit, or any combination thereof.

In some examples, the velocity component 1230 may be configured to provide or support a means for determining a speed of the second device or a direction of the second device, or any combination thereof, based on a message from the second device or a second measurement performed by the road side unit, or any combination thereof, the velocity information of the first message including the speed of the first device, or the direction of the first device, or the speed of the second device, or the direction of the second device, or any combination thereof, where the communications parameter is based on the speed of the first device, or the direction of the first device, or the speed of the second device, or the direction of the second device, or any combination thereof.

Figure 13:
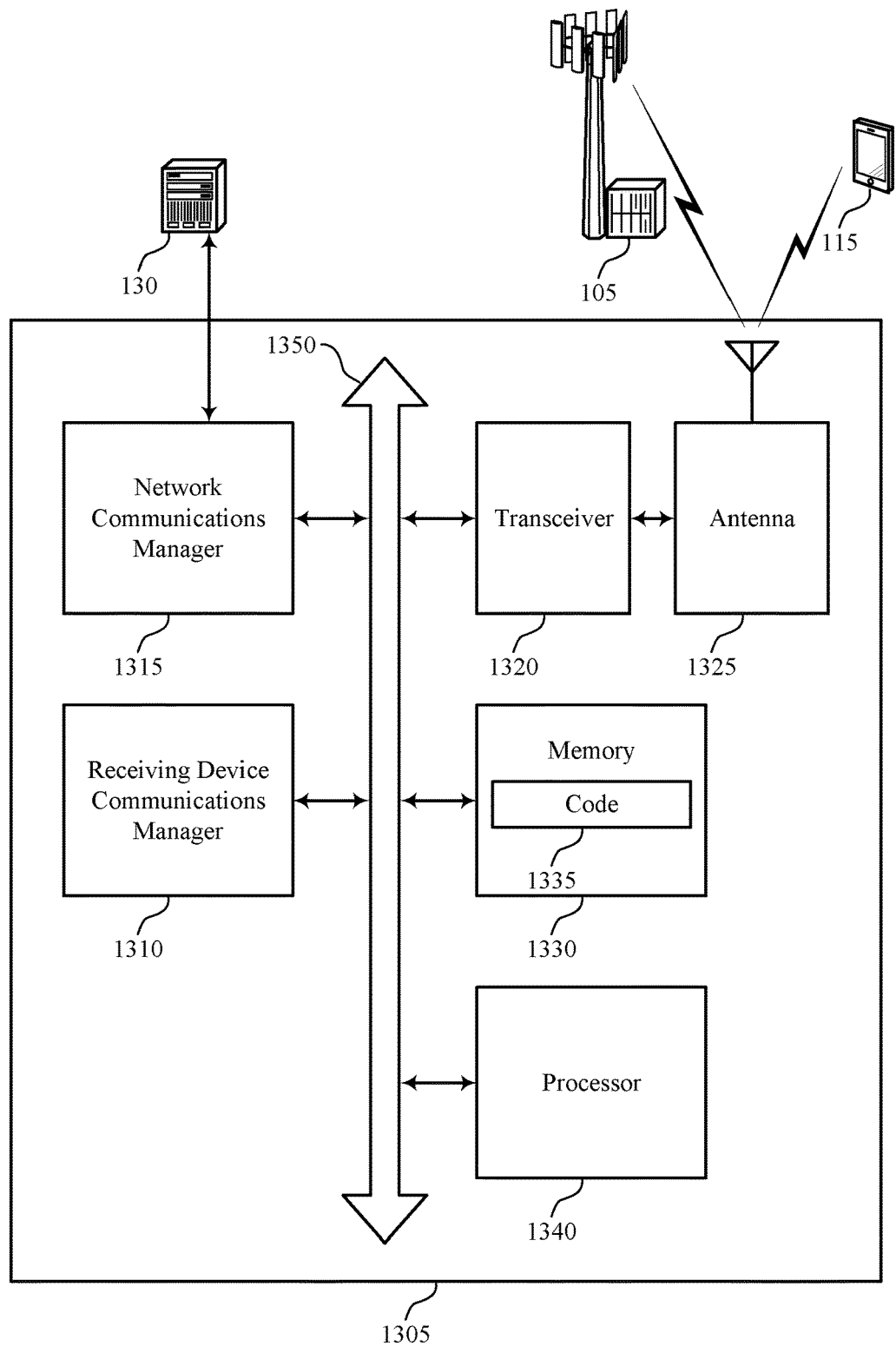
FIG. 13 shows a diagram of a system including a device that supports cooperative full-duplex techniques for sidelink communications in accordance with one or more aspects of the present disclosure.

FIG. 13 shows a diagram of a system 1300 including a device 1305 that supports cooperative full-duplex techniques for sidelink communications in accordance with one or more aspects of the present disclosure. The device 1305 may be an example of or include the components of device 1005, device 1105, a receiving device, or an RSU, as described herein. The device 1305 may include components for bi-directional voice and data communications including components for transmitting and receiving communications, including a receiving device communications manager 1310, a network communications manager 1315, a transceiver 1320, an antenna 1325, memory 1330, and a processor 1340. These components may be in electronic communication via one or more buses (e.g., bus 1350).

The receiving device communications manager 1310 may be configured to provide or support a means for receiving, from a first device in a wireless network, a first message including a first set of parameters that indicate a presence or absence of one or more objects that cause interference at a first location of the first device. In some examples, the receiving device communications manager 1310 may be configured to provide or support a means for receiving, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof. In some examples, the receiving device communications manager 1310 may be configured to provide or support a means for determining a communications parameter based on the first set of parameters and the second set of parameters, the communications parameter indicating at least one or more beam directions for communicating at a location based on the presence or the absence of the one or more objects at the first location and the second location. In some examples, the receiving device communications manager 1310 may be configured to provide or support a means for transmitting a third message including an indication of the communications parameter to at least the first device, or the second device, or any combination thereof.

The receiving device communications manager 1310 may be an example of means for performing various aspects of full-duplex communications as described herein. The receiving device communications manager 1310, or its sub-components, may be implemented in hardware (e.g., in communications management circuitry). The circuitry may comprise that of a processor, a DSP, an ASIC, an FPGA or other programmable logic device, discrete gate or transistor logic, discrete hardware components, or any combination thereof designed to perform the functions described in the present disclosure.

In another implementation, the receiving device communications manager 1310, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the receiving device communications manager 1310 may be configured to perform various operations (e.g., receiving, determining, transmitting) using or otherwise in cooperation with the transceiver 1320.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device 1305 may have more than one antenna 1325, which may have the capability of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cooperative full-duplex techniques for sidelink communications).

The device 1305 may manage communications with one or more other receiving devices such as RSUs, and may include a controller or scheduler for controlling communications with UEs 115 in cooperation with other, receiving devices, RSUs, or base stations 105. For example, the device 1305 may coordinate scheduling for transmissions to UEs 115 for various interference mitigation techniques such as beamforming or joint transmission.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
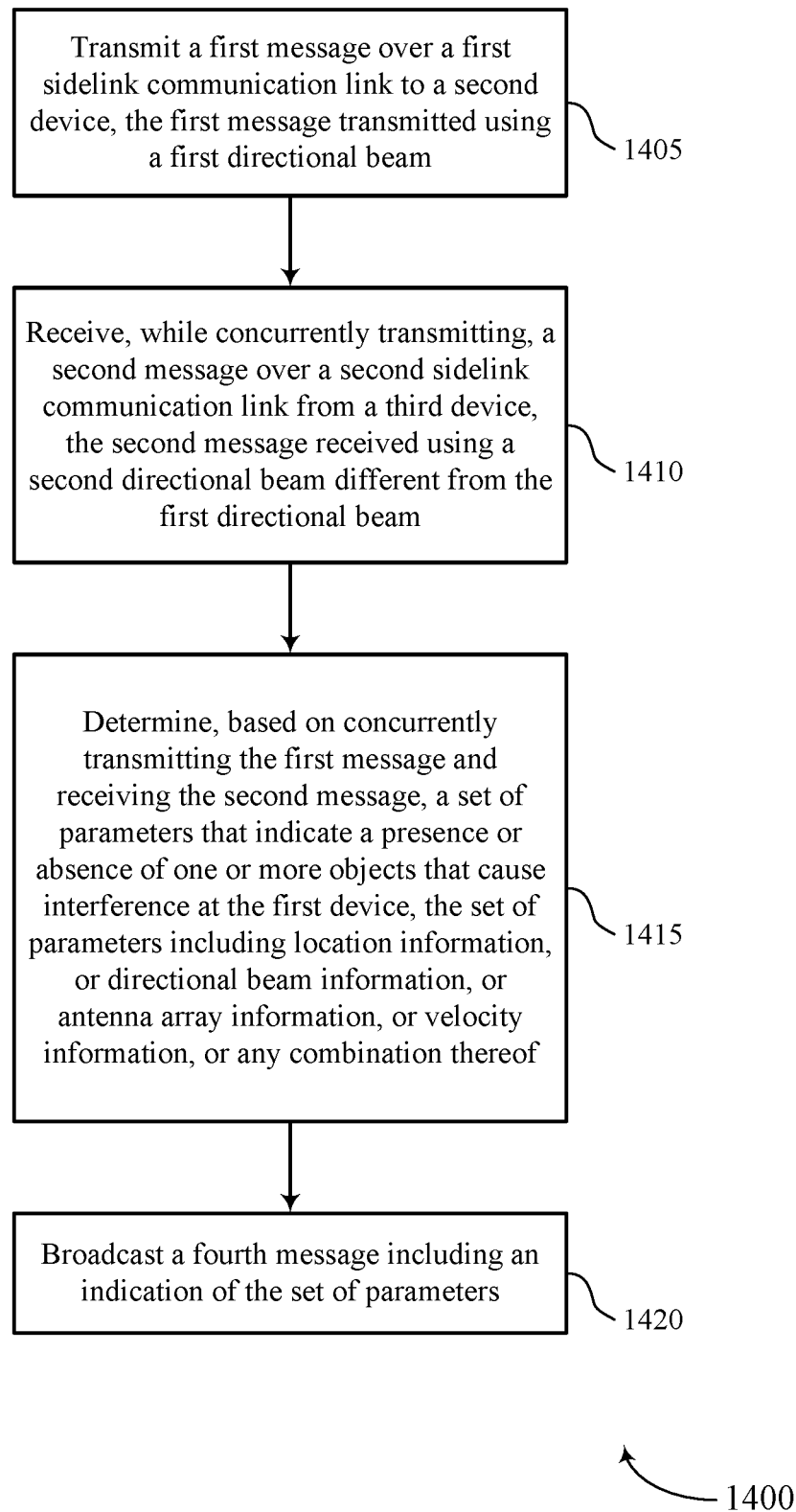
FIGS. 14 through 26 show flowcharts illustrating methods that support cooperative full-duplex techniques for sidelink communications in accordance with one or more aspects of the present disclosure.

FIG. 14 shows a flowchart illustrating a method 1400 that supports cooperative full-duplex techniques for sidelink communications in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may transmit a first message over a first sidelink communication link to a second device, the first message transmitted using a first directional beam. The operations of 1405 may be performed according to the methods described herein. In some examples, aspects of the operations of 1405 may be performed by a messaging component as described with reference to FIGS. 6 through 9.

At 1410, the UE may receive, while concurrently transmitting, a second message over a second sidelink communication link from a third device, the second message received using a second directional beam different from the first directional beam. The operations of 1410 may be performed according to the methods described herein. In some examples, aspects of the operations of 1410 may be performed by a messaging component as described with reference to FIGS. 6 through 9.

At 1415, the UE may determine, based on concurrently transmitting the first message and receiving the second message, a set of parameters that indicate a presence or absence of one or more objects that cause interference at the first device, the set of parameters including location information, or directional beam information, or antenna array information, or velocity information, or any combination thereof. The operations of 1415 may be performed according to the methods described herein. In some examples, aspects of the operations of 1415 may be performed by a parameter component as described with reference to FIGS. 6 through 9.

At 1420, the UE may broadcast a fourth message including an indication of the set of parameters. The operations of 1420 may be performed according to the methods described herein. In some examples, aspects of the operations of 1420 may be performed by a transmission component as described with reference to FIGS. 6 through 9.

Figure 15:
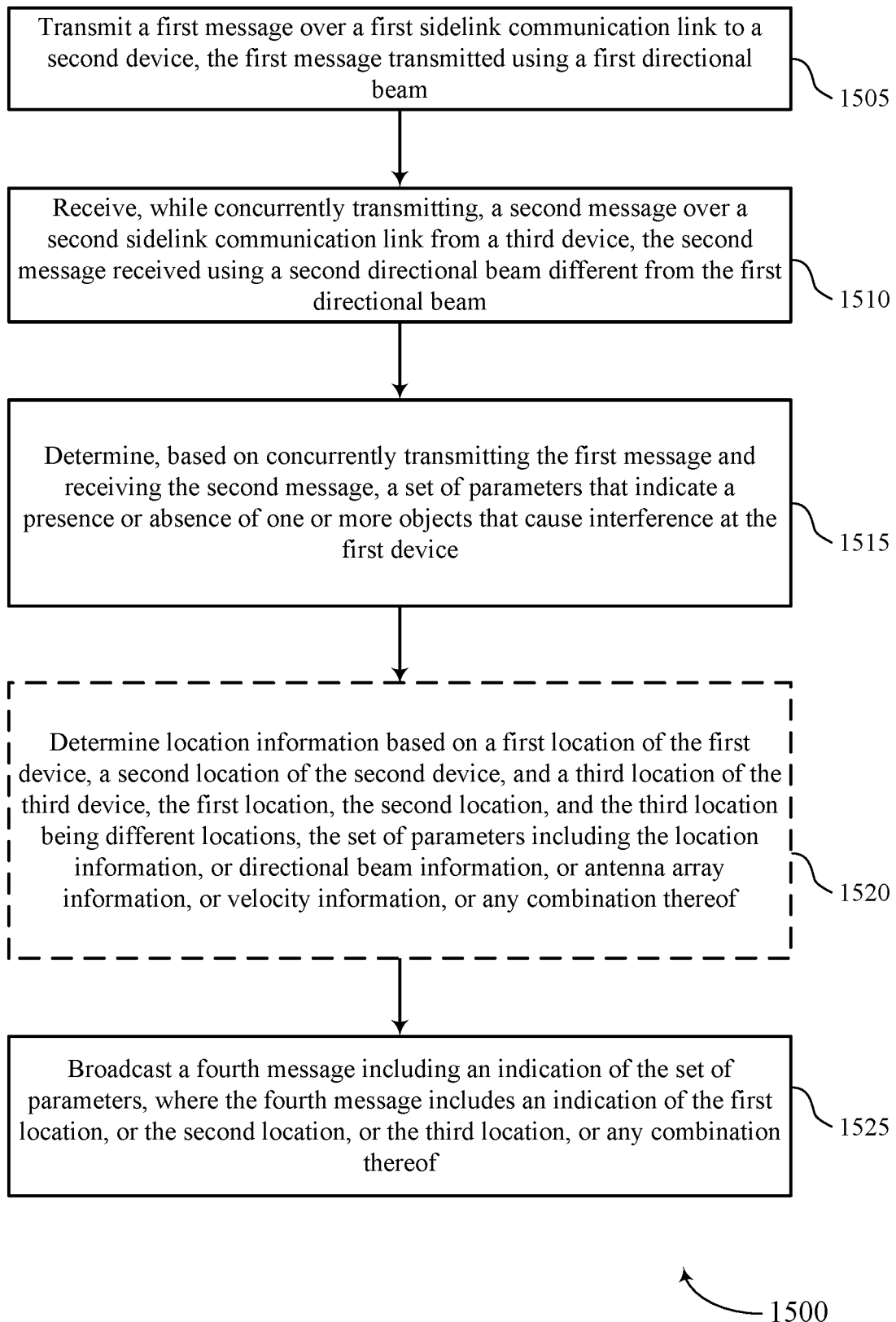

FIG. 15 shows a flowchart illustrating a method 1500 that supports cooperative full-duplex techniques for sidelink communications in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may transmit a first message over a first sidelink communication link to a second device, the first message transmitted using a first directional beam. The operations of 1505 may be performed according to the methods described herein. In some examples, aspects of the operations of 1505 may be performed by a messaging component as described with reference to FIGS. 6 through 9.

At 1510, the UE may receive, while concurrently transmitting, a second message over a second sidelink communication link from a third device, the second message received using a second directional beam different from the first directional beam. The operations of 1510 may be performed according to the methods described herein. In some examples, aspects of the operations of 1510 may be performed by a messaging component as described with reference to FIGS. 6 through 9.

At 1515, the UE may determine, based on concurrently transmitting the first message and receiving the second message, a set of parameters that indicate a presence or absence of one or more objects that cause interference at the first device. The operations of 1515 may be performed according to the methods described herein. In some examples, aspects of the operations of 1515 may be performed by a parameter component as described with reference to FIGS. 6 through 9.

At 1520, the UE may determine location information based on a first location of the first device, a second location of the second device, and a third location of the third device, the first location, the second location, and the third location being different locations, where the set of parameters includes the location information, or directional beam information, or antenna array information, or velocity information, or any combination thereof. The operations of 1520 may be performed according to the methods described herein. In some examples, aspects of the operations of 1520 may be performed by a location manager as described with reference to FIGS. 6 through 9.

At 1525, the UE may broadcast a fourth message including an indication of the set of parameters, where the fourth message includes an indication of the first location, or the second location, or the third location, or any combination thereof. The operations of 1525 may be performed according to the methods described herein. In some examples, aspects of the operations of 1525 may be performed by a transmission component as described with reference to FIGS. 6 through 9.

Figure 16:
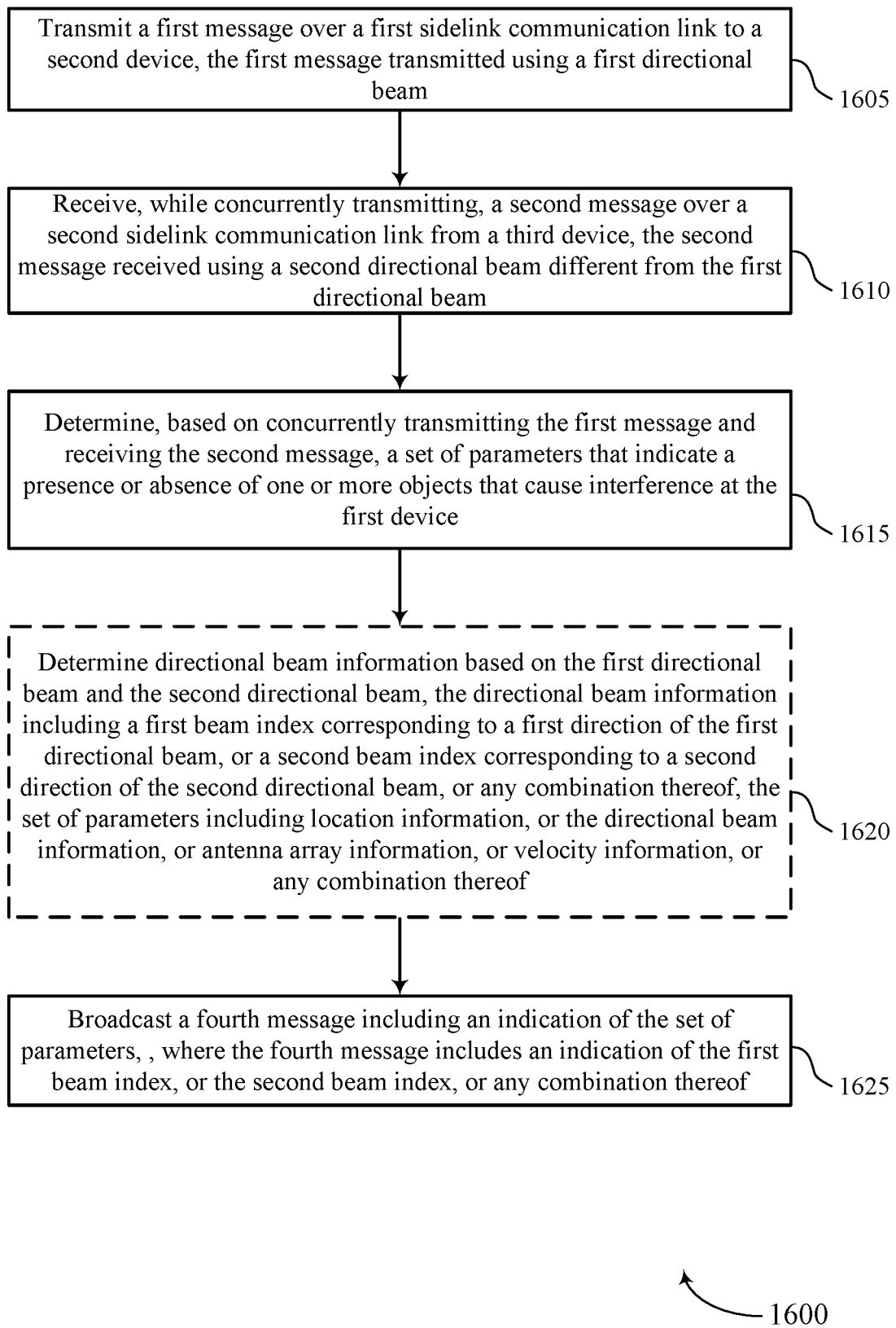

FIG. 16 shows a flowchart illustrating a method 1600 that supports cooperative full-duplex techniques for sidelink communications in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may transmit a first message over a first sidelink communication link to a second device, the first message transmitted using a first directional beam. The operations of 1605 may be performed according to the methods described herein. In some examples, aspects of the operations of 1605 may be performed by a messaging component as described with reference to FIGS. 6 through 9.

At 1610, the UE may receive, while concurrently transmitting, a second message over a second sidelink communication link from a third device, the second message received using a second directional beam different from the first directional beam. The operations of 1610 may be performed according to the methods described herein. In some examples, aspects of the operations of 1610 may be performed by a messaging component as described with reference to FIGS. 6 through 9.

At 1615, the UE may determine, based on concurrently transmitting the first message and receiving the second message, a set of parameters that indicate a presence or absence of one or more objects that cause interference at the first device. The operations of 1615 may be performed according to the methods described herein. In some examples, aspects of the operations of 1615 may be performed by a parameter component as described with reference to FIGS. 6 through 9.

At 1620, the UE may determine directional beam information based on the first directional beam and the second directional beam, the directional beam information including a first beam index corresponding to a first direction of the first directional beam, or a second beam index corresponding to a second direction of the second directional beam, or any combination thereof, where the set of parameters includes location information, or the directional beam information, or antenna array information, or velocity information, or any combination thereof. The operations of 1620 may be performed according to the methods described herein. In some examples, aspects of the operations of 1620 may be performed by a beamforming manager as described with reference to FIGS. 6 through 9.

At 1625, the UE may broadcast a fourth message including an indication of the set of parameters, where the fourth message includes an indication of the first beam index, or the second beam index, or any combination thereof. The operations of 1625 may be performed according to the methods described herein. In some examples, aspects of the operations of 1625 may be performed by a transmission component as described with reference to FIGS. 6 through 9.

Figure 17:
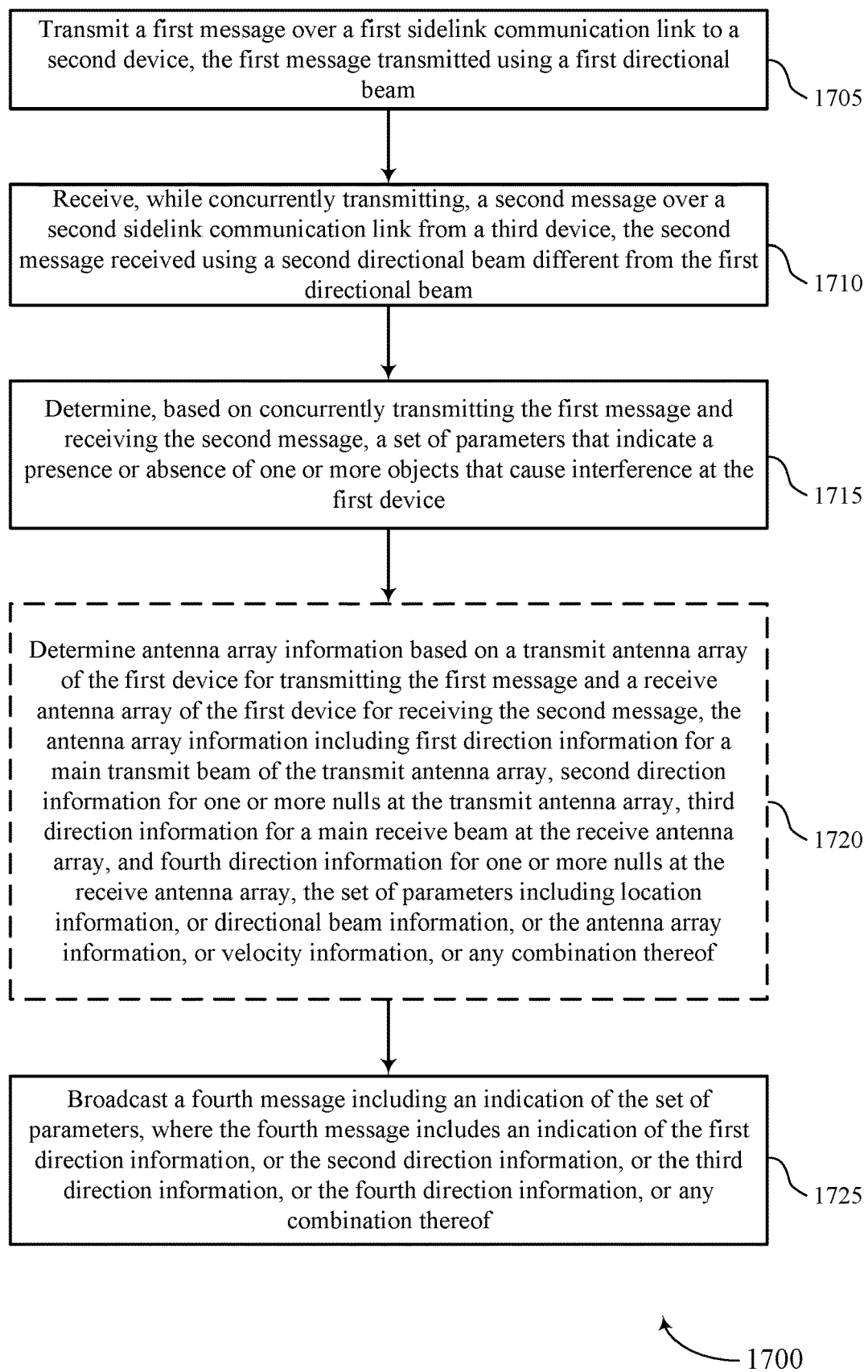

FIG. 17 shows a flowchart illustrating a method 1700 that supports cooperative full-duplex techniques for sidelink communications in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may transmit a first message over a first sidelink communication link to a second device, the first message transmitted using a first directional beam. The operations of 1705 may be performed according to the methods described herein. In some examples, aspects of the operations of 1705 may be performed by a messaging component as described with reference to FIGS. 6 through 9.

At 1710, the UE may receive, while concurrently transmitting, a second message over a second sidelink communication link from a third device, the second message received using a second directional beam different from the first directional beam. The operations of 1710 may be performed according to the methods described herein. In some examples, aspects of the operations of 1710 may be performed by a messaging component as described with reference to FIGS. 6 through 9.

At 1715, the UE may determine, based on concurrently transmitting the first message and receiving the second message, a set of parameters that indicate a presence or absence of one or more objects that cause interference at the first device. The operations of 1715 may be performed according to the methods described herein. In some examples, aspects of the operations of 1715 may be performed by a parameter component as described with reference to FIGS. 6 through 9.

At 1720, the UE may determine antenna array information based on a transmit antenna array of the first device for transmitting the first message and a receive antenna array of the first device for receiving the second message, the antenna array information including first direction information for a main transmit beam of the transmit antenna array, second direction information for one or more null interference beams at the transmit antenna array, third direction information for a main receive beam at the receive antenna array, and fourth direction information for one or more null interference beams at the receive antenna array, where the set of parameters includes location information, or directional beam information, or the antenna array information, or velocity information, or any combination thereof. The operations of 1720 may be performed according to the methods described herein. In some examples, aspects of the operations of 1720 may be performed by an antenna manager as described with reference to FIGS. 6 through 9.

At 1725, the UE may broadcast a fourth message including an indication of the set of parameters, where the fourth message includes an indication of the first direction information, or the second direction information, or the third direction information, or the fourth direction information, or any combination thereof. The operations of 1725 may be performed according to the methods described herein. In some examples, aspects of the operations of 1725 may be performed by a transmission component as described with reference to FIGS. 6 through 9.

Figure 18:
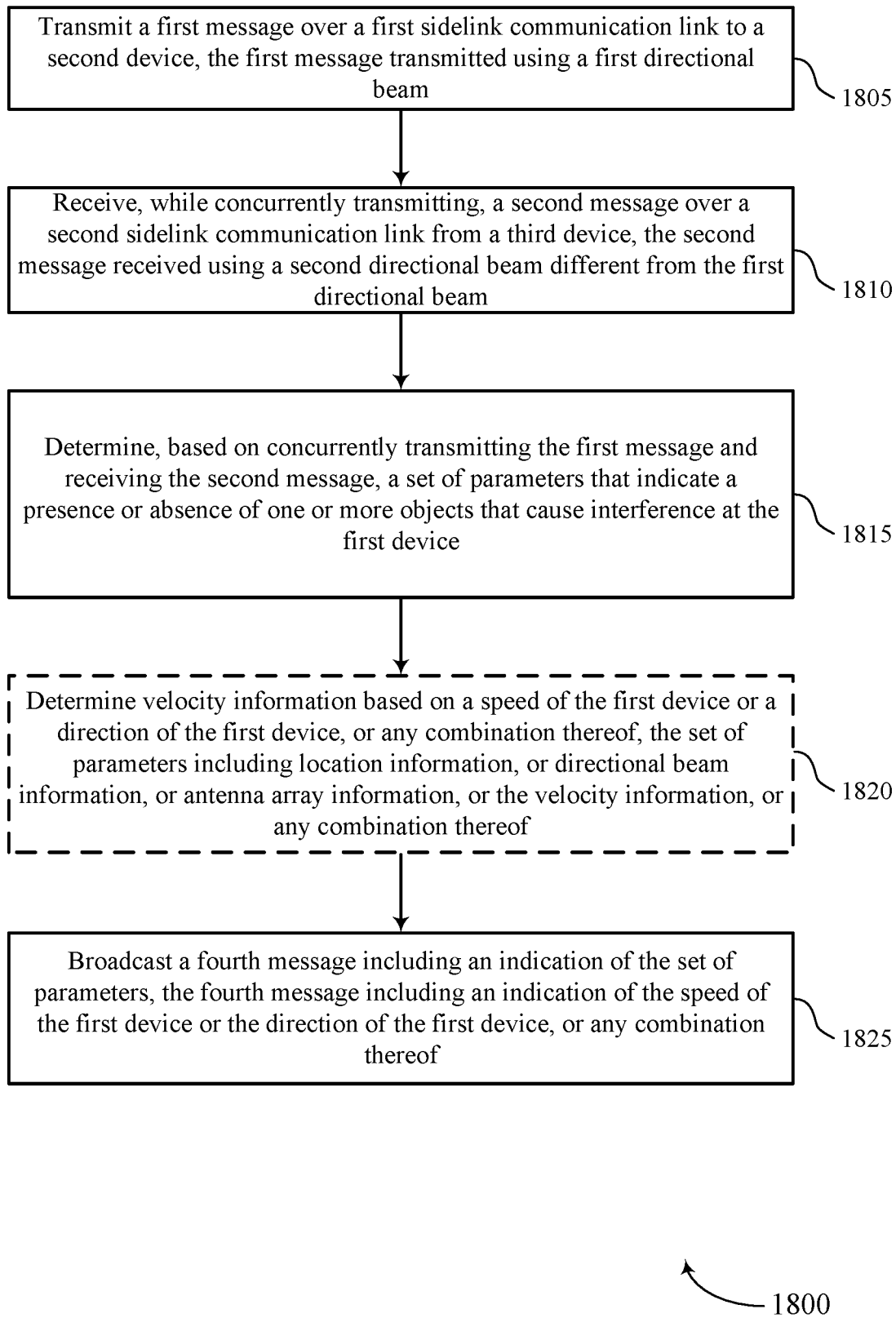

FIG. 18 shows a flowchart illustrating a method 1800 that supports cooperative full-duplex techniques for sidelink communications in accordance with one or more aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may transmit a first message over a first sidelink communication link to a second device, the first message transmitted using a first directional beam. The operations of 1805 may be performed according to the methods described herein. In some examples, aspects of the operations of 1805 may be performed by a messaging component as described with reference to FIGS. 6 through 9.

At 1810, the UE may receive, while concurrently transmitting, a second message over a second sidelink communication link from a third device, the second message received using a second directional beam different from the first directional beam. The operations of 1810 may be performed according to the methods described herein. In some examples, aspects of the operations of 1810 may be performed by a messaging component as described with reference to FIGS. 6 through 9.

At 1815, the UE may determine, based on concurrently transmitting the first message and receiving the second message, a set of parameters that indicate a presence or absence of one or more objects that cause interference at the first device. The operations of 1815 may be performed according to the methods described herein. In some examples, aspects of the operations of 1815 may be performed by a parameter component as described with reference to FIGS. 6 through 9.

At 1820, the UE may determine velocity information based on a speed of the first device or a direction of the first device, or any combination thereof, where the set of parameters includes location information, or directional beam information, or antenna array information, or the velocity information, or any combination thereof. The operations of 1820 may be performed according to the methods described herein. In some examples, aspects of the operations of 1820 may be performed by a velocity manager as described with reference to FIGS. 6 through 9.

At 1825, the UE may broadcast a fourth message including an indication of the set of parameters, the fourth message including an indication of the speed of the first device or the direction of the first device, or any combination thereof. The operations of 1825 may be performed according to the methods described herein. In some examples, aspects of the operations of 1825 may be performed by a transmission component as described with reference to FIGS. 6 through 9.

Figure 19:
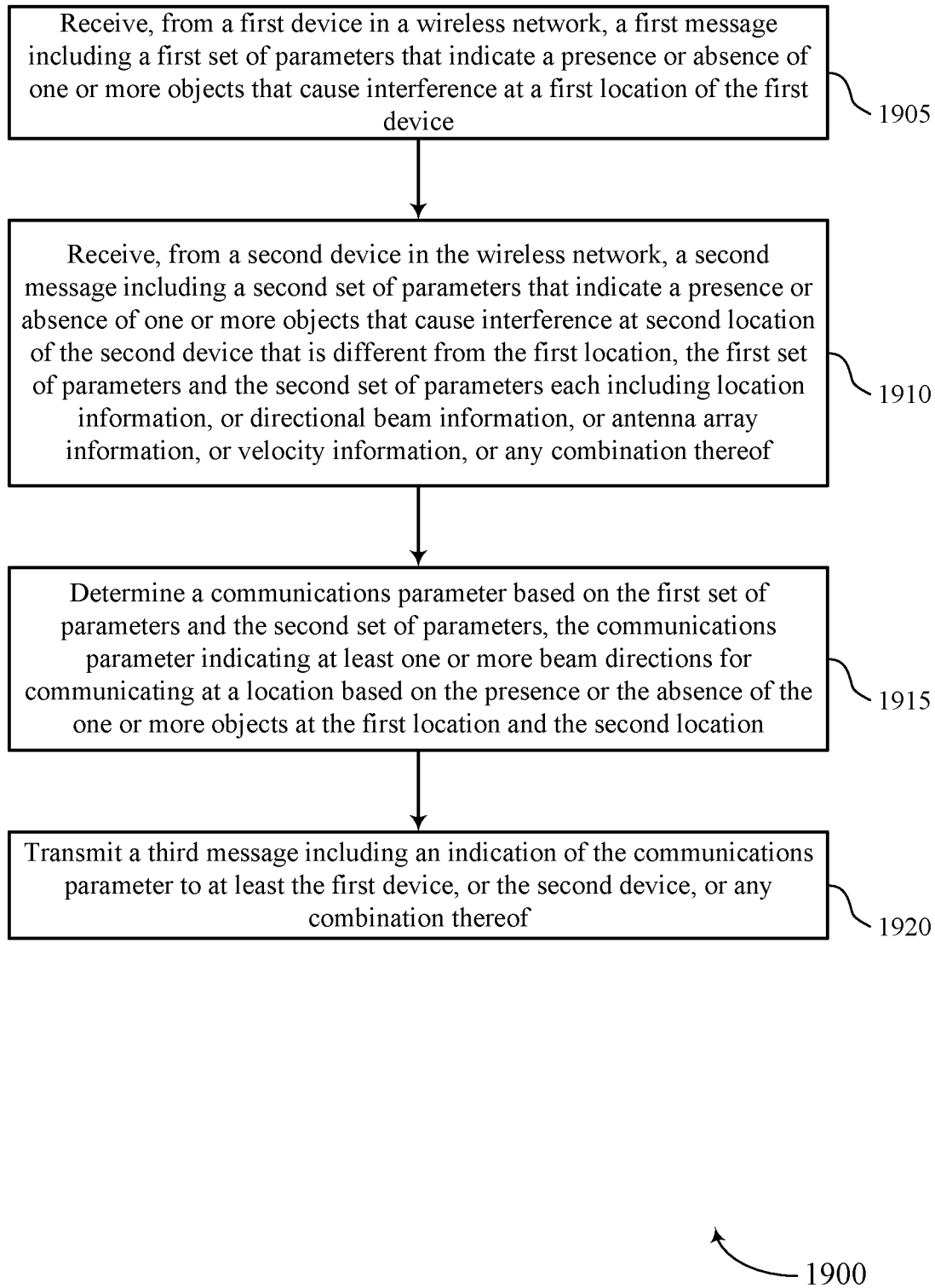

FIG. 19 shows a flowchart illustrating a method 1900 that supports cooperative full-duplex techniques for sidelink communications in accordance with one or more aspects of the present disclosure. The operations of method 1900 may be implemented by a wireless device, such as a receiving device or an RSU, or its components as described herein. For example, the operations of method 1900 may be performed by a receiving device communications manager as described with reference to FIGS. 10 through 13. In some examples, an RSU may execute a set of instructions to control the functional elements of the RSU to perform the functions described herein. Additionally or alternatively, an RSU may perform aspects of the functions described herein using special-purpose hardware.

At 1905, the RSU may receive, from a first device in a wireless network, a first message including a first set of parameters that indicate a presence or absence of one or more objects that cause interference at a first location of the first device. The operations of 1905 may be performed according to the methods described herein. In some examples, aspects of the operations of 1905 may be performed by a receiving device messaging component as described with reference to FIGS. 10 through 13.

At 1910, the RSU may receive, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof. The operations of 1910 may be performed according to the methods described herein. In some examples, aspects of the operations of 1910 may be performed by a receiving device messaging component as described with reference to FIGS. 10 through 13.

At 1915, the RSU may determine a communications parameter based on the first set of parameters and the second set of parameters, the communications parameter indicating at least one or more beam directions for communicating at a location based on the presence or the absence of the one or more objects at the first location and the second location. The operations of 1915 may be performed according to the methods described herein. In some examples, aspects of the operations of 1915 may be performed by a communications parameter manager as described with reference to FIGS. 10 through 13.

At 1920, the RSU may transmit (e.g., broadcast, unicast, or groupcast) a third message including an indication of the communications parameter to at least the first device, or the second device, or any combination thereof. The operations of 1920 may be performed according to the methods described herein. In some examples, aspects of the operations of 1920 may be performed by a transmission manager as described with reference to FIGS. 10 through 13.

Figure 20:
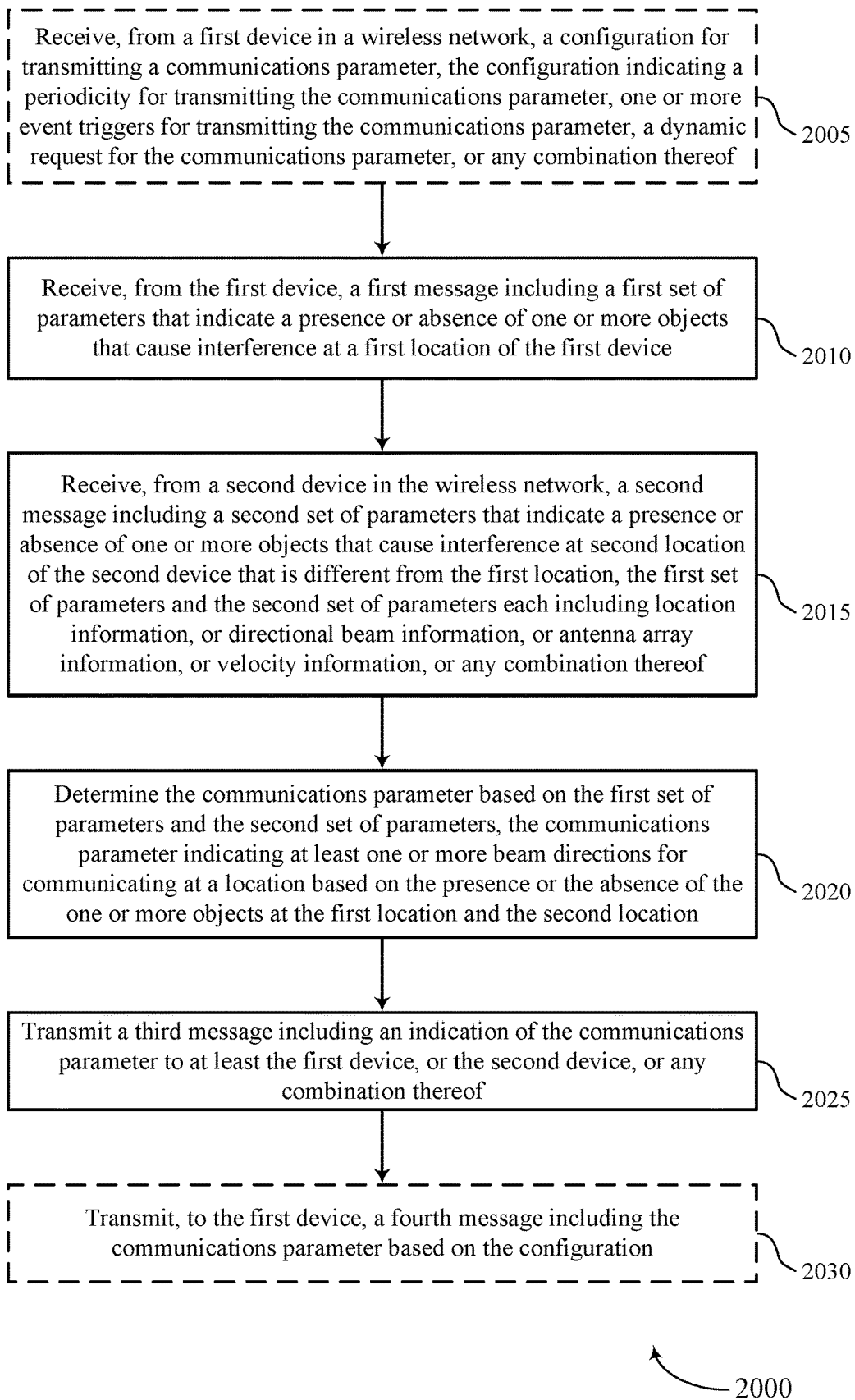

FIG. 20 shows a flowchart illustrating a method 2000 that supports cooperative full-duplex techniques for sidelink communications in accordance with one or more aspects of the present disclosure. The operations of method 2000 may be implemented by a device such as, a receiving device, or an RSU or its components as described herein. For example, the operations of method 2000 may be performed by a receiving device communications manager as described with reference to FIGS. 10 through 13. In some examples, an RSU may execute a set of instructions to control the functional elements of the RSU to perform the functions described herein. Additionally or alternatively, an RSU may perform aspects of the functions described herein using special-purpose hardware.

At 2005, the RSU may receive, from a first device (e.g., a UE) in a wireless network, a configuration for transmitting a communications parameter, the configuration indicating a periodicity for transmitting the communications parameter, one or more event triggers for transmitting the communications parameter, a dynamic request for the communications parameter, or any combination thereof. The operations of 2005 may be performed according to the methods described herein. In some examples, aspects of the operations of 2005 may be performed by a configuration component as described with reference to FIGS. 10 through 13.

At 2010, the RSU may receive, from the first device, a first message including a first set of parameters that indicate a presence or absence of one or more objects that cause interference at a first location of the first device. The operations of 2010 may be performed according to the methods described herein. In some examples, aspects of the operations of 2010 may be performed by a receiving device messaging component as described with reference to FIGS. 10 through 13.

At 2015, the RSU may receive, from a second device in the wireless network, a second message including a second set of parameters that indicate a presence or absence of one or more objects that cause interference at second location of the second device that is different from the first location, the first set of parameters and the second set of parameters each including location information, or directional beam information, or antenna array information, or velocity information, or any combination thereof. The operations of 2015 may be performed according to the methods described herein. In some examples, aspects of the operations of 2015 may be performed by a receiving device messaging component as described with reference to FIGS. 10 through 13.

At 2020, the RSU may determine the communications parameter based on the first set of parameters and the second set of parameters, the communications parameter indicating at least one or more beam directions for communicating at a location based on the presence or the absence of the one or more objects at the first location and the second location. The operations of 2020 may be performed according to the methods described herein. In some examples, aspects of the operations of 2020 may be performed by a communications parameter manager as described with reference to FIGS. 10 through 13.

At 2025, the RSU may transmit (e.g., broadcast, unicast, or groupcast) a third message including an indication of the communications parameter to at least the first device, or the second device, or any combination thereof. The operations of 2025 may be performed according to the methods described herein. In some examples, aspects of the operations of 2025 may be performed by a transmission manager as described with reference to FIGS. 10 through 13.

At 2030, the RSU may transmit, to the first device, a fourth message including the communications parameter based on the configuration. The operations of 2030 may be performed according to the methods described herein. In some examples, aspects of the operations of 2030 may be performed by a communications parameter manager as described with reference to FIGS. 10 through 13.

Figure 21:
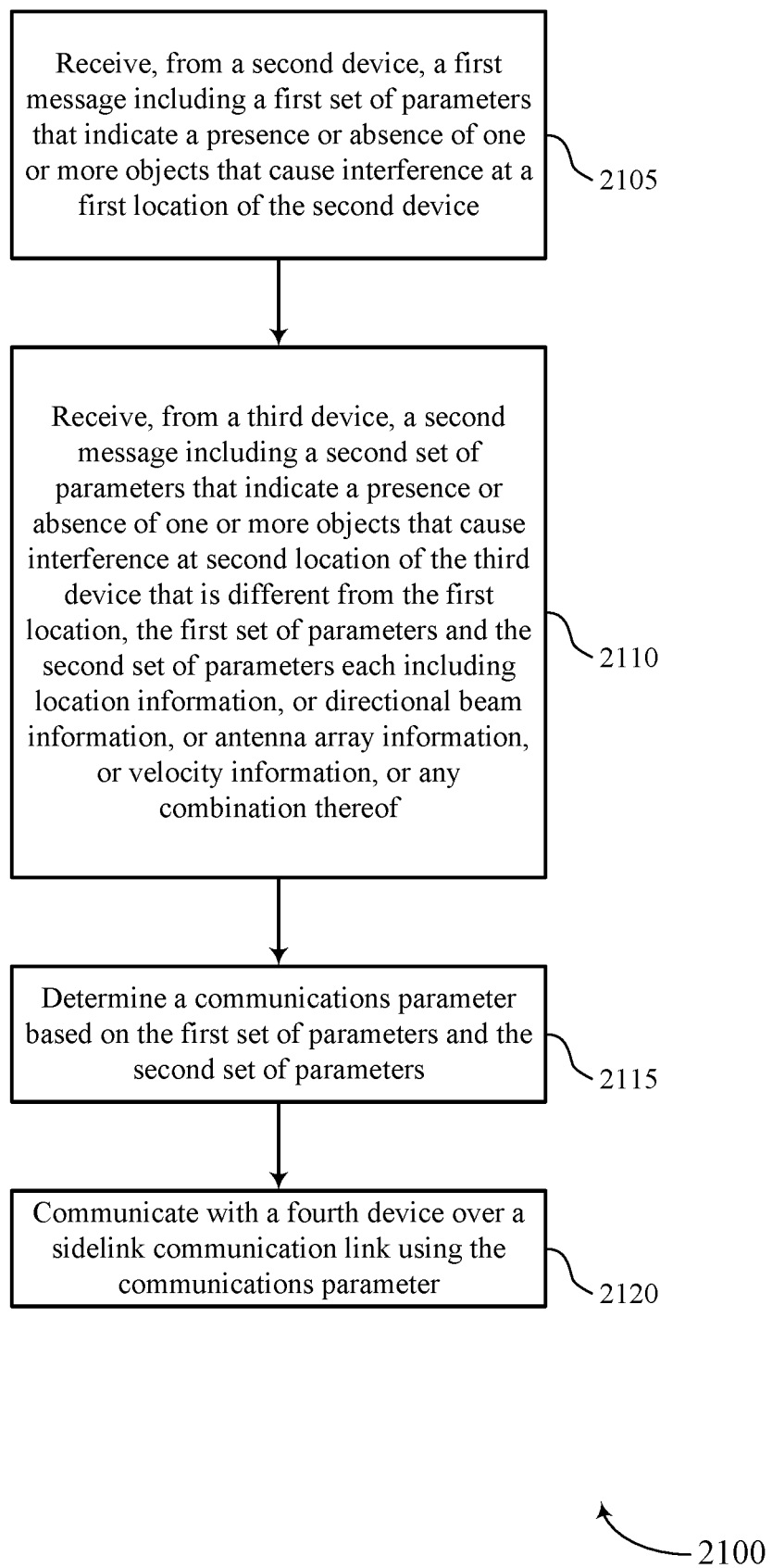

FIG. 21 shows a flowchart illustrating a method 2100 that supports cooperative full-duplex techniques for sidelink communications in accordance with one or more aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2105, the UE may receive, from a second device, a first message including a first set of parameters that indicate a presence or absence of one or more objects that cause interference at a first location of the second device. The operations of 2105 may be performed according to the methods described herein. In some examples, aspects of the operations of 2105 may be performed by a messaging component as described with reference to FIGS. 6 through 9.

At 2110, the UE may receive, from a third device, a second message including a second set of parameters that indicate a presence or absence of one or more objects that cause interference at second location of the third device that is different from the first location, the first set of parameters and the second set of parameters each including location information, or directional beam information, or antenna array information, or velocity information, or any combination thereof. The operations of 2110 may be performed according to the methods described herein. In some examples, aspects of the operations of 2110 may be performed by a messaging component as described with reference to FIGS. 6 through 9.

At 2115, the UE may determine a communications parameter based on the first set of parameters and the second set of parameters. The operations of 2115 may be performed according to the methods described herein. In some examples, aspects of the operations of 2115 may be performed by a parameter component as described with reference to FIGS. 6 through 9.

At 2120, the UE may communicate with a fourth device over a sidelink communication link using the communications parameter. The operations of 2120 may be performed according to the methods described herein. In some examples, aspects of the operations of 2120 may be performed by a transmission component as described with reference to FIGS. 6 through 9.

Figure 22:
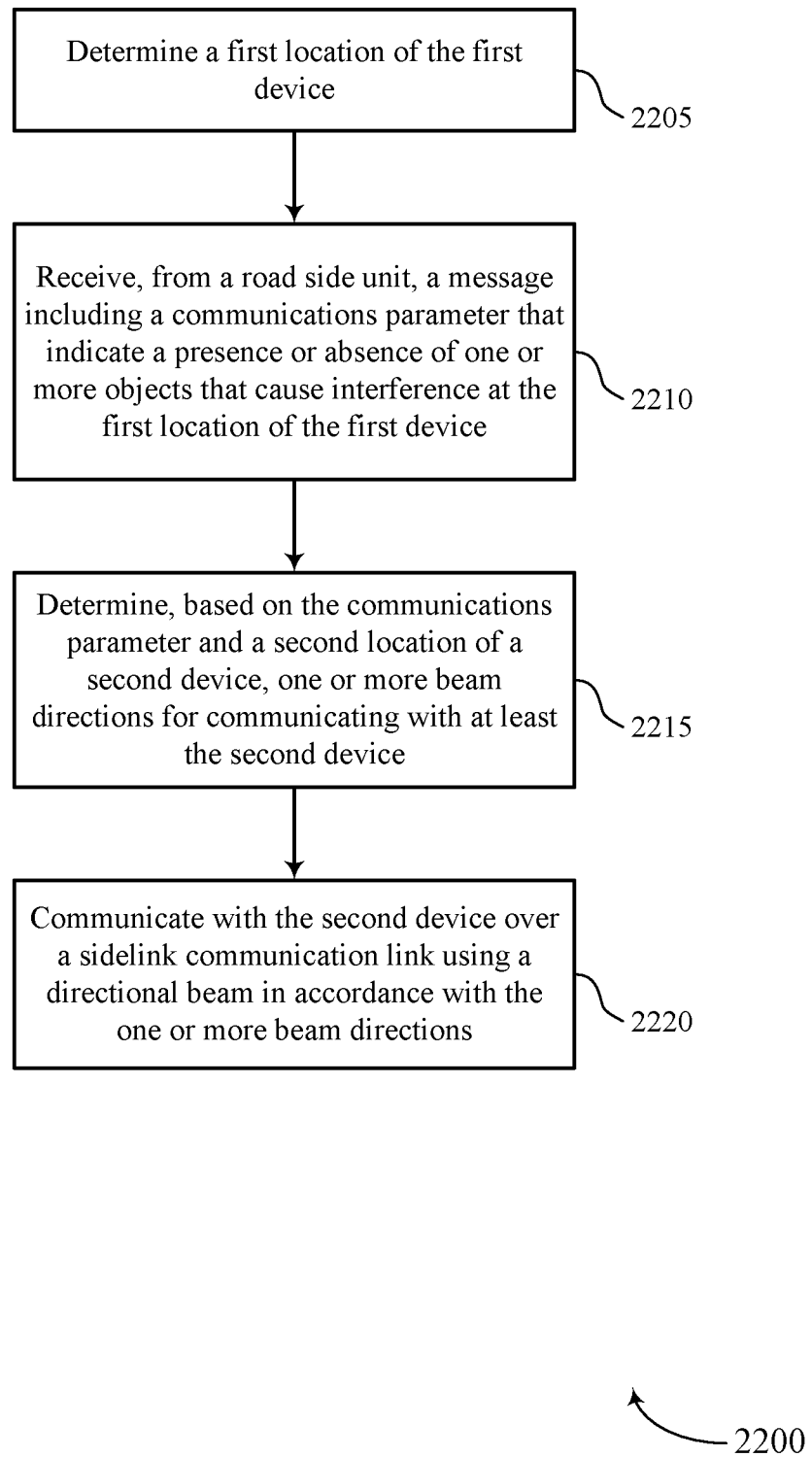

FIG. 22 shows a flowchart illustrating a method 2200 that supports cooperative full-duplex techniques for sidelink communications in accordance with one or more aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2205, the UE may determine a first location of the first device. The operations of 2205 may be performed according to the methods described herein. In some examples, aspects of the operations of 2205 may be performed by a location manager as described with reference to FIGS. 6 through 9.

At 2210, the UE may receive, from an RSU, a message including a communications parameter that indicates a presence or absence of one or more objects that cause interference at the first location of the first device. The operations of 2210 may be performed according to the methods described herein. In some examples, aspects of the operations of 2210 may be performed by a messaging component as described with reference to FIGS. 6 through 9.

At 2215, the UE may determine, based on the communications parameter and a second location of a second device, one or more beam directions for communicating with at least the second device. The operations of 2215 may be performed according to the methods described herein. In some examples, aspects of the operations of 2215 may be performed by a communications component as described with reference to FIGS. 6 through 9.

At 2220, the UE may communicate with the second device over a sidelink communication link using a directional beam in accordance with the one or more beam directions. The operations of 2220 may be performed according to the methods described herein. In some examples, aspects of the operations of 2220 may be performed by a communications component as described with reference to FIGS. 6 through 9.

Figure 23:
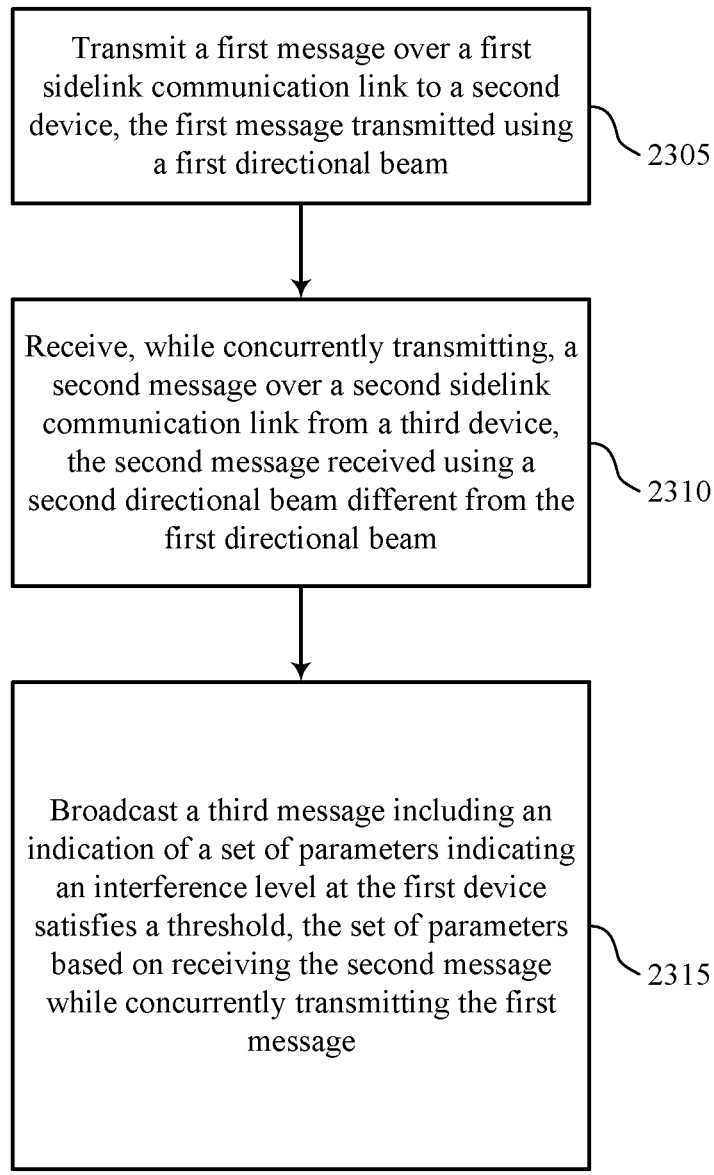

FIG. 23 shows a flowchart illustrating a method 2300 that supports cooperative full-duplex techniques for sidelink communications in accordance with one or more aspects of the present disclosure. The operations of method 2300 may be implemented by a UE 115 or its components as described herein. For example, the operations of method 2300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2305, the UE may transmit a first message over a first sidelink communication link to a second device, the first message transmitted using a first directional beam. The operations of 2305 may be performed according to the methods described herein. In some examples, aspects of the operations of 2305 may be performed by a messaging component as described with reference to FIGS. 6 through 9.

At 2310, the UE may receive, while concurrently transmitting, a second message over a second sidelink communication link from a third device, the second message received using a second directional beam different from the first directional beam. The operations of 2310 may be performed according to the methods described herein. In some examples, aspects of the operations of 2310 may be performed by a messaging component as described with reference to FIGS. 6 through 9.

At 2315, the UE may broadcast a third message including an indication of a set of parameters indicating that an interference level at the first device satisfies a threshold, the set of parameters based on receiving the second message while concurrently transmitting the first message. The operations of 2315 may be performed according to the methods described herein. In some examples, aspects of the operations of 2315 may be performed by a transmission component as described with reference to FIGS. 6 through 9.

Figure 24:
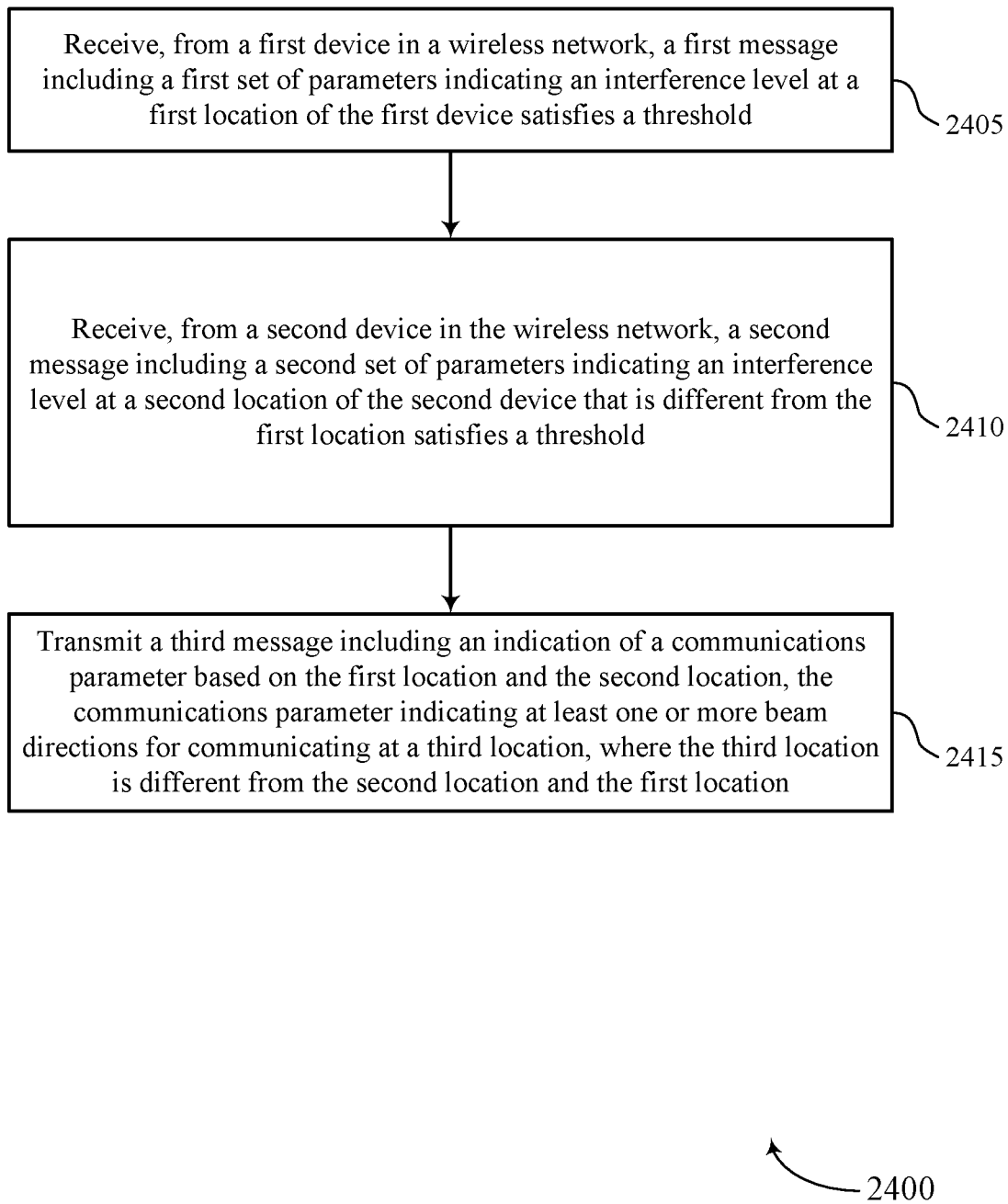

FIG. 24 shows a flowchart illustrating a method 2400 that supports cooperative full-duplex techniques for sidelink communications in accordance with one or more aspects of the present disclosure. The operations of method 2400 may be implemented by a wireless device, such as a receiving device which may be an RSU, or its components as described herein, among other examples. For example, the operations of method 2400 may be performed by a receiving device communications manager as described with reference to FIGS. 10 through 13. In some examples, a receiving device may execute a set of instructions to control the functional elements of the receiving device to perform the functions described herein. Additionally or alternatively, a receiving device may perform aspects of the functions described herein using special-purpose hardware.

At 2405, the receiving device may receive, from a first device in a wireless network, a first message including a first set of parameters indicating that an interference level at a first location of the first device satisfies a threshold. The operations of 2405 may be performed according to the methods described herein. In some examples, aspects of the operations of 2405 may be performed by a receiving device messaging component as described with reference to FIGS. 10 through 13.

At 2410, the receiving device may receive, from a second device in the wireless network, a second message including a second set of parameters indicating that an interference level at a second location of the second device that is different from the first location satisfies a threshold. The operations of 2410 may be performed according to the methods described herein. In some examples, aspects of the operations of 2410 may be performed by a receiving device messaging component as described with reference to FIGS. 10 through 13.

At 2415, the receiving device may transmit a third message including an indication of a communications parameter based on the first location and the second location, the communications parameter indicating at least one or more beam directions for communicating at a third location, where the third location is different from the second location and the first location. The operations of 2415 may be performed according to the methods described herein. In some examples, aspects of the operations of 2415 may be performed by a transmission manager as described with reference to FIGS. 10 through 13.

Figure 25:
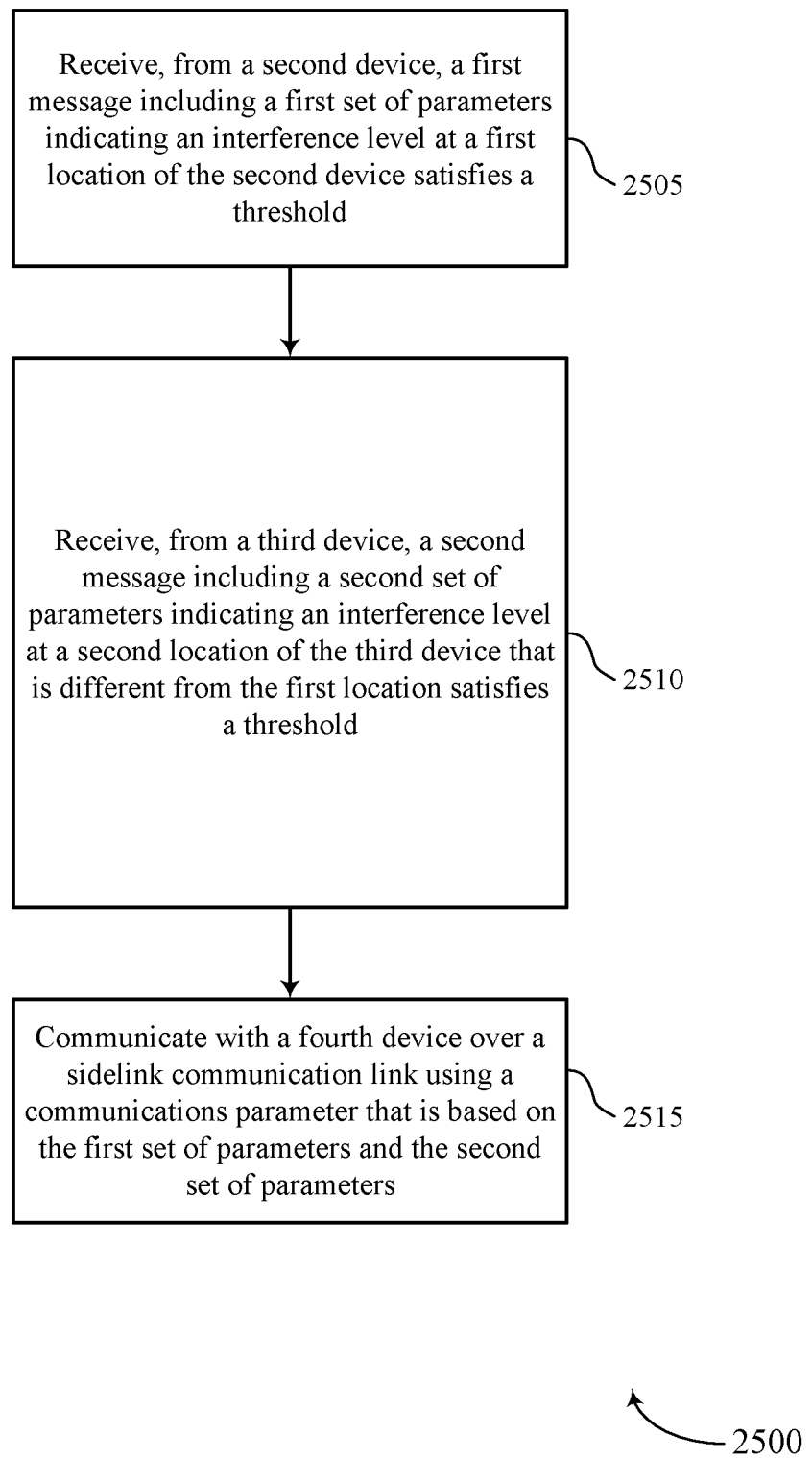

FIG. 25 shows a flowchart illustrating a method 2500 that supports cooperative full-duplex techniques for sidelink communications in accordance with one or more aspects of the present disclosure. The operations of method 2500 may be implemented by a UE 115 or its components as described herein. For example, the operations of method 2500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2505, the UE may receive, from a second device, a first message including a first set of parameters indicating that an interference level at a first location of the second device satisfies a threshold. The operations of 2505 may be performed according to the methods described herein. In some examples, aspects of the operations of 2505 may be performed by a messaging component as described with reference to FIGS. 6 through 9.

At 2510, the UE may communicate with a fourth device over a sidelink communication link using a communications parameter that is based on the first set of parameters and the second set of parameters. The operations of 2510 may be performed according to the methods described herein. In some examples, aspects of the operations of 2510 may be performed by a messaging component as described with reference to FIGS. 6 through 9.

At 2515, the UE may determine a communications parameter based on the first set of parameters and the second set of parameters. The operations of 2515 may be performed according to the methods described herein. In some examples, aspects of the operations of 2515 may be performed by a transmission component as described with reference to FIGS. 6 through 9.

Figure 26:
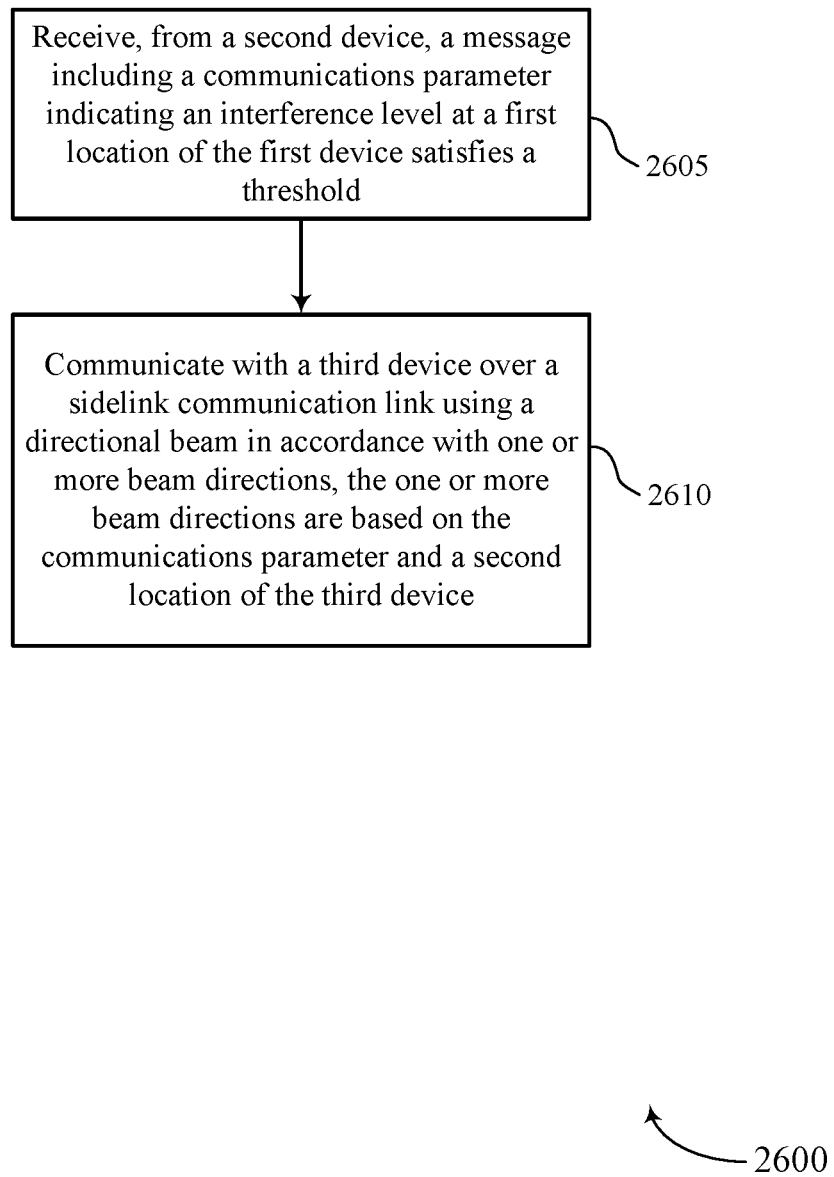

FIG. 26 shows a flowchart illustrating a method 2600 that supports cooperative full-duplex techniques for sidelink communications in accordance with one or more aspects of the present disclosure. The operations of method 2600 may be implemented by a UE 115 or its components as described herein. For example, the operations of method 2600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 2605, the UE may receive, from a second device, a message including a communications parameter indicating that an interference level at a first location of the first device satisfies a threshold. The operations of 2605 may be performed according to the methods described herein. In some examples, aspects of the operations of 2605 may be performed by a messaging component as described with reference to FIGS. 6 through 9.

At 2610, the UE may communicate with a third device over a sidelink communication link using a directional beam in accordance with one or more beam directions, the one or more beam directions are based on the communications parameter and a second location of the third device. The operations of 2610 may be performed according to the methods described herein. In some examples, aspects of the operations of 2610 may be performed by a communications component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Aspect 1: A method for wireless communication at a first device that supports full-duplex communications in a wireless network, comprising: transmitting a first message over a first sidelink communication link to a second device, the first message transmitted using a first directional beam; receiving, while concurrently transmitting, a second message over a second sidelink communication link from a third device, the second message received using a second directional beam different from the first directional beam; and broadcasting a third message comprising an indication of a set of parameters indicating that an interference level at the first device satisfies a threshold, the set of parameters based at least in part on receiving the second message while concurrently transmitting the first message.

Aspect 2: The method of aspect 1, wherein the set of parameters comprises location information, or directional beam information, or antenna array information, or velocity information, or any combination thereof.

Aspect 3: The method of any of aspects 1 through 2, wherein the set of parameters indicate a presence or an absence of one or more objects that cause the interference level at the first device.

Aspect 4: The method of any of aspects 1 through 3, further comprising: determining location information based at least in part on a first location of the first device, a second location of the second device, and a third location of the third device, the first location, the second location, and the third location being different locations, wherein the third message comprises an indication of the first location, or the second location, or the third location, or any combination thereof.

Aspect 5: The method of any of aspects 1 through 4, further comprising: determining directional beam information based at least in part on the first directional beam and the second directional beam, the directional beam information comprising a first beam index corresponding to a first direction of the first directional beam, or a second beam index corresponding to a second direction of the second directional beam, or both, wherein the third message comprises an indication of the first beam index, or the second beam index, or both.

Aspect 6: The method of any of aspects 1 through 5, further comprising: determining antenna array information based at least in part on a transmit antenna array of the first device for transmitting the first message and a receive antenna array of the first device for receiving the second message, the antenna array information comprising first direction information for a main transmit beam of the transmit antenna array, second direction information for one or more null interference beams at the transmit antenna array, third direction information for a main receive beam at the receive antenna array, and fourth direction information for one or more null interference beams at the receive antenna array, wherein the third message comprises an indication of the first direction information, or the second direction information, or the third direction information, or the fourth direction information, or any combination thereof.

Aspect 7: The method of aspect 6, wherein the first direction information and the second direction information each comprise an index of a codebook for transmitting the first message, the third direction information and the fourth direction information each comprising an index of a codebook for receiving the second message.

Aspect 8: The method of any of aspects 1 through 7, further comprising: determining velocity information based at least in part on a speed of the first device or a direction of the first device, or both, the third message comprising an indication of the speed of the first device or the direction of the first device, or both.

Aspect 9: The method of aspect 8, further comprising: determining a speed of the second device or a direction of the second device, or both, based at least in part on a message from the second device, or a first measurement performed by the first device, or both; and determining a speed of the third device or a direction of the third device, or both, based at least in part on a message from the third device or a second measurement performed by the first device, or both, the third message comprising an indication of the speed of the second device, or the direction of the second device, or the speed of the third device, or the direction of the third device, or any combination thereof.

Aspect 10: The method of any of aspects 1 through 9, further comprising: determining a configuration for broadcasting the third message comprising the indication of the set of parameters, the configuration comprising a periodicity for broadcasting the fourth message or a dynamic instruction to broadcast the third message, or both, wherein the third message is broadcast in accordance with the periodicity or the dynamic instruction, or both.

Aspect 11: The method of aspect 10, further comprising: determining, from the configuration, a probability value associated with broadcasting the set of parameters, wherein broadcasting the third message is based at least in part on the probability value.

Aspect 12: The method of any of aspects 1 through 11, further comprising: receiving, from a fourth device, a fifth message comprising a communications parameter that indicates a presence or absence of one or more objects that cause interference at a location of the first device; and determining one or more beam directions for communicating with a fifth device over a third sidelink communication link based at least in part on the communications parameter.

Aspect 13: The method of aspect 12, further comprising: transmitting, to the fifth, a configuration for broadcasting, or unicasting, or groupcasting, or any combination thereof, the communications parameter, the configuration indicating a periodicity for broadcasting the communications parameter, or one or more event triggers for broadcasting the communications parameter, or a dynamic request for the communications parameter, or any combination thereof, wherein receiving the fifth message is based at least in part on the configuration.

Aspect 14: The method of any of aspects 12 through 13, wherein the communications parameter comprises an indication of one or more transmit directions or one or more receive directions, or both, that are based at least in part on the one or more objects that cause interference at the location.

Aspect 15: A method for wireless communication at a receiving device, comprising: receiving, from a first device in a wireless network, a first message comprising a first set of parameters indicating that an interference level at a first location of the first device satisfies a threshold; receiving, from a second device in the wireless network, a second message comprising a second set of parameters indicating that an interference level at a second location of the second device that is different from the first location satisfies a threshold; and transmitting a third message comprising an indication of a communications parameter based at least in part on the first location and the second location, the communications parameter indicating at least one or more beam directions for communicating at a third location, wherein the third location is different from the second location and the first location.

Aspect 16: The method of aspect 15, wherein the first set of parameters indicate a presence or absence of one or more objects that cause the interference level at the first location of the first device and the second set of parameters indicate a presence or absence of one or more objects that cause the interference level at the second location of the second device, and the first set of parameters and the second set of parameters each comprise location information, or directional beam information, or antenna array information, or velocity information, or any combination thereof.

Aspect 17: The method of aspect 16, wherein the at least one or more beam directions for communicating at the third location are based at least in part on the presence or absence of the one or more objects at the first location and the second location.

Aspect 18: The method of any of aspects 16 through 17, wherein the location information of the first message comprises an indication of the first location of the first device and a location of one or more other devices communicating with the first device, the first location and the location of the one or more other devices each comprising global positioning system coordinates, or an absolute location, or a zone identifier, or any combination thereof, the communications parameter is based at least in part on the first location and the location of the one or more other devices.

Aspect 19: The method of any of aspects 16 through 18, wherein the directional beam information of the first message comprises a first beam index corresponding to a first direction of a first directional beam of the first device, or a second beam index corresponding to a second direction of a second directional beam of the first device, or both, the communications parameter is based at least in part on the first beam index, or the second beam index, or both.

Aspect 20: The method of any of aspects 16 through 19, wherein the antenna array information of the first message comprises first direction information for a main transmit beam of a transmit antenna array at the first device, second direction information for one or more null interference beams at the transmit antenna array, third direction information for a main receive beam at a receive antenna array at the first device, and fourth direction information for one or more null interference beams at the receive antenna array, the first direction information and the second direction information each comprising an index of a codebook for transmitting messages, the third direction information and the fourth direction information each comprising an index of a codebook for receiving messages, the communications parameter is based at least in part on the first direction information, or the second direction information, or the third direction information, or any combination thereof.

Aspect 21: The method of any of aspects 15 through 20, further comprising: determining a third set of parameters for the third location, the third set of parameters comprising beam directions for communicating at the third location based at least in part on a first estimate of one or more objects at the third location; and determining a fourth set of parameters for a fourth location, the fourth set of parameters comprising beam directions for communicating at the fourth location based at least in part on a second estimate of one or more objects at the fourth location, wherein the third message comprises the third set of parameters, or the fourth set of parameters, or both.

Aspect 22: The method of any of aspects 15 through 21, further comprising: receiving, from the first device, a configuration for transmitting the communications parameter, the configuration indicating a periodicity for transmitting the communications parameter, or one or more event triggers for transmitting the communications parameter, or a dynamic request for the communications parameter, or any combination thereof; and transmitting, to the first device, a fourth message comprising the communications parameter based at least in part on the configuration.

Aspect 23: A method for wireless communication at a first device that supports full-duplex communications in a wireless network, comprising: receiving, from a second device, a first message comprising a first set of parameters indicating that an interference level at a first location of the second device satisfies a threshold; receiving, from a third device, a second message comprising a second set of parameters indicating that an interference level at a second location of the third device that is different from the first location satisfies a threshold; and communicating with a fourth device over a sidelink communication link using a communications parameter that is based at least in part on the first set of parameters and the second set of parameters.

Aspect 24: The method of aspect 23, wherein the first set of parameters indicate a presence or absence of one or more objects that cause the interference level at the first location of the second device and the second set of parameters indicate a presence or absence of one or more objects that cause the interference level at the second location of the third device, and the first set of parameters and the second set of parameters each comprise location information, or directional beam information, or antenna array information, or velocity information, or any combination thereof.

Aspect 25: The method of any of aspects 23 through 24, further comprising: determining a third location of the first device for communicating with the fourth device, the third location being different from the first location and the second location; and determining the communications parameter based at least in part on a proximity of the third location to the first location, or a proximity of the third location to the second location, or both.

Aspect 26: The method of aspect 25, further comprising: determining one or more beam directions for communicating with at least the fourth device based at least in part on the first set of parameters and the second set of parameters, wherein the fourth device is located at a fourth location different from the first location, the second location, and the third location.

Aspect 27: A method for wireless communication at a first device that supports full-duplex communications in a wireless network, comprising: receiving, from a second device, a message comprising a communications parameter indicating that an interference level at a first location of the first device satisfies a threshold; and communicating with a third device over a sidelink communication link using a directional beam in accordance with one or more beam directions, the one or more beam directions are based at least in part on the communications parameter and a second location of the third device.

Aspect 28: The method of aspect 27, further comprising: determining, from the communications parameter, a transmit direction for a first directional beam, or a receive direction for a second directional beam, or both, for a device communicating at the first location of the first device, wherein the one or more beam directions are based at least in part on the transmit direction, or the receive direction, or both.

Aspect 29: The method of any of aspects 27 through 28, wherein the first location of the first device comprises a first sublocation from a set of two or more sublocations, and the second location of the second device comprises a second sublocation from the set of two or more sublocations, the communications parameter being associated with the first sublocation.

Aspect 30: The method of any of aspects 27 through 29, further comprising: transmitting, to the second device, a configuration for broadcasting, or unicasting, or groupcasting, or any combination thereof, the communications parameter, the configuration indicating a periodicity for transmitting the communications parameter, or one or more event triggers for transmitting the communications parameter, or a dynamic request for the communications parameter, or any combination thereof, wherein receiving the message is based at least in part on the configuration.

Aspect 31: An apparatus for wireless communication at a first device that supports full-duplex communications in a wireless network, comprising a processor; and memory coupled to the processor, the processor and memory configured to perform a method of any of aspects 1 through 14.

Aspect 32: An apparatus for wireless communication at a first device that supports full-duplex communications in a wireless network, comprising at least one means for performing a method of any of aspects 1 through 14.

Aspect 33: A non-transitory computer-readable medium storing code for wireless communication at a first device that supports full-duplex communications in a wireless network, the code comprising instructions executable by a processor to perform a method of any of aspects 1 through 14.

Aspect 34: An apparatus for wireless communication at a receiving device, comprising a processor; and memory coupled to the processor, the processor and memory configured to perform a method of any of aspects 15 through 22.

Aspect 35: An apparatus for wireless communication at a receiving device, comprising at least one means for performing a method of any of aspects 15 through 22.

Aspect 36: A non-transitory computer-readable medium storing code for wireless communication at a receiving device, the code comprising instructions executable by a processor to perform a method of any of aspects 15 through 22.

Aspect 37: An apparatus for wireless communication at a first device that supports full-duplex communications in a wireless network, comprising a processor; and memory coupled to the processor, the processor and memory configured to perform a method of any of aspects 23 through 26.

Aspect 38: An apparatus for wireless communication at a first device that supports full-duplex communications in a wireless network, comprising at least one means for performing a method of any of aspects 23 through 26.

Aspect 39: A non-transitory computer-readable medium storing code for wireless communication at a first device that supports full-duplex communications in a wireless network, the code comprising instructions executable by a processor to perform a method of any of aspects 23 through 26.

Aspect 40: An apparatus for wireless communication at a first device that supports full-duplex communications in a wireless network, comprising a processor; and memory coupled to the processor, the processor and memory configured to perform a method of any of aspects 27 through 30.

Aspect 41: An apparatus for wireless communication at a first device that supports full-duplex communications in a wireless network, comprising at least one means for performing a method of any of aspects 27 through 30.

Aspect 42: A non-transitory computer-readable medium storing code for wireless communication at a first device that supports full-duplex communications in a wireless network, the code comprising instructions executable by a processor to perform a method of any of aspects 27 through 30.

Aspect 43: A method for wireless communication at a first device that supports full-duplex communications in a wireless network, comprising: transmitting a first message over a first sidelink communication link to a second device, the first message transmitted using a first directional beam; receiving, while concurrently transmitting, a second message over a second sidelink communication link from a third device, the second message received using a second directional beam different from the first directional beam; determining, based at least in part on concurrently transmitting the first message and receiving the second message, a set of parameters that indicate a presence or absence of one or more objects that cause interference at the first device, the set of parameters comprising location information, or directional beam information, or antenna array information, or velocity information, or any combination thereof; and broadcasting a fourth message comprising an indication of the set of parameters.

Aspect 44: The method of aspect 43, wherein determining the set of parameters comprises: determining the location information based at least in part on a first location of the first device, a second location of the second device, and a third location of the third device, the first location, the second location, and the third location being different locations, wherein the fourth message comprises an indication of the first location, or the second location, or the third location, or any combination thereof.

Aspect 45: The method of aspect 44, wherein the location information comprises global positioning system coordinates, or an absolute location, or a zone identifier, or any combination thereof, for each of the first location, the second location, and the third location.

Aspect 46: The method of aspect 43, wherein determining the set of parameters comprises: determining the directional beam information based at least in part on the first directional beam and the second directional beam, the directional beam information comprising a first beam index corresponding to a first direction of the first directional beam, or a second beam index corresponding to a second direction of the second directional beam, or any combination thereof, wherein the fourth message comprises an indication of the first beam index, or the second beam index, or any combination thereof.

Aspect 47: The method of aspect 43, wherein determining the set of parameters comprises: determining the antenna array information based at least in part on a transmit antenna array of the first device for transmitting the first message and a receive antenna array of the first device for receiving the second message, the antenna array information comprising first direction information for a main transmit beam of the transmit antenna array, second direction information for one or more nulls interference beams at the transmit antenna array, third direction information for a main receive beam at the receive antenna array, and fourth direction information for one or more nulls at the receive antenna array, wherein the fourth message comprises an indication of the first direction information, or the second direction information, or the third direction information, or the fourth direction information, or any combination thereof.

Aspect 48: The method of aspect 47, wherein the first direction information and the second direction information each comprise an index of a codebook for transmitting the first message, the third direction information and the fourth direction information each comprising an index of a codebook for receiving the second message.

Aspect 49: The method of aspect 43, wherein determining the set of parameters comprises: determining the velocity information based at least in part on a speed of the first device or a direction of the first device, or any combination thereof, the fourth message comprising an indication of the speed of the first device or the direction of the first device, or any combination thereof.

Aspect 50: The method of aspect 49, wherein determining the velocity information comprises: determining a speed of the second device or a direction of the second device, or any combination thereof, based at least in part on a message from the second device, or a first measurement performed by the first device, or any combination thereof and determining a speed of the third device or a direction of the third device, or any combination thereof, based at least in part on a message from the third device or a second measurement performed by the first device, or any combination thereof, the fourth message comprising an indication of the speed of the second device, or the direction of the second device, or the speed of the third device, or the direction of the third device, or any combination thereof.

Aspect 51: The method of aspect 43, further comprising: determining a configuration for broadcasting the fourth message comprising the indication of the set of parameters, the configuration comprising a periodicity for broadcasting the fourth message or a dynamic instruction to broadcast the fourth message, or any combination thereof, wherein the fourth message is broadcast in accordance with the periodicity or the dynamic instruction, or any combination thereof.

Aspect 52: The method of aspect 51, further comprising: determining, from the configuration, a probability value associated with broadcasting the set of parameters, wherein broadcasting the fourth message is based at least in part on the probability value Aspect 53: The method of aspect 51, wherein the periodicity for broadcasting the fourth message is based at least in part on a capability of the first device or a speed of the first device, or any combination thereof.

Aspect 54: The method of aspect 51, further comprising: receiving an indication of the configuration from a road side unit, or a base station, or any combination thereof.

Aspect 55: The method of aspect 43, further comprising: receiving, from a road side unit, a fifth message comprising a communications parameter that indicates a presence or absence of one or more additional objects that cause interference at a location of the first device; and determining one or more beam directions for communicating with a fourth device over a third sidelink communication link based at least in part on the communications parameter.

Aspect 56: The method of aspect 55, further comprising: transmitting, to the road side unit, a configuration for broadcasting, or unicasting, or groupcasting, or any combination thereof, the communications parameter, the configuration indicating a periodicity for broadcasting the communications parameter, one or more event triggers for broadcasting the communications parameter, a dynamic request for the communications parameter, or any combination thereof, wherein receiving the fifth message is based at least in part on the configuration.

Aspect 57: The method of aspect 55, wherein the communications parameter comprises an indication of one or more transmit directions or one or more receive directions, or any combination thereof, that are based at least in part on the one or more objects that cause interference at the location.

Aspect 58: The method of any one of aspects 43 through 55, wherein the one or more objects that cause interference at the first device comprise objects that reflect signaling of the first device back to the first device based at least in part on the first device concurrently transmitting and receiving.

Aspect 59: A method for wireless communication at an RSU, comprising: receiving, from a first device in a wireless network, a first message comprising a first set of parameters that indicate a presence or absence of one or more objects that cause interference at a first location of the first device; receiving, from a second device in the wireless network, a second message comprising a second set of parameters that indicate a presence or absence of one or more objects that cause interference at second location of the second device that is different from the first location, the first set of parameters and the second set of parameters each comprising location information, or directional beam information, or antenna array information, or velocity information, or any combination thereof; determining a communications parameter based at least in part on the first set of parameters and the second set of parameters, the communications parameter indicating at least one or more beam directions for communicating at a location based at least in part on the presence or the absence of the one or more objects at the first location and the second location; and transmitting a third message comprising an indication of the communications parameter to at least the first device, or the second device, or any combination thereof.

Aspect 60: The method of aspect 59, wherein determining the communications parameter comprises: determining a first set of parameters for a third location of the one or more locations, the first set of parameters comprising beam directions for communicating in the third location based at least in part on a first estimate of one or more objects at the third location; and determining a second set of parameters for a fourth location of the set of one or more locations, the second set of parameters comprising beam directions for communicating in the fourth location based at least in part on a second estimate of one or more objects at the fourth location, wherein the third message comprises the first subset of parameters, or the second subset of parameters, or any combination thereof.

Aspect 61: The method of aspect 60, wherein the first subset of parameters comprises first location information, or first directional beam information, or first antenna array information, or first velocity information, or any combination thereof, for one or more nodes at the third location, the second subset of parameters comprising second location information, or second directional beam information, or second antenna array information, or second velocity information, or any combination thereof, for one or more nodes at the fourth location.

Aspect 62: The method of aspect 59, further comprising: receiving, from the first device, a configuration for transmitting the communications parameter, the configuration indicating a periodicity for transmitting the communications parameter, one or more event triggers for transmitting the communications parameter, a dynamic request for the communications parameter, or any combination thereof; and transmitting, to the first device, a fourth message comprising the communications parameter based at least in part on the configuration.

Aspect 63: The method of aspect 59, wherein the communications parameter comprises an indication of one or more transmit directions, or one or more receive directions, or any combination thereof, that are based at least in part on the one or more objects that cause interference at a location.

Aspect 64: The method of aspect 59, wherein the location information of the first message comprises an indication of the first location of the first device and a location of one or more other devices communicating with the first device, the first location and the location of the one or more other devices each comprising global positioning system coordinates, or an absolute location, or a zone identifier, or any combination thereof, wherein the communications parameter is based at least in part on the first location and the location of the one or more other devices.

Aspect 65: The method of aspect 59, wherein the directional beam information of the first message comprising a first beam index corresponding to a first direction of a first directional beam of the first device, or a second beam index corresponding to a second direction of a second directional beam of the first device, or any combination thereof, wherein the communications parameter is based at least in part on the first beam index, or the second beam index, or any combination thereof.

Aspect 66: The method of aspect 59, wherein the antenna array information of the first message comprising first direction information for a main transmit beam of a transmit antenna array at the first device, second direction information for one or more nulls at the transmit antenna array, third direction information for a main receive beam at a receive antenna array at the first device, and fourth direction information for one or more nulls at the receive antenna array, the first direction information and the second direction information each comprising an index of a codebook for transmitting messages, the third direction information and the fourth direction information each comprising an index of a codebook for receiving messages, wherein the communications parameter is based at least in part on the first direction information, or the second direction information, or the third direction information, or any combination thereof.

Aspect 67: The method of aspect 59, further comprising: determining a speed of the first device or a direction of the first device, or any combination thereof, based at least in part on a message from the first device, or a first measurement performed by the road side unit, or any combination thereof; and determining a speed of the second device or a direction of the second device, or any combination thereof, based at least in part on a message from the second device or a second measurement performed by the road side unit, or any combination thereof, the velocity information of the first message comprising the speed of the first device, or the direction of the first device, or the speed of the second device, or the direction of the second device, or any combination thereof, wherein the communications parameter is based at least in part on the speed of the first device, or the direction of the first device, or the speed of the second device, or the direction of the second device, or any combination thereof Aspect 68: The method of aspect 59, wherein transmitting the third message comprises: broadcasting, unicasting, or groupcasting the third message to one or more devices in the wireless network.

Aspect 69: A method for wireless communication at a first device that supports full-duplex communications in a wireless network, comprising: receiving, from a second device, a first message comprising a first set of parameters that indicate a presence or absence of one or more objects that cause interference at a first location of the second device; receiving, from a third device, a second message comprising a second set of parameters that indicate a presence or absence of one or more objects that cause interference at second location of the third device that is different from the first location, the first set of parameters and the second set of parameters each comprising location information, or directional beam information, or antenna array information, or velocity information, or any combination thereof; determining a communications parameter based at least in part on the first set of parameters and the second set of parameters; and communicating with a fourth device over a sidelink communication link using the communications parameter.

Aspect 70: The method of aspect 69, wherein determining the communications parameter comprising: determining a third location of the first device for communicating with the fourth device, the third location being different from the first location and the second location; and determining the communications parameter based at least in part on a proximity of the third location to the first location, or a proximity of the third location to the second location, or any combination thereof.

Aspect 71: The method of any one of aspects 69 and 70, wherein the first location, the second location, and the third location each correspond to different global positioning system coordinates, or different absolute locations, or different zone identifiers, or any combination thereof.

Aspect 72: The method of any one of aspects 70 through 71, wherein determining the communications parameter comprises: determining one or more beam directions for communicating with at least the fourth device based at least in part on the first set of parameters and the second set of parameters, wherein the fourth device is located at a fourth location different from the first location, the second location, and the third location.

Aspect 73: The method of aspect 69, wherein the communications parameter is based at least in part on one or more beam directions used by the second device at the first location, or one or more beam directions used by the third device at the second location, or any combination thereof.

Aspect 74: A method for wireless communication at a first device that supports full-duplex communications in a wireless network, comprising: determining a first location of the first device; receiving, from a road side unit, a message comprising a communications parameter that indicates a presence or absence of one or more objects that cause interference at the first location of the first device; determining, based at least in part on the communications parameter and a second location of a second device, one or more beam directions for communicating with at least the second device; and communicating with the second device over a sidelink communication link using a directional beam in accordance with the one or more beam directions.

Aspect 75: The method of aspect 74, wherein determining the one or more beam directions comprises: determining, from the communications parameter, a transmit direction for a first directional beam, or a receive direction for a second directional beam, or a combination thereof, for a device communicating at the first location of the first device, wherein the one or more beam directions are based at least in part on the transmit direction, or the receive direction, or a combination thereof.

Aspect 76: The method of aspect 74, wherein the first location of the first device comprises a sublocation from a set of two or more sublocations, and wherein the second location of the second device comprises a second sublocation from the set of two or more sublocations, the communications parameter being associated with the first sublocation.

Aspect 77: The method of any one of aspects 74 through 76, further comprising: transmitting, to the road side unit, a configuration for broadcasting, or unicasting, or groupcasting, or any combination thereof, the communications parameter, the configuration indicating a periodicity for transmitting the communications parameter, one or more event triggers for transmitting the communications parameter, a dynamic request for the communications parameter, or any combination thereof, wherein receiving the message is based at least in part on the configuration.

Aspect 78: The method of any one of aspects 74 through 77, further comprising: performing one or more beam refinement procedures for modifying the one or more beam directions for communicating with at least the second device.

Aspect 79: The method of any one of aspects 74 through 78, wherein the first location and the second location, each correspond to different global positioning system coordinates, or different absolute locations, or different zone identifiers, or any combination thereof.

Aspect 80: An apparatus for wireless communication comprising at least one means for performing a method of any one of aspects 43 through 58.

Aspect 81: An apparatus for wireless communication comprising a processor and memory coupled to the processor, the processor and memory configured to cause the apparatus to perform a method of any one of aspects 43 through 58.

Aspect 82: A non-transitory computer-readable medium storing code for wireless communication comprising a processor, memory in electronic communication with the processor, and instructions stored in the memory and executable by the processor to cause the apparatus to perform a method of any one of aspects 43 through 58.

Aspect 83: An apparatus for wireless communication comprising at least one means for performing a method of any one of aspects 59 through 68.

Aspect 84: An apparatus for wireless communication comprising a processor and memory coupled to the processor, the processor and memory configured to cause the apparatus to perform a method of any one of aspects 59 through 68.

Aspect 85: A non-transitory computer-readable medium storing code for wireless communication comprising a processor, memory in electronic communication with the processor, and instructions stored in the memory and executable by the processor to cause the apparatus to perform a method of any one of aspects 59 through 68.

Aspect 86: An apparatus for wireless communication comprising at least one means for performing a method of any one of aspects 69 through 73.

Aspect 87: An apparatus for wireless communication comprising a processor and memory coupled to the processor, the processor and memory configured to cause the apparatus to perform a method of any one of aspects 69 through 73.

Aspect 88: A non-transitory computer-readable medium storing code for wireless communication comprising a processor, memory in electronic communication with the processor, and instructions stored in the memory and executable by the processor to cause the apparatus to perform a method of any one of aspects 69 through 73.

Aspect 89: An apparatus for wireless communication comprising at least one means for performing a method of any one of aspects 74 through 79.

Aspect 90: An apparatus for wireless communication comprising a processor and memory coupled to the processor, the processor and memory configured to cause the apparatus to perform a method of any one of aspects 74 through 79.

Aspect 91: A non-transitory computer-readable medium storing code for wireless communication comprising a processor, memory in electronic communication with the processor, and instructions stored in the memory and executable by the processor to cause the apparatus to perform a method of any one of aspects 74 through 79.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first device that supports full-duplex communications in a wireless network, comprising:
   one or more memories; and
   one or more processors coupled with the one or more memories and configured to cause the first device to:
      transmit a first message over a first sidelink communication link to a second device, the first message transmitted via a first directional beam;
      receive, concurrently with transmission of the first message, a second message over a second sidelink communication link from a third device, the second message received via a second directional beam different from the first directional beam; and
      broadcast a third message comprising an indication of a set of parameters that indicates an interference level at the first device satisfies a threshold, the set of parameters based at least in part on the second message and the first message.

2. The apparatus of claim 1, further comprising:
   an antenna array, wherein:
      the set of parameters comprises location information, directional beam information, antenna array information, velocity information, or any combination thereof.

3. The apparatus of claim 1, wherein the set of parameters indicates a presence or an absence of one or more objects that cause the interference level at the first device.

4. The apparatus of claim 1, wherein the one or more processors are configured to cause the first device to:

determine location information based at least in part on a first location of the first device, a second location of the second device, and a third location of the third device, wherein the first location, the second location, and the third location are different locations, and wherein the third message comprises an indication of the first location, the second location, the third location, or any combination thereof.

5. The apparatus of claim 1, wherein the one or more processors are configured to cause the first device to:
determine directional beam information based at least in part on the first directional beam and the second directional beam, the directional beam information comprising a first beam index corresponding to a first direction of the first directional beam, a second beam index corresponding to a second direction of the second directional beam, or both, wherein the third message comprises an indication of the first beam index, the second beam index, or both.

6. The apparatus of claim 1, wherein the one or more processors are configured to cause the first device to:
determine antenna array information based at least in part on a transmit antenna array of the first device for transmission of the first message and a receive antenna array of the first device for reception of the second message, the antenna array information comprising first direction information for a transmit beam of the transmit antenna array, second direction information for one or more null interference beams at the transmit antenna array, third direction information for a main receive beam at the receive antenna array, and fourth direction information for one or more null interference beams at the receive antenna array, wherein the third message comprises an indication of the first direction information, the second direction information, the third direction information, the fourth direction information, or any combination thereof.

7. The apparatus of claim 6, wherein the first direction information and the second direction information each comprises an index of a codebook for transmission of the first message, the third direction information and the fourth direction information each comprising an index of a codebook for reception of the second message.

8. The apparatus of claim 1, wherein the one or more processors are configured to cause the first device to:
determine velocity information based at least in part on a speed of the first device, a direction of the first device, or both, the third message comprising an indication of the speed of the first device, the direction of the first device, or both.

9. The apparatus of claim 8, wherein the one or more processors are configured to cause the first device to:
determine a speed of the second device, a direction of the second device, or both, based at least in part on a message from the second device, a first measurement performed by the first device, or both; and
determine a speed of the third device, a direction of the third device, or both, based at least in part on a message from the third device, a second measurement performed by the first device, or both, the third message comprising an indication of the speed of the second device, the direction of the second device, the speed of the third device, the direction of the third device, or any combination thereof.

10. The apparatus of claim 1, wherein the one or more processors are configured to cause the first device to:
determine a configuration for the broadcast of the third message comprising the indication of the set of parameters, the configuration comprising a periodicity for the broadcast of the third message, a dynamic instruction to broadcast the third message, or both, wherein the third message is broadcast in accordance with the periodicity, the dynamic instruction, or both.

11. The apparatus of claim 10, wherein the one or more processors are configured to cause the first device to:
determine, from the configuration, a probability value associated with the broadcast of the set of parameters, wherein the broadcast of the third message is based at least in part on the probability value.

12. The apparatus of claim 1, wherein the one or more processors are configured to cause the first device to:
receive, from a fourth device, a fifth message comprising a communications parameter that indicates a presence or absence of one or more objects that cause interference at a location of the first device; and
determine one or more beam directions for communication with a fifth device over a third sidelink communication link based at least in part on the communications parameter.

13. The apparatus of claim 12, wherein the one or more processors are configured to cause the first device to:
transmit, to the fourth device, a configuration for a broadcast, a unicast, a groupcast, or any combination thereof, of the communications parameter, wherein the configuration indicates a periodicity for the broadcast of the communications parameter, one or more event triggers for the broadcast of the communications parameter, a dynamic request for the communications parameter, or any combination thereof, and wherein reception of the fifth message is based at least in part on the configuration.

14. The apparatus of claim 12, wherein the communications parameter comprises an indication of one or more transmit directions, one or more receive directions, or both, that are based at least in part on the one or more objects that cause the interference at the location.

15. An apparatus for wireless communication at a first device, comprising:
one or more memories; and
one or more processors coupled with the one or more memories and configured to cause the first device to:
receive, from a second device in a wireless network, a first message comprising a first set of parameters that indicates an interference level at a first location of the second device satisfies a first threshold and a presence or an absence of one or more objects that cause the interference level at the first location of the second device;
receive, from a third device in the wireless network, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprises location information, directional beam information, antenna array information, velocity information, or any combination thereof; and
transmit a third message comprising an indication of a communications parameter based at least in part on the first location and the second location, wherein the communications parameter indicates at least one or more beam directions for communication at a third location, and wherein the third location is different from the second location and the first location.

16. The apparatus of claim 15, wherein the at least one or more beam directions for communication at the third location are based at least in part on the presence or absence of the one or more objects at the first location and the second location.

17. The apparatus of claim 15, wherein:
the location information of the first message comprises an indication of the first location of the second device and a location of one or more other devices in communication with the second device, the first location and the location of the one or more other devices each comprising global positioning system coordinates, an absolute location, a zone identifier, or any combination thereof, and wherein the communications parameter is based at least in part on the first location and the location of the one or more other devices.

18. The apparatus of claim 15, wherein:
the directional beam information of the first message comprises a first beam index corresponding to a first direction of a first directional beam of the second device, a second beam index corresponding to a second direction of a second directional beam of the second device, or both, and wherein the communications parameter is based at least in part on the first beam index, the second beam index, or both.

19. The apparatus of claim 15, wherein:
the antenna array information of the first message comprises first direction information for a main transmit beam of a transmit antenna array at the second device, second direction information for one or more null interference beams at the transmit antenna array, third direction information for a main receive beam at a receive antenna array at the second device, and fourth direction information for one or more null interference beams at the receive antenna array, the first direction information and the second direction information each comprising an index of a codebook for transmission of messages, the third direction information and the fourth direction information each comprising an index of a codebook for reception of messages, and wherein the communications parameter is based at least in part on the first direction information, the second direction information, the third direction information, or any combination thereof.

20. The apparatus of claim 15, wherein the one or more processors are configured to cause the first device to:
determine a third set of parameters for the third location, the third set of parameters comprising beam directions for communication at the third location based at least in part on a first estimate of one or more objects at the third location; and
determine a fourth set of parameters for a fourth location, the fourth set of parameters comprising beam directions for communication at the fourth location based at least in part on a second estimate of one or more objects at the fourth location, wherein the third message comprises the third set of parameters, the fourth set of parameters, or both.

21. The apparatus of claim 15, wherein the one or more processors are further configured to cause the first device to:
receive, from the second device, a configuration for transmission of the communications parameter, the configuration that indicates a periodicity for transmission of the communications parameter, one or more event triggers for transmission of the communications parameter, a dynamic request for the communications parameter, or any combination thereof; and
transmit, to the second device, a fourth message comprising the communications parameter based at least in part on the configuration.

22. An apparatus for wireless communication at a first device that supports full-duplex communications in a wireless network, comprising:
one or more memories; and
one or more processors coupled with the one or more memories and configured to cause the first device to:
receive, from a second device, a first message comprising a first set of parameters that indicates an interference level at a first location of the second device satisfies a first threshold and a presence or an absence of one or more objects that cause the interference level at the first location of the second device;
receive, from a third device, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprises location information, directional beam information, antenna array information, velocity information, or any combination thereof; and
communicate with a fourth device over a sidelink communication link via a communications parameter that is based at least in part on the first set of parameters and the second set of parameters.

23. The apparatus of claim 22, wherein the one or more processors are configured to cause the first device to:
determine a third location of the first device for communication with the fourth device, the third location different from the first location and the second location; and
determine the communications parameter based at least in part on a proximity of the third location to the first location, a proximity of the third location to the second location, or both.

24. The apparatus of claim 23, wherein the one or more processors are configured to cause the first device to:
determine one or more beam directions for communication with at least the fourth device based at least in part on the first set of parameters and the second set of parameters, wherein the fourth device is located at a fourth location different from the first location, the second location, and the third location.

25. An apparatus for wireless communication at a first device that supports full-duplex communications in a wireless network, comprising:
one or more memories; and
one or more processors coupled with the one or more memories and configured to cause the first device to:
receive, from a second device, a message comprising a communications parameter that indicates an interference level at a first location of the first device satisfies a threshold and a presence or an absence of one or more objects that cause the interference level at the first location of the first device, wherein the communications parameter comprises location information, directional beam information, antenna array information, velocity information, or any combination thereof; and
communicate with a third device over a sidelink communication link via a directional beam in accordance with one or more beam directions, wherein the one or more beam directions are based at least in part on the communications parameter and a second location of the third device.

26. The apparatus of claim 25, wherein the one or more processors are configured to cause the first device to:
determine, from the communications parameter, a transmit direction for a first directional beam, a receive direction for a second directional beam, or both, for a device in communication at the first location of the first device, wherein the one or more beam directions are based at least in part on the transmit direction, the receive direction, or both.

27. The apparatus of claim 25, wherein:
the first location of the first device comprises a first sublocation from a set of two or more sublocations, and
the second location of the second device comprises a second sublocation from the set of two or more sublocations, the communications parameter associated with the first sublocation.

28. The apparatus of claim 25, wherein the one or more processors are configured to cause the first device to:
transmit, to the second device, a configuration for a broadcast, a unicast, a groupcast, or any combination thereof, of the communications parameter, the configuration indicating a periodicity for transmission of the communications parameter, one or more event triggers for transmission of the communications parameter, a dynamic request for the communications parameter, or any combination thereof, wherein reception of the message is based at least in part on the configuration.

29. A non-transitory computer-readable medium storing code for wireless communication, the code comprising instructions executed by one or more processors to cause a first device to:
transmit a first message over a first sidelink communication link to a second device, the first message transmitted via a first directional beam;
receive, concurrently with transmission of the first message, a second message over a second sidelink communication link from a third device, the second message received via a second directional beam different from the first directional beam; and
broadcast a third message comprising an indication of a set of parameters that indicates that an interference level at the first device satisfies a threshold, the set of parameters based at least in part on the second message and the first message.

30. A non-transitory computer-readable medium storing code for wireless communication, the code comprising instructions executed by one or more processors to cause a first device to:
receive, from a second device in a wireless network, a first message comprising a first set of parameters that indicates an interference level at a first location of the second device satisfies a first threshold and a presence or an absence of one or more objects that cause the interference level at the first location of the second device;
receive, from a third device in the wireless network, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprise location information, directional beam information, antenna array information, velocity information, or any combination thereof; and
transmit a third message comprising an indication of a communications parameter based at least in part on the first location and the second location, wherein the communications parameter indicates at least one or more beam directions for communication at a third location, and wherein the third location is different from the second location and the first location.

31. A non-transitory computer-readable medium storing code for wireless communication, the code comprising instructions executed by one or more processors to cause a first device to:
receive, from a second device, a first message comprising a first set of parameters that indicates an interference level at a first location of the second device satisfies a first threshold and a presence or an absence of one or more objects that cause the interference level at the first location of the second device;
receive, from a third device, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprises location information, directional beam information, antenna array information, velocity information, or any combination thereof; and
communicate with a fourth device over a sidelink communication link via a communications parameter that is based at least in part on the first set of parameters and the second set of parameters.

32. A non-transitory computer-readable medium storing code for wireless communication, the code comprising instructions executed by one or more processors to cause a first device to:
receive, from a second device, a message comprising a communications parameter that indicates an interference level at a first location of the first device satisfies a threshold and a presence or an absence of one or more objects that cause the interference level at the first location of the first device, wherein the communications parameter comprises location information, directional beam information, antenna array information, velocity information, or any combination thereof; and
communicate with a third device over a sidelink communication link via-a directional beam in accordance with one or more beam directions, wherein the one or more beam directions are based at least in part on the communications parameter and a second location of the third device.

33. A method for wireless communication at a first device that supports full-duplex communications in a wireless network, comprising:
transmitting a first message over a first sidelink communication link to a second device, the first message transmitted via a first directional beam;

receiving, concurrently with transmission of the first message, a second message over a second sidelink communication link from a third device, the second message received via a second directional beam different from the first directional beam; and broadcasting a third message comprising an indication of a set of parameters that indicates an interference level at the first device satisfies a threshold, the set of parameters based at least in part on the second message and the first message.

34. The method of claim 33, wherein the set of parameters comprises location information, directional beam information, antenna array information, velocity information, or any combination thereof.

35. The method of claim 33, wherein the set of parameters indicates a presence or an absence of one or more objects that cause the interference level at the first device.

36. The method of claim 33, further comprising:
determining location information based at least in part on a first location of the first device, a second location of the second device, and a third location of the third device, wherein the first location, the second location, and the third location are different locations, and wherein the third message comprises an indication of the first location, the second location, the third location, or any combination thereof.

37. The method of claim 33, further comprising:
determining directional beam information based at least in part on the first directional beam and the second directional beam, the directional beam information comprising a first beam index corresponding to a first direction of the first directional beam, a second beam index corresponding to a second direction of the second directional beam, or both, wherein the third message comprises an indication of the first beam index, the second beam index, or both.

38. The method of claim 33, further comprising:
determining antenna array information based at least in part on a transmit antenna array of the first device for transmission of the first message and a receive antenna array of the first device for reception of the second message, the antenna array information comprising first direction information for a transmit beam of the transmit antenna array, second direction information for one or more null interference beams at the transmit antenna array, third direction information for a main receive beam at the receive antenna array, and fourth direction information for one or more null interference beams at the receive antenna array, wherein the third message comprises an indication of the first direction information, the second direction information, the third direction information, the fourth direction information, or any combination thereof.

39. The method of claim 38, wherein the first direction information and the second direction information each comprises an index of a codebook for transmission of the first message, the third direction information and the fourth direction information each comprising an index of a codebook for reception of the second message.

40. The method of claim 33, further comprising:
determining velocity information based at least in part on a speed of the first device, a direction of the first device, or both, the third message comprising an indication of the speed of the first device, the direction of the first device, or both.

41. The method of claim 40, further comprising:
determining a speed of the second device, a direction of the second device, or both, based at least in part on a message from the second device, a first measurement performed by the first device, or both; and
determining a speed of the third device, a direction of the third device, or both, based at least in part on a message from the third device, a second measurement performed by the first device, or both, the third message comprising an indication of the speed of the second device, the direction of the second device, the speed of the third device, the direction of the third device, or any combination thereof.

42. The method of claim 33, further comprising:
determining a configuration for the broadcast of the third message comprising the indication of the set of parameters, the configuration comprising a periodicity for the broadcast of the third message, a dynamic instruction to broadcast the third message, or both, wherein the third message is broadcast in accordance with the periodicity, the dynamic instruction, or both.

43. The method of claim 42, further comprising:
determining, from the configuration, a probability value associated with the broadcast of the set of parameters, wherein the broadcast of the third message is based at least in part on the probability value.

44. The method of claim 33, further comprising:
receiving, from a fourth device, a fifth message comprising a communications parameter that indicates a presence or absence of one or more objects that cause interference at a location of the first device; and
determining one or more beam directions for communication with a fifth device over a third sidelink communication link based at least in part on the communications parameter.

45. The method of claim 44, further comprising:
transmitting, to the fourth device, a configuration for a broadcast, a unicast, a groupcast, or any combination thereof, of the communications parameter, wherein the configuration indicates a periodicity for the broadcast of the communications parameter, one or more event triggers for the broadcast of the communications parameter, a dynamic request for the communications parameter, or any combination thereof, and wherein reception of the fifth message is based at least in part on the configuration.

46. The method of claim 44, wherein the communications parameter comprises an indication of one or more transmit directions, one or more receive directions, or both, that are based at least in part on the one or more objects that cause the interference at the location.

47. A method for wireless communication at a first device, comprising:
receiving, from a second device in a wireless network, a first message comprising a first set of parameters that indicates an interference level at a first location of the second device satisfies a first threshold and a presence or an absence of one or more objects that cause the interference level at the first location of the second device;
receiving, from a third device in the wireless network, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprises location information, directional beam information, antenna array information, velocity information, or any combination thereof; and transmitting a third message comprising an indication of a communications parameter based at least in part on the first location and the second location, wherein the communications parameter indicates at least one or more beam directions for communication at a third location, and wherein the third location is different from the second location and the first location.

48. The method of claim 47, further comprising:

determining a third set of parameters for the third location, the third set of parameters comprising beam directions for communication at the third location based at least in part on a first estimate of one or more objects at the third location; and determining a fourth set of parameters for a fourth location, the fourth set of parameters comprising beam directions for communication at the fourth location based at least in part on a second estimate of one or more objects at the fourth location, wherein the third message comprises the third set of parameters, the fourth set of parameters, or both.

49. The method of claim 47, further comprising:

receiving, from the second device, a configuration for transmission of the communications parameter, the configuration that indicates a periodicity for transmission of the communications parameter, one or more event triggers for transmission of the communications parameter, a dynamic request for the communications parameter, or any combination thereof; and transmitting, to the second device, a fourth message comprising the communications parameter based at least in part on the configuration.

50. A method for wireless communication at a first device that supports full-duplex communications, comprising:

receiving, from a second device, a first message comprising a first set of parameters that indicates an interference level at a first location of the second device satisfies a first threshold and a presence or an absence of one or more objects that cause the interference level at the first location of the second device;

receiving, from a third device, a second message comprising a second set of parameters that indicates an interference level at a second location of the third device that is different from the first location satisfies a second threshold and a presence or an absence of one or more objects that cause the interference level at the second location of the third device, wherein the first set of parameters and the second set of parameters each comprises location information, directional beam information, antenna array information, velocity information, or any combination thereof; and communicating with a fourth device over a sidelink communication link via a communications parameter that is based at least in part on the first set of parameters and the second set of parameters.

51. The method of claim 50, further comprising:

determining a third location of the first device for communication with the fourth device, the third location different from the first location and the second location; and determining the communications parameter based at least in part on a proximity of the third location to the first location, a proximity of the third location to the second location, or both.

52. The method of claim 51, further comprising:

determining one or more beam directions for communication with at least the fourth device based at least in part on the first set of parameters and the second set of parameters, wherein the fourth device is located at a fourth location different from the first location, the second location, and the third location.

53. A method for wireless communication at a first device that supports full-duplex communications in a wireless network, comprising:

receiving, from a second device, a message comprising a communications parameter that indicates an interference level at a first location of the first device satisfies a threshold and a presence or an absence of one or more objects that cause the interference level at the first location of the first device, wherein the communications parameter comprises location information, directional beam information, antenna array information, velocity information, or any combination thereof; and communicating with a third device over a sidelink communication link via a directional beam in accordance with one or more beam directions, wherein the one or more beam directions are based at least in part on the communications parameter and a second location of the third device.

54. The method of claim 53, further comprising:

determining, from the communications parameter, a transmit direction for a first directional beam, a receive direction for a second directional beam, or both, for a device in communication at the first location of the first device, wherein the one or more beam directions are based at least in part on the transmit direction, the receive direction, or both.

55. The method of claim 53, wherein:

the first location of the first device comprises a first sublocation from a set of two or more sublocations, and the second location of the second device comprises a second sublocation from the set of two or more sublocations, the communications parameter associated with the first sublocation.

* * * * *